US009416289B2

(12) United States Patent
Kawashima et al.

(10) Patent No.: US 9,416,289 B2
(45) Date of Patent: Aug. 16, 2016

(54) ACTIVE-ENERGY-RAY-CURABLE INKJET INK COMPOSITION, ACTIVE-ENERGY-RAY-CURABLE INKJET INK, AND INKJET RECORDING METHOD

(75) Inventors: Kouki Kawashima, Tokyo (JP); Masaki Nakamura, Tokyo (JP); Atsushi Tomotake, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 236 days.

(21) Appl. No.: 13/982,120

(22) PCT Filed: Jan. 26, 2012

(86) PCT No.: PCT/JP2012/000495
§ 371 (c)(1),
(2), (4) Date: Jul. 26, 2013

(87) PCT Pub. No.: WO2012/102046
PCT Pub. Date: Aug. 2, 2012

(65) Prior Publication Data
US 2013/0307913 A1 Nov. 21, 2013

(30) Foreign Application Priority Data

Jan. 26, 2011 (JP) ................................ 2011-013902
Mar. 15, 2011 (JP) ................................ 2011-056301
Mar. 15, 2011 (JP) ................................ 2011-056302

(51) Int. Cl.
*C09D 11/324* (2014.01)
*B41J 2/21* (2006.01)
(Continued)

(52) U.S. Cl.
CPC .............. *C09D 11/324* (2013.01); *B41J 2/155* (2013.01); *B41J 2/2107* (2013.01); *B41J 2/2117* (2013.01); *C09D 11/101* (2013.01); *C09D 11/30* (2013.01); *C09D 11/322* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ................................................... 347/95–105
See application file for complete search history.

(56) References Cited

U.S. PATENT DOCUMENTS 5,446,073 A * 8/1995 Jonsson ................... C08F 2/48
522/107
6,034,150 A * 3/2000 Hoyle ...................... C08F 2/50
522/167

(Continued)

FOREIGN PATENT DOCUMENTS

JP          11-124403         5/1999
JP       2000319308 A       11/2000

(Continued)

OTHER PUBLICATIONS

Article Sonny Johnson, et al, Polymer Materials Sci. & Enginer.1995. 72 (3 pages).

(Continued)

*Primary Examiner* — Manish S Shah
(74) *Attorney, Agent, or Firm* — Lucas & Mercanti, LLP

(57) ABSTRACT

An active-energy-ray-curable inkjet ink composition which contains at least two polymerizable monomers each having an unsaturated bond, wherein the maximum value of the difference in electric charge of carbon atoms that constitute the unsaturated bond in each of the at least two polymerizable monomers is 0.24 to 0.46 inclusive and the total content of ions of the elements Fe, Co, Ca, Na, Mg, Al, Ti, Sn and Zn is 5.0 to 100 ppm inclusive, or the difference in e value of the unsaturated double bond moiety in each of the at least two polymerizable monomers is 2.8 to 6 inclusive, and wherein a compound which is unpolymerizable and has a substituent capable of reacting with a nucleophilic agent or an acidic compound is contained.

10 Claims, 2 Drawing Sheets

(51) Int. Cl.
  *B41J 2/155* (2006.01)
  *C09D 11/101* (2014.01)
  *C09D 11/30* (2014.01)
  *C09D 11/322* (2014.01)

(56) References Cited

U.S. PATENT DOCUMENTS

| | | | | |
|---|---|---|---|---|
| 6,306,923 | B1 * | 10/2001 | Thepot | C08F 271/02 522/107 |
| 6,410,611 | B1 * | 6/2002 | Sakurai | C09D 11/101 522/103 |
| 2008/0299489 | A1 | 12/2008 | Byers | |
| 2010/0094024 | A1 * | 4/2010 | Shinjo | C08F 222/40 548/521 |
| 2010/0239777 | A1 * | 9/2010 | Nakajima | C09D 11/322 427/508 |
| 2010/0255211 | A1 | 10/2010 | Kawashima et al. | |
| 2011/0319582 | A1 * | 12/2011 | Inata | C08F 290/06 526/262 |
| 2013/0095236 | A1 | 4/2013 | Nakamura et al. | |

FOREIGN PATENT DOCUMENTS

| | | |
|---|---|---|
| JP | 3353020 | 9/2002 |
| JP | 2003-213171 | 7/2003 |
| JP | 2005-255707 | 9/2005 |
| JP | 2010-047636 | 3/2010 |
| JP | 2010-143959 | 7/2010 |
| JP | 2010-241894 | 10/2010 |
| JP | 2010-242069 | 10/2010 |
| JP | 2011-016889 | 1/2011 |
| JP | 2011-016890 | 1/2011 |
| JP | 2011-195596 | 10/2011 |
| JP | 2012153796 A | 8/2012 |
| WO | 2011158601 | 12/2011 |

OTHER PUBLICATIONS

Supplementary Partial European Search Report and English translation thereof.
Extended European Search Report dated Mar. 11, 2016; Application No./Patent No. 12739969.9-1302/2669342 PCT/JP2012000495; Applicant: Konica Minolta, Inc.; total of 9 pages.
Corresponding Japanese Office Action dated May 24, 2016 and English translation thereof.

* cited by examiner

ACTIVE-ENERGY-RAY-CURABLE INKJET INK COMPOSITION, ACTIVE-ENERGY-RAY-CURABLE INKJET INK, AND INKJET RECORDING METHOD

CROSS-REFERENCE TO RELATED APPLICATIONS

This application is a 371 of PCT/JP2012/000495 filed on Jan. 26, 2012, which claims the priority of JP Patent Application No. 2011-013902 filed Jan. 26, 2011, JP Patent Application No. 2011-056301 filed Mar. 15, 2011, and JP Patent Application No. 2011-056302 filed Mar. 15, 2011, the contents of each of which are incorporated herein by reference.

TECHNICAL FIELD

The present invention relates to a novel actinic energy radiation curable ink jet ink composition, an actinic energy radiation curable ink jet ink, and an ink jet recording method.

BACKGROUND ART

In recent years, an ink jet recording system has been employed in a variety of printing fields such as photography, various types of printing, and special printing such as marking and color filters, from the viewpoints that it is capable of image formation in a simple manner at low cost.

As an ink jet ink used in such an ink jet recording system, there are various types of ink jet inks such as an aqueous ink jet ink containing water as a main solvent, an oily ink jet ink mainly containing a non-volatile solvent which does not volatilize at room temperature and containing substantially no water, a non-aqueous ink jet ink mainly containing a solvent volatile at room temperature and containing substantially no water, and a hot melt ink jet ink in which ink, being solid at room temperature, is heat-melted for printing, as well as an actinic energy radiation curable ink jet ink which is cured with actinic energy radiation such as light after printing. These ink jet inks may be used based on the purposes. Among these, the actinic energy radiation curable ink jet ink is characterized by being printed on various printing media due to rapid curability, whereby it has attracted much attention as a next-generation ink jet ink, which replaces the aqueous ink jet ink, the oily ink jet ink, and the non-aqueous ink jet ink requiring a large drying load, each having limited recording media, and further, is expected to expand in uses.

In the related art, the actinic energy radiation curable ink jet inks are mainly classified into a radically polymerizable type ink jet ink and a cationically polymerizable type ink jet ink. Further, the radically polymerizable type ink jet ink features a wide selection of materials, whereby it has great flexibility for ink designing and has been widely researched and developed, resulting in being put into practical use. However, it is easily affected by polymerization inhibition caused by oxygen, and is not easy to handle from the viewpoints of, for example, generating unfavorable odor of polymerizable compounds (monomers) or having skin sensitivity. On the other hand, the cationically polymerizable type ink jet ink is not affected by polymerization inhibition caused by oxygen, but it has problems that it involves polymerization inhibition by an effect of humidity and has high cost due to little variation in materials.

Recently, for the purpose of satisfying both of stability of materials used, such as polymerizable compounds (monomers), polymerization initiators, and sensitizers, and practical curing sensitivity, there has been an attempt to apply a charge transfer complex polymerization reaction (abbreviated as a CT polymerization reaction, and see, for example, NPL 1) to an actinic energy radiation curable composition such as an ultraviolet ray curable composition (see, for example, PTLs 1, 2, and 3). The charge transfer complex polymerization reaction (CT polymerization reaction) is carried out by combining electron-rich monomers (donor-monomers) such as vinyl ether and electron-poor monomers (acceptor-monomers) such as maleimide, or combining monomers having low e values, such as vinyl ether and monomers having high e values, such as maleimide.

However, in a case where these charge transfer complex polymerization-based monomers are applied in actinic energy radiation curable ink jet inks, severe problems have been caused. That is, it is essential that the ink jet ink should be an ultra-low-viscosity liquid, as compared with a printing ink or composition for coating, usually irrespective of a piezo type, a thermal type, an antistatic system, or the like, since the ink jet ink cannot be stably discharged from the nozzles of an ink jet recording head. Further, if the viscosity of the ink changes to a great or small extent by the effects of storage for a long period of time or storage environment, the amount of the liquid droplets of the ink from the nozzles or the scattering speed of the liquid droplets of the ink are affected, and as a result, the precision of the printing is deteriorated, which leads to turbulence of the image. However, in the present situation, in the composition using CT polymerization-based compounds in the related art, the precision has not reached the level with respect to the storage stability of the ink jet ink, required for such an ink jet ink system.

In addition, by the investigation of the present inventors, it has been proved that sufficient strength cannot be ensured for a film formed from a CT polymerization type ink jet ink. In particular, in a case of using a light source having low illuminance, such as an LED, there is a tendency that the resistance to light, rain, or the like outdoors (weather resistance) is insufficient or the adhesion to a rigid substrate is insufficient. In a recent situation, there has been a desire for an actinic energy radiation curable ink which is cured with a smaller amount of light in the ink jet systems, and the CT polymerization type ink jet ink could not meet these requirements.

CITATION LIST

Patent Literature

PTL 1
Japanese Patent No. 3353020
PTL 2
Japanese Patent Application Laid-Open No. HEI 11-124403
PTL 3
Japanese Patent Application Laid-Open No. 2003-213171

Non-Patent Literature

NPL 1
Sonny Jonsson, et. al, Polymer Materials Sci. & Enginer. 1995, 72, 470-472

SUMMARY OF INVENTION

Technical Problem

The present invention has been made, taking the above-described problems into consideration, and it has an object to provide an ultraviolet ray curable ink jet ink composition which enables the formation of a high-quality image having excellent viscosity stability, curing sensitivity, discharge stability, and weather resistance when stored for a long period of time; an actinic energy radiation curable ink jet ink using the same; and an ink jet recording method using the ink jet ink.

Solution to Problem

The object of the present invention is accomplished by the following configurations.

(1) An actinic energy radiation curable ink jet ink composition containing at least two kinds of polymerizable monomers having unsaturated bonds, in which the maximum value of the difference in the charges of carbon atoms constituting each of the unsaturated bonds contained in the at least two kinds of polymerizable monomers is from 0.24 to 0.46, and the total content of the elemental ions of Fe, Co, Ca, Na, Mg, Al, Ti, Sn, and Zn is from 5.0 ppm to 100 ppm.

(2) The actinic energy radiation curable ink jet ink composition as described in (1), in which among the at least two kinds of polymerizable monomers, the polymerizable monomer having the maximum value of the charges of carbon atoms constituting the unsaturated bond is a compound represented by the following general formula (1) or (2), and the polymerizable monomer having the minimum value of the charges of carbon atoms constituting the unsaturated bond is a compound represented by the following general formula (3).

[Chem. 1]

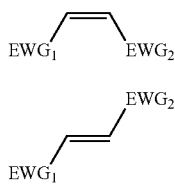

General Formula (1)

General Formula (2)

[wherein $EWG_1$ and $EWG_2$ each represent a partial structure having an electron withdrawing group directly linked to an unsaturated bond, and parts of $EWG_1$ or $EWG_2$ may be bonded to each other to form a cyclic structure, the electron withdrawing group represents a cyano group, a halogen group, a pyridyl group, a pyrimidyl group, a nitro group, a group represented by the following general formula (a), or a group represented by the following general formula (b), each of $EWG_1$ and $EWG_2$ may form a condensed ring or a ring via R as a linking group, in which R represents a linear alkylene group, a branched alkylene group, a cyclic alkylene group, an alkylene group having a hydroxyl group, an aryl group, or an arylalkylene group, and may further have a substituent, and parts of $EWG_1$ or $EWG_2$ may form a monofunctional polymerizable monomer having one unsaturated bond, or a polyfunctional polymerizable monomer having two or more unsaturated bonds via a linking group]

[Chem. 2]

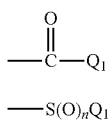

General Formula (a)

General Formula (b)

[wherein $Q_1$ represents OH, OR', NR'R", or R', R' and R" each represent a hydrogen atom, a linear alkylene group, a branched alkylene group, a cyclic alkylene group, an alkylene group having a hydroxyl group, an aryl group, or an arylalkylene group, and n represents 1 or 2]

[Chem. 3]

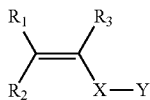

General Formula (3)

[wherein X represents —O—, —$NR_4$—, —S—, or —SO—,

Y represents a hydrogen atom, a linear alkyl group, a branched alkyl group, a cyclic alkyl group, an alkyl group having a hydroxyl group, an aryl group, or an arylalkyl group, and may further have a substituent, $R_1$, $R_2$, and $R_3$ each independently represent a hydrogen atom, a linear or branched alkyl group, a cyclic alkyl group, an alkyl group having a hydroxyl group, an aryl group, or an arylalkyl group, and may further have a substituent, and further, parts of $R_2$ or $R_3$ may be bonded to Y to form a cyclic structure, and parts of Y may form a monofunctional polymerizable monomer having one unsaturated bond, or a polyfunctional polymerizable monomer having two or more unsaturated bonds via a linking group].

(3) The actinic energy radiation curable ink jet ink composition as described in (2), in which the compound represented by the general formula (1) or (2) is at least one kind of compound selected from the following general formulae (A-1) to (A-13):

[Chem. 4]

General Formula (A-1)

General Formula (A-2)

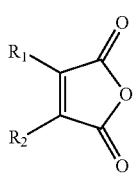

General Formula (A-3)

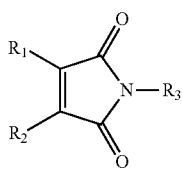

General Formula (A-4)

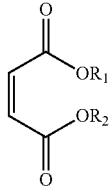

-continued

General Formula (A-5)
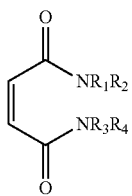

General Formula (A-6)
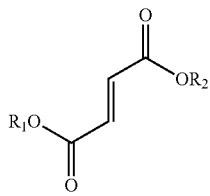

General Formula (A-7)
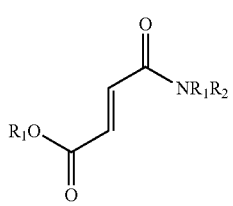

General Formula (A-8)
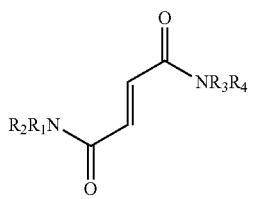

General Formula (A-9)
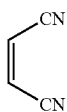

General Formula (A-10)
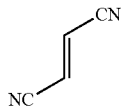

General Formula (A-11)
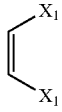

General Formula (A-12)
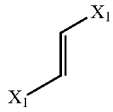

General Formula (A-13)
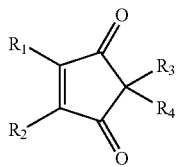

[wherein $R_1$, $R_2$, $R_3$, $R_4$ each independently represent a hydrogen atom, a linear or branched alkyl group, a cyclic alkyl group, an alkyl group having a hydroxyl group, an aryl group, or an arylalkyl group, and may further have a substituent and may be a linking group for forming a polyfunctional polymerizable compound having two or more unsaturated bonding moieties, and $X_1$ represents a halogen atom].

(4) The actinic energy radiation curable ink jet ink composition as described in (2) or (3), in which the compound represented by the general formula (3) is at least one kind of compound selected from the following general formulae (D-1) to (D-9):

[Chem. 5]

General Formula (D-1)
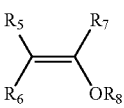

General Formula (D-2)
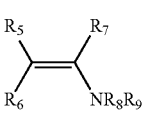

General Formula (D-3)
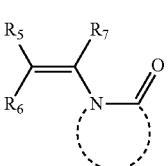

General Formula (D-4)
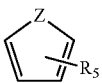

General Formula (D-5)
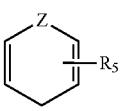

General Formula (D-6)
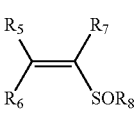

General Formula (D-7)
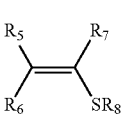

General Formula (D-8)
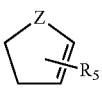

General Formula (D-9)
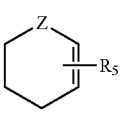

[wherein $R_5$ to $R_9$ each independently represent a hydrogen atom, a linear or branched alkyl group, a cyclic alkyl group, an alkyl group having a hydroxyl group, an aryl group, or an arylalkyl group, and may further have a substituent and may be a linking group for forming a polyfunctional polymerizable compound having two or more unsaturated bonding moieties, Z represents —O—, —N($R_{10}$)—, or —S—, $R_{10}$ represents a hydrogen atom, a linear alkyl group, a branched alkyl group, a cyclic alkyl group, an alkyl group having a hydroxyl group, an aryl group, or an arylalkyl group, and may further have a substituent].

(5) The actinic energy radiation curable ink jet ink composition as described in (3) or (4), in which
the compound represented by the general formula (1) or (2) is a compound represented by the general formula (A-1), (A-2), (A-3), or (A-6), and
the compound represented by the general formula (3) is a compound represented by the general formula (D-1), (D-2), or (D-3).

(6) An actinic energy radiation curable ink jet ink composition including at least two kinds of polymerizable monomers having unsaturated double bonds, in which
the difference in the e values of the unsaturated double bond portions contained in the at least two kinds of polymerizable compounds is from 2.8 to 6, and
a compound having a substituent capable of reacting with a nucleophilic agent which is non-polymerizable.

(7) The actinic energy radiation curable ink jet ink composition as described in (6), in which the nucleophilic agent is a compound containing a hydroxyl group or a carboxylic group.

(8) The actinic energy radiation curable ink jet ink composition as described in (6) or (7), in which the substituent capable of reacting with a nucleophilic agent is a group represented by the following general formula (8), (9), or (10):

[Chem. 6]

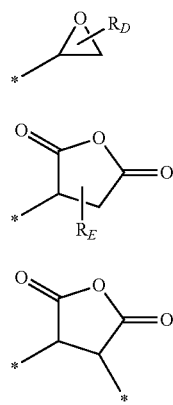

General Formula (8)

General Formula (9)

General Formula (10)

[in the general formula (8), $R_D$ represents a hydrogen atom or an alkyl group having 1 to 4 carbon atoms, and * represents a bonding site,
in the general formula (9), $R_E$ represents a hydrogen atom or an alkyl group having 1 to 4 carbon atoms, and * represents a bonding site, and
in the general formula (10), * represents a bonding site].

(9) An actinic energy radiation curable ink jet ink composition including at least two kinds of polymerizable compounds having an unsaturated double bond, in which
the difference in the e values of the unsaturated double bond moieties contained in at least two kinds of polymerizable compounds is from 2.8 to 6, and
the actinic energy radiation curable ink jet ink composition includes an acidic compound.

(10) The actinic energy radiation curable ink jet ink composition as described in (9), in which the acidic compound is an organic protonic acid.

(11) The actinic energy radiation curable ink jet ink composition as described in (9) or (10), in which the acidic compound is a photo acid generator.

(12) An actinic energy radiation curable ink jet ink including the actinic energy radiation curable ink jet ink composition as described in any one of (1) to (11), and a colorant.

(13) An ink jet recording method, in which image recording is carried out using the actinic energy radiation curable ink jet ink as described in (12).

Advantageous Effects of Invention

According to the present invention, there are provided an ultraviolet ray curable ink jet ink composition which enables the formation of a high-quality image having excellent viscosity stability, curing sensitivity, discharge stability, and weather resistance when stored for a long period of time; an actinic energy radiation curable ink jet ink using the same; and an ink jet recording method using the ink jet ink.

DESCRIPTION OF EMBODIMENTS

Figure 1:
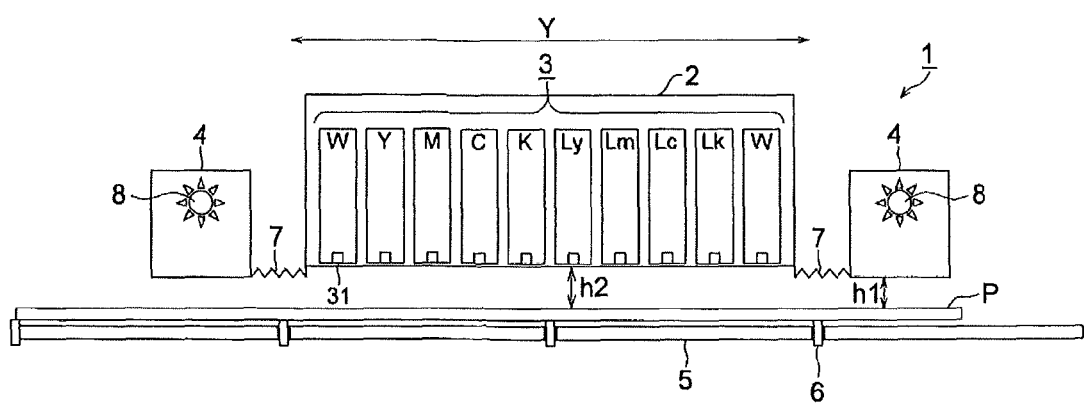
FIG. 1 is a front view showing an example of the constitution of a main section of an ink jet recording apparatus used in the ink jet recording method of the present invention.

Hereinafter, embodiments for carrying out the present invention will be described in detail.
<<Ink Jet Ink Composition>>
First, the respective components of the ink jet ink composition of the present invention will be described.
[e Value of Unsaturated Bonding Portion Contained in Polymerizable Compound]
The e value of the unsaturated bonding moiety contained in the polymerizable compound will be described. The concept of the Q-e is described in POLYMER HANDBOOK FOURTH EDITION Volume 1 (edited by J. BRANDRUP, E. H. IMMERGUT, and E. A. GRULKE, published in 1999, published by Wiley-Interscience Publications). Monomer reactivity ratios in radical copolymerization are summarized, and are known as semi-empirical theory for expectation. In the reference above, the e values are derived by calculation from the empirically obtained reactivity ratios r1 and r2 of the monomers, and shown. The e values of the polymerizable compound according to the present invention can be determined by the calculation equation described in the reference above. However, from the investigation of the present inventors, they can be substituted with the e value of a polymerizable compound including the same or similar structure. That is, by using the e value of the polymerizable compound including the same or similar structure to that of the unsaturated bonding moiety of the polymerizable compound according to the present invention, in which the e value has been already determined by the calculation even when the from r1 and r2 are known, the effect of the present invention will be explained. The ink composition of the present invention is characterized in that the difference in the e values of the at least two kinds of polymerizable compounds is from 2.8 to 6.0. If the difference in the e values is less than 2.8, it is difficult for CT polymerization to occur. Further, if the difference in the e values is more than 6.0, the charge transfer complex becomes stabilized, and thus, the polymerization rate is lower.

(Monomer Having High e Value)

The monomer having a high e value in the present invention is a polymerizable compound containing at least one unsaturated bonding moiety containing the same or similar structure to that of a polymerizable compound having a high e value, and refers to a monomer having a relatively high e value among the polymerizable compounds having at least two kinds of unsaturated bonds. The e value is preferably 1.0 or more, and more preferably 1.5 or more.

[Charge of Carbon Atoms of Unsaturated Bond]

The charge of the carbon atoms constituting the unsaturated bond in the polymerizable monomer according to the present invention refers to a charge on the atoms (atomic charge) in the ground state obtained by calculation based on a molecular orbital method theory. The charge on the carbon atoms of the unsaturated bond in the polymerizable monomer in the ground state is determined by calculation using a computer. In the present invention, as molecular orbital calculation software, SPARTAN'08 for Windows (registered trademark) is used, and as a calculation method, Equilibrium Geometry at Ground state with Hartree-Fock 3-21G in Vacuum can be used. The value of the charge is a Natural atomic charge.

The "carbon atoms constituting the unsaturated bond" in the monomer having a low electron density means carbon atoms having a higher value of charge between the two carbon atoms on the unsaturated bond with the bonded electron withdrawing group. The "carbon atoms constituting the unsaturated bond" in the monomer having a high electron density means carbon atoms having a lower value of charge between the two carbon atoms on the unsaturated bond with the bonded electron donating group. In a case where plural unsaturated bonds are present in one molecule of the polymerizable monomer, the "carbon atoms constituting the unsaturated bonds" refers to an average value of the charges of the respective carbon atoms constituting the unsaturated bond.

The maximum value of the difference in the charges of the carbon atoms of the unsaturated bonds contained in at least two kinds of polymerizable monomers is characterized by being from 0.24 to 0.46. If the maximum value of the difference in the charges is 0.24 or more, CT polymerization easily occurs. Further, if the maximum value of the difference in the charges is 0.46 or less, the charge transfer complex is not excessively stabilized, and thus, the polymerization rate increases sufficiently.

(Monomer Having Low Electron Density)

The monomer having a low electron density is a monomer having an electron-deficient unsaturated bond. The value of the charge (atomic charge) of the carbon atoms constituting the unsaturated bond in the monomer having a low electron density is preferably −0.3 or more, and more preferably −0.28 or more.

In the ink composition of the present invention, the monomer having a maximum e value among the polymerizable compounds having at least two kinds of unsaturated bonds or the monomer having a low electron density is preferably an unsaturated compound represented by the general formula (1) or (2).

In the general formula (1) or (2), $EWG_1$ and $EWG_2$ each represent a partial structure having an electron withdrawing group directly linked to an unsaturated bond. Parts of $EWG_1$ or $EWG_2$ may be bonded to each other to form a cyclic structure. The electron withdrawing group represents a cyano group, a halogen group, a pyridyl group, a pyrimidyl group, a nitro group, a group represented by the following general formula (a), or a group represented by the following general formula (b).

Furthermore, $EWG_1$ and $EWG_2$ may be bonded to each other to form an electron withdrawing linking group shown below, thereby forming a ring structure. Examples of the electron withdrawing linking group include —CO—O—CO—, —CO—N($R_X$)—CO—, —S(O)$_n$—O—CO—, —S(O)$_n$—N(R)—CO—, —S(O)$_n$—O—S(O)$_n$—, and —S(O)$_n$—N($R_X$)—S(O)$_n$—.

$EWG_1$ and $EWG_2$ may form a cyclic structure via a linking group such as a linear alkylene group, a branched alkylene group, a cyclic alkylene group, an alkylene group, an arylene group, and an arylalkylene group having a hydroxyl group, and may further have a substituent. Further, parts of $EWG_1$ or $EWG_2$ may form a polyfunctional polymerizable compound having two or more unsaturated bonding moieties via a linking group.

In the general formulae (a) and (b), $Q_1$ represents OH, OR', NR'R'', or R'. R' and R'' each represent a hydrogen atom, a linear alkyl group, a branched alkyl group, a cyclic alkyl group, an alkyl group having a hydroxyl group, an aryl group, or an arylalkyl group, and may further have a substituent.

Examples of the unsaturated compound represented by the general formula (1) or (2) include a vinylenimide compound, a vinylene dicarboxylic acid, a vinylene dicarboxylic acid ester, a vinylene monocarboxylic acid amide monocarboxylic acid, a vinylene monocarboxylic acid amide monocarboxylic acid ester, a vinylene dicarboxylic acid amide, a vinyleneni-trile compound substituted with nitrile groups at both ends of the vinylene skeleton, a halogenated vinyl compound substituted with halogen groups at both ends of the vinylene skeleton, a vinylene diketone compound substituted with carbonyl at both ends of the vinylene skeleton, a vinylene dithiocarboxylic acid anhydride, a vinylenethioimide compound, a vinylene dithiocarboxylic acid, a vinylene dithiocarboxylic acid ester, a vinylene monothiocarboxylic acid amide monothiocarboxylic acid, a vinylene monothiocarboxylic acid amide monothiocarboxylic acid ester, a vinylene dithiocarboxylic acid amide, a compound substituted with pyridyl groups at both ends of the vinylene skeleton, and a compound structure substituted with pyrimidyl groups at both ends of the vinylene skeleton, but are not limited thereto.

Among these, preferable examples of the unsaturated compound include vinylenimides such as maleic anhydride and maleimide, vinylene dicarboxylic acids such as maleic acid and fumaric acid, and vinylene dicarboxylic acid esters such as maleic acid ester and fumaric acid ester.

Furthermore, in the present invention, the unsaturated compound represented by the general formula (1) or (2) is preferably at least one kind of unsaturated compound selected from the general formulae (A-1) to (A-13).

In the general formulae (A-1) to (A-13), $R_1$, $R_2$, $R_3$, and $R_4$ each independently represent a hydrogen atom, a linear or branched alkyl group, a cyclic alkyl group, an alkyl group having a hydroxyl group, an aryl group, or an arylalkyl group. They may further have substituents, and may be linking groups for forming a polyfunctional polymerizable compound having two or more unsaturated bonding moieties. $X_1$ represents a halogen atom.

The unsaturated compound represented by the general formula (1) or (2) according to the present invention is preferably an unsaturated compound represented by the general formula (A-1), (A-2), (A-3), or (A-6), among the unsaturated compounds represented by the general formulae (A-1) to (A-13).

The e values of the unsaturated bonding moieties of the polymerizable compounds represented by the general formulae (A-1) to (A-13) are shown below. Further, the following e values are found in POLYMER HANDBOOK FOURTH EDITION Volume 1 (edited by J. BRANDRUP, E. H.

IMMERGUT, and E. A. GRULKE, published in 1999, published by Wiley-Interscience Publications).

1) General formula (A-1): e value 3.69 (the value of maleic anhydride is substituted)
2) General formula (A-2): e value 3.70 (in a case where $R_1$ is aliphatic; the value of N-butylmaleimide is substituted), e value 3.24 (in a case where $R_1$ is aromatic; the value of N-phenylmaleimide is substituted)
3) General formula (A-3): e value 1.08 (the value of diethyl maleate is substituted)
4) General formula (A-6): e value 2.26 (the value of diethyl fumarate is substituted)
5) General formula (A-10): e value 2.73 (the value of fumaronitrile is substituted)
6) General formula (A-13): e value 2.23 (the value of 4-cyclopentene-1,3-dione is substituted)

The unsaturated compounds represented by the general formulae (A-1) to (A-13) will be described below, but are not limited thereto. All of the charges of carbon atoms of the unsaturated bonds contained in the unsaturated compounds as described later are represented by a value of −0.3 or more. Examples of the compound containing vinylenimide include maleimide, N-methylmaleimide, N-ethylmaleimide, N-butylmaleimide, N-2-ethylhexylmaleimide, N-dodecylmaleimide, N-octadecylmaleimide, N-phenylmaleimide, N-cyclohexylmaleimide, N-(p-carbomethoxyphenyl)maleimide, 4,4'-dimaleimidebisphenol F, N-butylmaleimide, N-(2-chlorophenyl)maleimide, N-(4-chlorophenyl)maleimide, and 2,3-dimethyl-1-N-(2-methacryloxyethylmaleimide; examples of the vinylene dicarboxylic acid include maleic acid and fumaric acid, examples of the vinylene dicarboxylic acid ester include dimethyl maleate, diethyl maleate, diisopropyl maleate, di-n-butyl maleate, di-tert-butyl maleate, di(2-ethylhexyl) maleate, dimethyl fumarate, diethyl fumarate, diisopropyl fumarate, di-n-butyl fumarate, di-tert-butyl fumarate, and di(2-ethylhexyl) fumarate, but are not limited to these specific examples in any case.

Furthermore, in order to obtain a preferable polyfunctional polymerizable monomer having an unsaturated bond, the polyfunctional polymerizable monomer can be obtained using various linking group skeletons known in the related art. Examples thereof include the polyfunctional maleimide derivatives such as those described in U.S. Pat. No. 6,034,150 and Japanese Patent Application Laid-Open No. HEI 11-124403.

Hereinafter, the maleimide derivative that can be preferably used in the actinic energy radiation curable ink jet ink composition will be described in detail.

The maleimide compound according to the present invention is preferably a maleimide compound having a chiral structure in the molecule, from the viewpoints of solubility, low viscosity, and discharge stability required for the ink jet ink composition.

In the present invention, the maleimide compound having a chiral group is not particularly limited as long as it has at least one or more chiral carbon atoms in the molecule, but this preferable maleimide compound is preferably a compound represented by the following general formula (M).

                                       General Formula (M)

In the general formula (M), $Z_1$ and $Z_2$ represent a maleimide group which may have a substituent, a hydrogen atom, a hydroxyl group, an alkoxy group, an oxycarbonyl group, an alkyloxycarbonyl group, or an amino group which may have a substituent. However, at least one of $Z_1$ and $Z_2$ represents a maleimide group.

Examples of the substituent of the maleimide group include alkyl groups having 1 to 6 carbon atoms (for example, a methyl group, an ethyl group, a propyl group, a butyl group, and a hexyl group). Further, the substituents may be bonded to each other to form a cyclopropylene ring, a cyclobutylene ring, a cyclopentene ring, a cyclohexene ring, or the like.

$Z_1$ and $Z_2$ represent, in addition to the maleimide group, a hydrogen atom, a hydroxyl group, preferably, alkoxy groups having 1 to 8 carbon atoms (for example, a methoxy group, a propoxy group, and a 2-ethylhexyloxy group), an oxycarbonyl group, preferably alkyloxycarbonyl groups having 1 to 8 carbon atoms (for example, a methoxycarbonyl group, an ethoxycarbonyl group, an isobutoxycarbonyl group, and a hexylcarbonyl group), an amino group which may have a substituent (for example, an amino group, a methylamino group, and a 2-hydroxyethylamino group), or the like.

$Y_1$, $Y_3$, and $Y_5$ represent a divalent organic linking group formed by combination of groups selected from an alkylene group, an alkyleneoxy group, a phenylene group, an ester group, an ether group, and a thioether group, and $Y_2$ and $Y_4$ represent a divalent group having an asymmetric carbon atom. n1, n2, n3, n4, and n5 represent 0 or 1. However, n1+n3+n5 represents an integer of 0 to 3, and n2+n4 represents 1 or 2.

Examples of the divalent organic linking group represented by $Y_1$, $Y_3$, and $Y_5$ include alkylene groups (for example, a methylene group, an ethylene group, a butylene group, and a hexylene group), alkyleneoxy groups (for example, an ethyleneoxy group, a polyethyleneoxy group, a butyleneoxy group, and a polybutyleneoxy group), alkyleneoxycarbonyl groups (for example, an ethyleneoxycarbonyl group and a hexyleneoxycarbonyl group), alkylene ester groups (for example, a methylene ester group and a hexylene ester group), phenylene groups (for example, a methylphenylene group), an oxycarbonylphenylenecarbonyloxy group, a carbonyloxyphenyleneoxycarbonyl group, an ether group, and a thioether group.

$Y_2$ and $Y_4$ represent a divalent group having an asymmetric carbon atom (chiral carbon atom). Specific examples thereof include those as follows.

[Chem. 7]

wherein $X_2$ represents an alkyl group having 1 to 18 carbon atoms, an alkenyl group having 1 to 18 carbon atoms, an oxyalkyl group having 1 to 18 carbon atoms, an alkyloxycarbonyl group having 1 to 18 carbon atoms, or a hydroxyl group, preferably, an alkyl group having 1 to 4 carbon atoms (for example, a methyl group, an ethyl group, a propyl group, and an isobutyl group), an oxyalkyl group having 1 to 4 carbon atoms (for example, a methoxy group and an isopropoxy group), an alkyloxycarbonyl group having 1 to 6 carbon atoms (for example, a methoxycarbonyl group, an ethoxycarbonyl, an isobutoxycarbonyl group, and a hexylcarbonyl group).

Among these maleimide compounds having a chiral group, a structure having a chiral carbon atom directly bonded to the maleimide group is particularly preferable. For example, in the general formula M, either or both of n1 and n5 are preferably 0.

For jetting from an ink jet head, the molecular weight of the maleimide compound having a chiral group is from 200 to 1000, preferably from 300 to 800, and more preferably from 400 to 700. If the molecular weight is less than 200, crystallization easily occurs and clogging easily occurs at the time of jetting. Further, if the molecular weight is more than 1000, the viscosity increases, and thus, jetting becomes difficult. In addition, since the crosslinking degree of the image formed decreases, the durability outdoors which is an effect of the present invention tends to be deteriorated.

Moreover, the preferable maleimide compound is preferably a compound represented by the following general formula (M').

[Chem. 8]

General Formula (M')

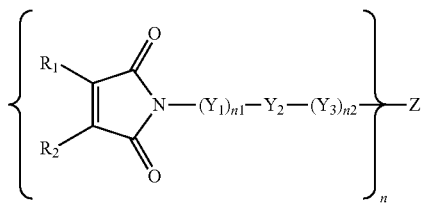

In the general formula (M'), $R_1$ and $R_2$ each independently represent a hydrogen atom or an alkyl group having 1 to 6 carbon atoms, and $R_1$ and $R_2$ may form a ring. $Y_1$, $Y_3$, and Z represent a divalent organic linking group formed by the combination of groups selected from an alkylene group, an alkyleneoxy group, a phenylene group, an ester group, an ether group, and a thioether group, and $Y_2$ represents a divalent group having an asymmetric carbon atom. n represents an integer of 1 to 6; n1 represents 0 or 1; and n2 represents 0 or 1.

Examples of the alkyl groups represented by $R_1$ and $R_2$ include a methyl group, an ethyl group, a propyl group, a butyl group, and a hexyl group. Further, $R_1$ and $R_2$ may be bonded to each other to form a cyclopropylene ring, a cyclobutylene ring, a cyclopentene ring, a cyclohexene ring, or the like.

Examples of the divalent organic linking groups represented by $Y_1$ and $Y_3$ include alkylene groups (for example, a methylene group, an ethylene group, a butylene group, and a hexylene group), alkyleneoxy groups (for example, an ethyleneoxy group, a polyethyleneoxy group, a butyleneoxy group, and a polybutyleneoxy group), alkyleneoxycarbonyl groups (for example, an ethyleneoxycarbonyl group and a hexyleneoxycarbonyl group), alkylene ester groups (for example, a methylene ester group, a hexylene ester group, and a phenylene group), phenyl groups (for example, a methylphenylene group, an oxycarbonylphenylenecarbonyloxy group, and a carbonyloxyphenyleneoxycarbonyl group.

$Y_2$ represents a divalent group having an asymmetric carbon atom (chiral carbon atom).

Specific examples thereof include the following formula.

[Chem. 9]

In the formula, X represents an alkyl group having 1 to 18 carbon atoms, an alkenyl group having 1 to 18 carbon atoms, an alkyloxy group having 1 to 18 carbon atoms, an alkylcarbonyloxy group having 1 to 18 carbon atoms, or a hydroxyl group; preferably a methyl group, an ethyl group, a propyl group, or an isobutyl group, having 1 to 4 carbon atoms.

Z represents an n-valent linking group. In the case of n=1, Z represents a hydrogen atom, an alkyl group (a methyl group, an ethyl group, or a hexyl group), a hydroxyl group, a carboxyl group, or an alkyl ester group. In the case of n=2, Z has the same meanings as the divalent organic linking groups represented by $Y_1$ and $Y_3$. In the case of n=3, Z represents a glycerin group, a trimethylolalkyl group, and a triazine group. In the case of n=4, Z represents a pentaerythritol group, and in the case of n=6, Z represents a bistrimethylolalkyl group.

As described above, the molecular weight of the maleimide compound having a chiral group is preferably from 200 to 1000, and more preferably from 200 to 800.

Still more preferably, maleimide compounds represented by the following structural formulae may be listed.

[Chem. 10]

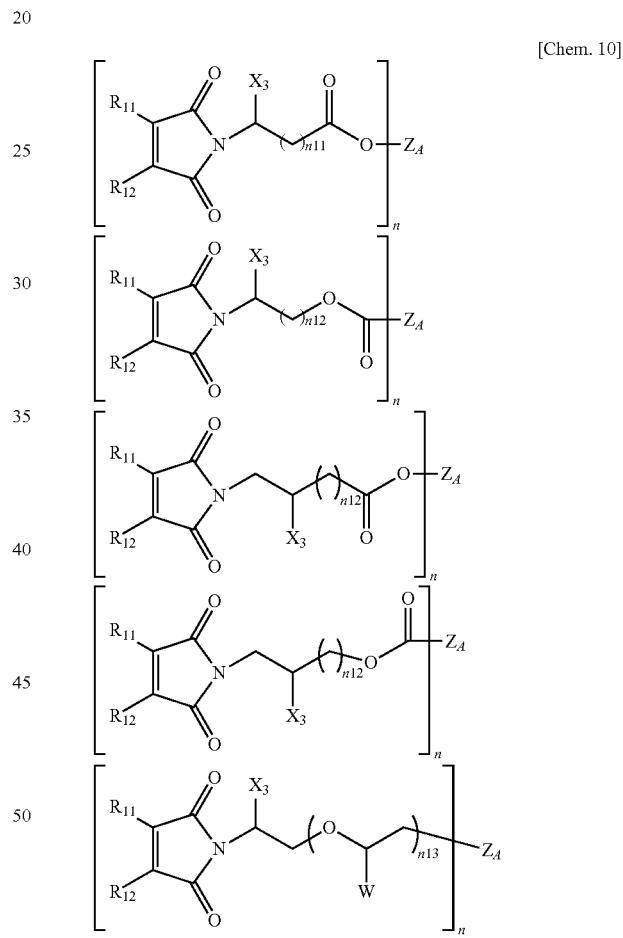

Herein, n11 and n12 are each preferably an integer of 0 to 6, and n13 is preferably an integer of 1 to 30. Examples of $R_{11}$ and $R_{12}$ include a hydrogen atom, and alkyl groups having 1 to 6 carbon atoms (for example, a methyl group, an ethyl group, a propyl group, a butyl group, and a hexyl group). Further, they may be bonded to each other to form a cyclopropylene ring, a cyclobutylene ring, a cyclopentene ring, or a cyclohexene ring. $Z_A$ represents an n-valent linking group. Preferably, n is any one of 1 to 4. In the case of n=1, $Z_A$ represents a hydrogen atom, an alkyl group (a methyl group, an ethyl group, or a hexyl group), a hydroxyl group, a carboxylic group, an alkylester group, or the like, and in the case of n=2, $Z_A$ represents a simple bond, an alkylene group having 1 to 18 carbon atoms, an alkenylene group having 1 to 18 carbon atoms, an oxyalkylene group having 1 to 18 carbon atoms, an alkyloxycarbonyl group having 1 to 18 carbon atoms, or the like. $X_3$ has the same meaning as $X_2$ above. W represents a hydrogen atom or a methyl group.

Specific examples of the compound represented by the general formula (M) are shown below, but the present invention is not limited thereto.

[Chem. 11]

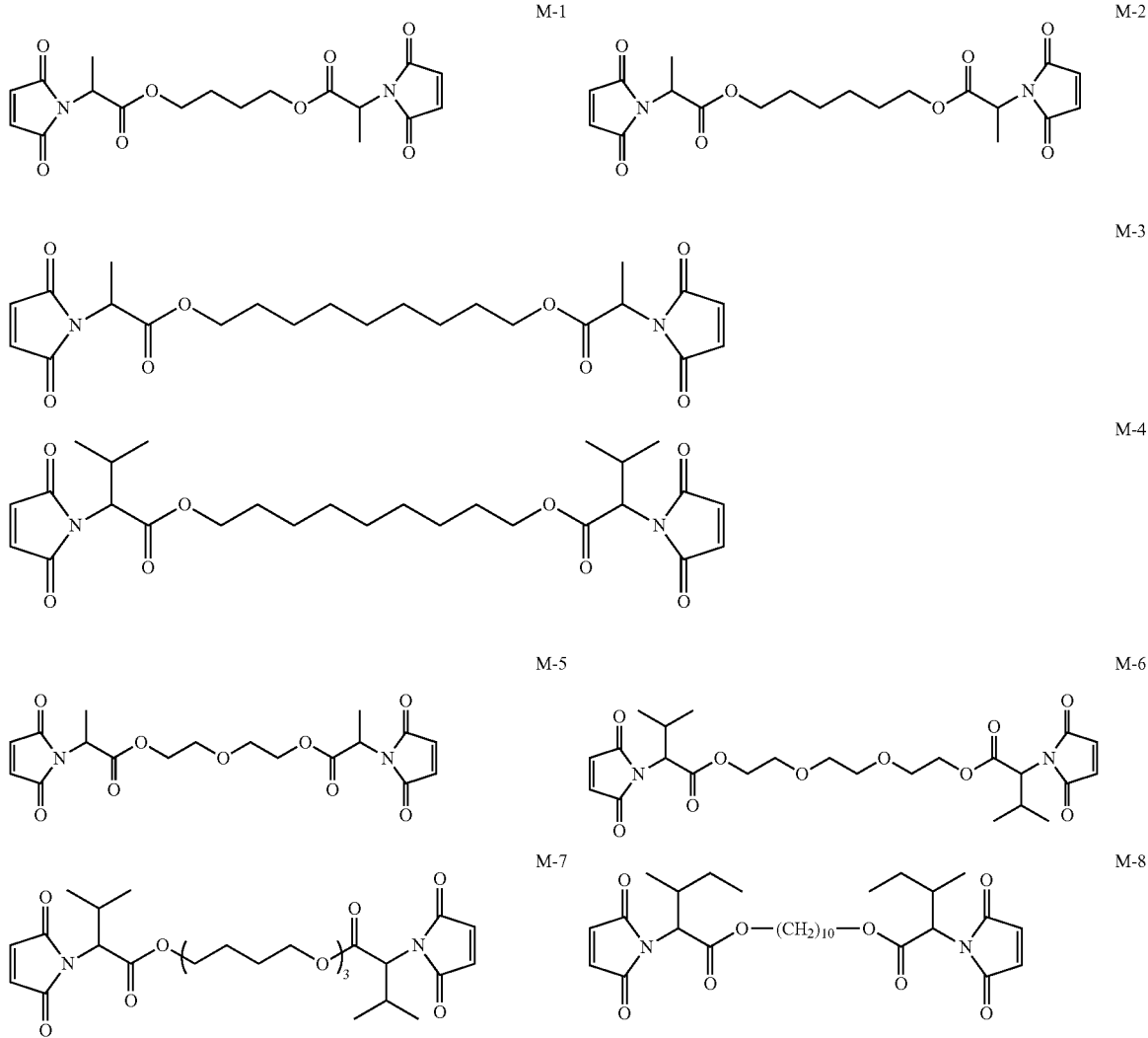

[Chem. 12]

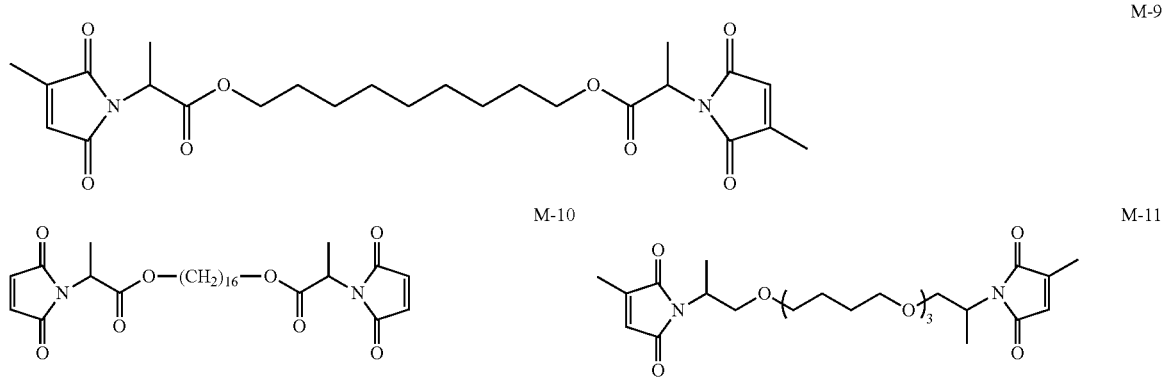

-continued
M-12
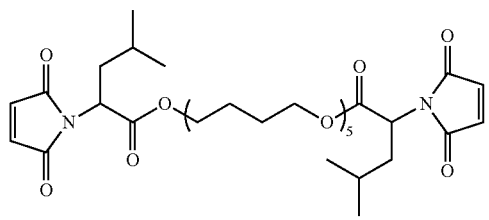
M-13
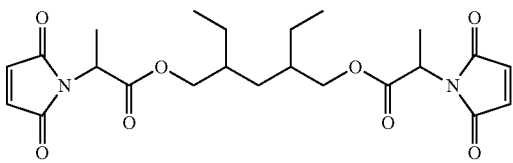
M-14
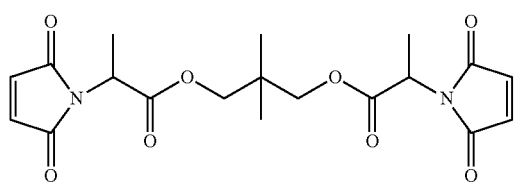
M-15
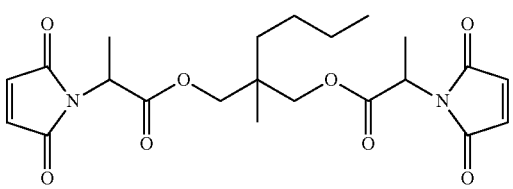
M-16
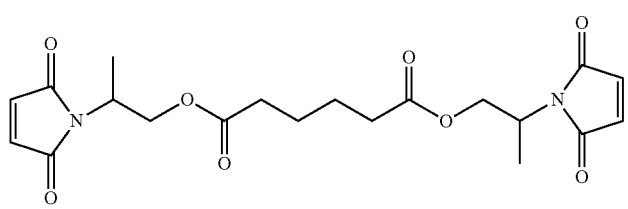
[Chem. 13]
M-17
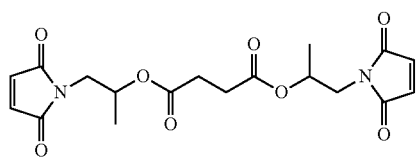
M-18
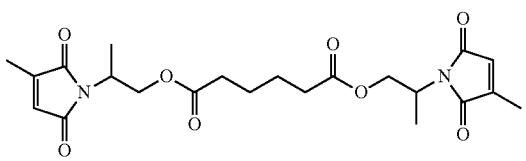
M-19
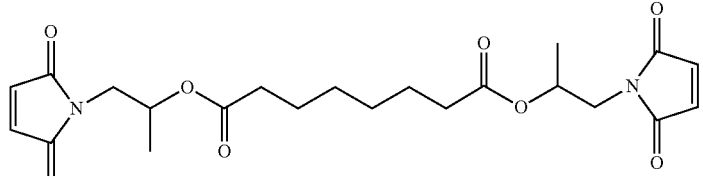
M-20
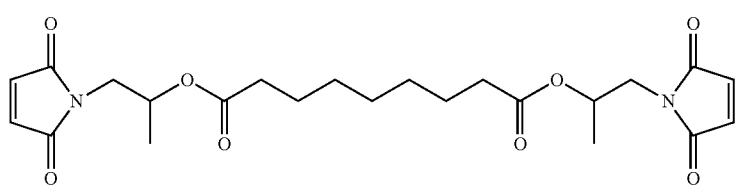
M-21
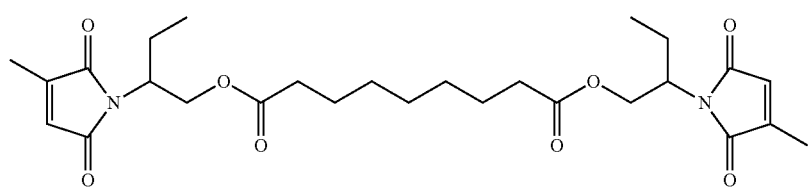
M-22
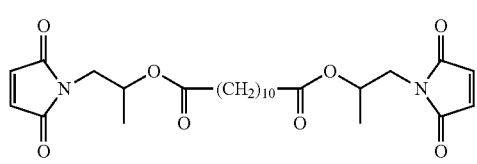
M-23
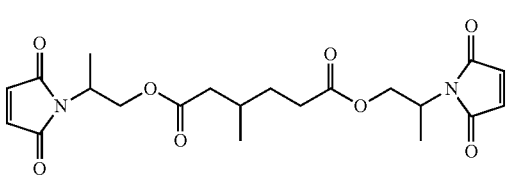

-continued
M-24
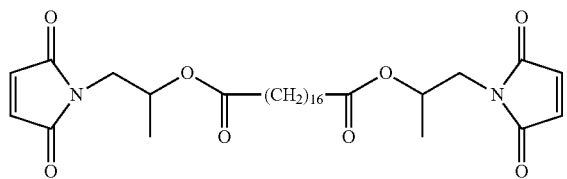
[Chem. 14]
M-25
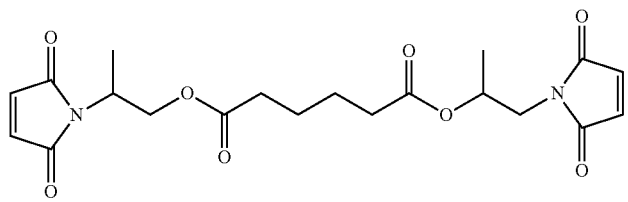
M-26
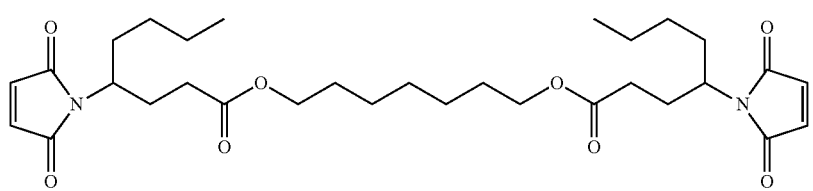
M-27
M-28
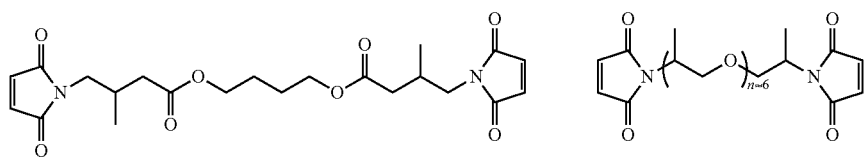
M-29
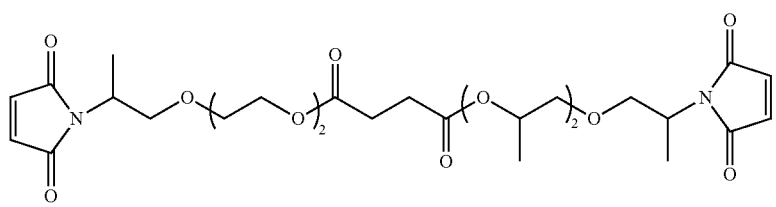
M-30
M-31
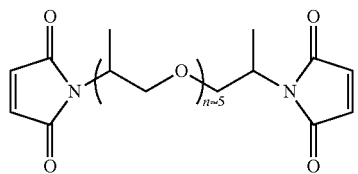
M-32
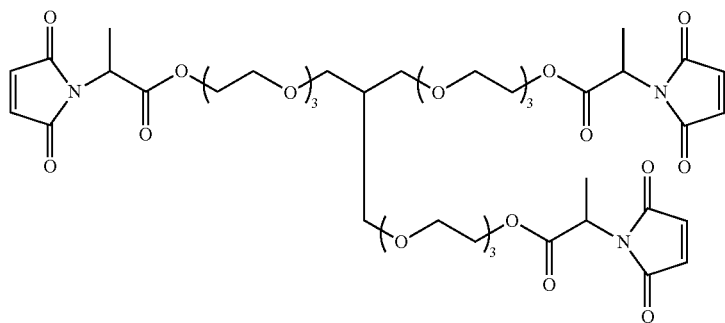

-continued
[Chem. 15]
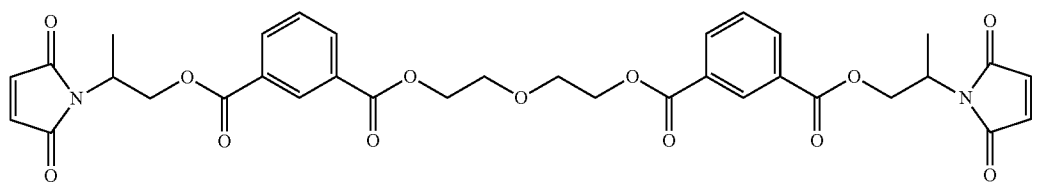
M-33
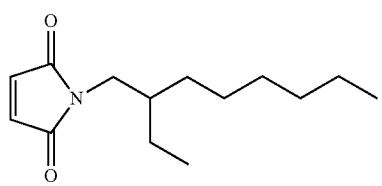
M-34
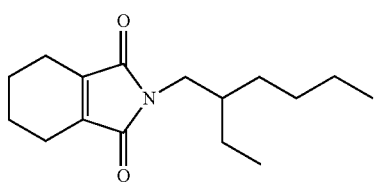
M-35
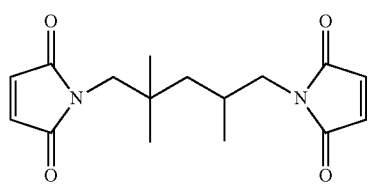
M-36
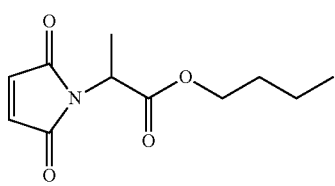
M-37
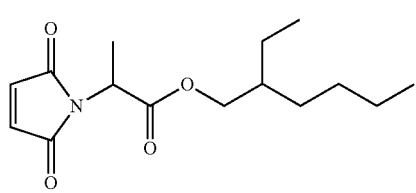
M-38
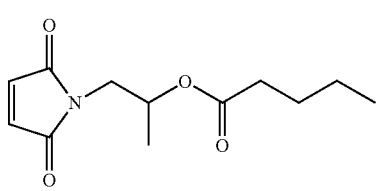
M-39
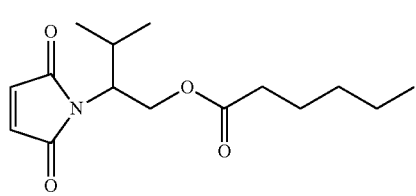
M-40
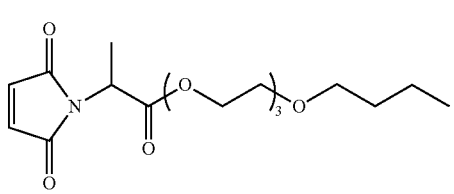
M-41
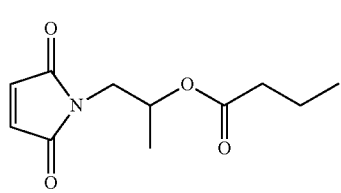
M-42
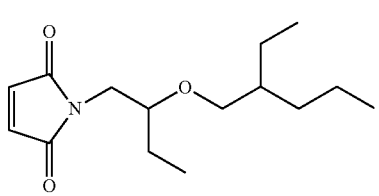
M-43
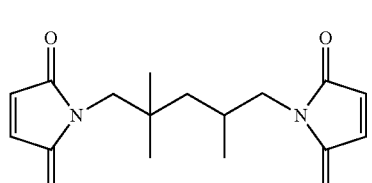
M-44
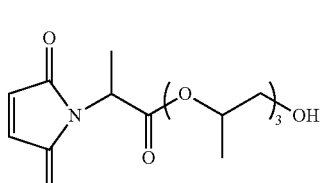
M-45

The synthesis methods for these maleimide compounds are well-known. For example, the maleimide compounds can be easily synthesized according to the method disclosed in Japanese Patent Application Laid-Open No. HEI 11-124403 or Macromolecular Chemical and Physics, 2009, 210, 269-278.

A more preferable maleimide derivative that can be applied in the ink composition of the present invention can be a maleimide derivative represented by the following general formula (I) from the viewpoints of low viscosity, solubility, and discharge stability.

[Chem. 16]

General Formula (I)

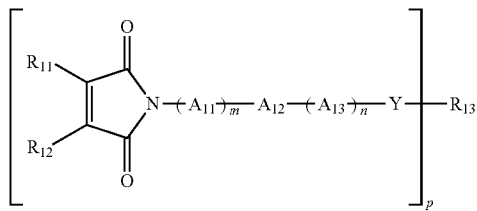

In the general formula (I), $R_{11}$ and $R_{12}$ each independently represent a hydrogen atom or an alkyl group having 1 to 6 carbon atoms, $R_{11}$ and $R_{12}$ may be bonded to each other to form a ring. $A_{11}$ and $A_{13}$ each independently represent an alkylene group, and $A_{12}$ represents a trivalent hydrocarbon group having an asymmetric center. Y represents carbonyloxy (—C=O—O—) or oxycarbonyl (—O—C=O—). p represents 1 or 2. In the case where p is 1, $R_{13}$ represents an alkyl group or alkyleneoxy group having a molecular weight of 15 to 600, and in the case where p is 2, $R_{13}$ represents an alkylene group or alkyleneoxy group having a molecular weight of 14 to 600. m represents 0 or 1 and n represents 0 or 1.

In the general formula (I), examples of the alkyl group represented by $R_{11}$ and $R_{12}$ include a methyl group, an ethyl group, a propyl group, a butyl group, and a hexyl group. Further, $R_{11}$ and $R_{12}$ may be bonded to each other to form a cyclopropene ring, a cyclobutylene ring, a cyclopentene ring, a cyclohexene ring, or the like.

Examples of the divalent organic linking groups represented by $A_{11}$ and $A_{13}$ include a methylene group, an ethylene group, a butylene group, a hexylene group, an ethyleneoxy group, a polyethyleneoxy group, a butyleneoxy group, a polybutyleneoxy group, an ethyleneoxycarbonyl group, a hexyleneoxycarbonyl group, a methylene ester group, a hexylene ester group, a phenylene group, a methylphenylene group, an oxycarbonylphenylenecarbonyloxy group, and a carbonyloxyphenyleneoxycarbonyl group.

$A_{12}$ represents a trivalent group having an asymmetric carbon atom (chiral carbon atom).

Further, in a preferable example of the general formula (I), $A_{11}$ and $A_{13}$ are methylene groups, $A_{12}$ is —CHR$_{14}$—, and $R_{13}$ is an alkyl group or alkylene group having 2 to 12 carbon atoms. Herein, $R_{14}$ represents an alkyl group having 1 to 12 carbon atoms, an alkenyl group having 1 to 18 carbon atoms, an alkyloxy group having 1 to 18 carbon atoms, an alkylcarbonyloxy group having 1 to 18 carbon atoms, or a hydroxyl group; and preferably an alkyl group having 1 to 4 carbon atoms (a methyl group, an ethyl group, a propyl group, an isobutyl group, and the like).

The alkylene group having a molecular weight of 15 to 600, represented by $R_{13}$, in the case where p is 1, represents a linear or branched alkylene group having 1 to 18 carbon atoms, and specific examples thereof include a methyl group, an ethyl group, a propyl group, a butyl group, a hexyl group, a neopentyl group, a dodecylene group, and a 2,2,4-octyl group.

The alkylene group having a molecular weight of 14 to 600, represented by $R_{13}$, with p being 2 or more, represents a linear or branched alkylene group having 1 to 18 carbon atoms, and specific examples thereof include a methylene group, an ethylene group, a propylene group, a butylene group, a hexylene group, a neopentylene group, a dodecylene group, and a 2,2,4-octylene group.

Examples of the alkyleneoxy group represented by $R_{13}$, in the case where p is 1, include a hydroxy or alkoxypolyethyleneoxy group, a hydroxy or alkoxypolypropyleneoxy group, and a hydroxy or alkoxypolybutyleneoxy group, but are not limited thereto.

Preferably $R_{13}$ is a linear or branched alkylene group having 1 to 18 carbon atoms or a linear or branched alkyl group having 1 to 18 carbon atoms, and more preferably a linear or branched alkylene group having 4 to 12 carbon atoms or a linear or branched alkyl group having 4 to 12 carbon atoms.

More preferable examples of the maleimide derivative include maleimide derivatives represented by the following general formulae (II) to (IV).

[Chem. 17]

General Formula (II)

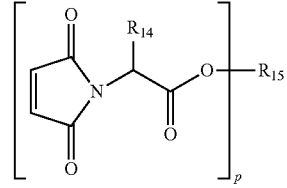

General Formula (II)

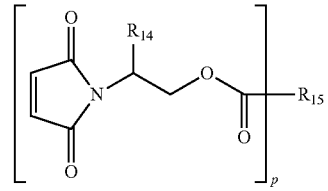

General Formula (IV)

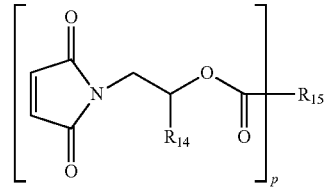

In the general formulae (II) to (IV), $R_{14}$ represents an alkyl group having 1 to 12 carbon atoms, an alkenyl group having 1 to 18 carbon atoms, an alkyloxy group having 1 to 18 carbon atoms, an alkylcarbonyloxy group having 1 to 18 carbon atoms, or a hydroxyl group; and preferably an alkyl group having 1 to 4 carbon atoms (a methyl group, an ethyl group, a propyl group, an isobutyl group, and the like). p represents 1 or 2. $R_{15}$ represents a linear alkyl group or alkylene group having 4 to 12 carbon atoms.

Specific examples of the maleimide derivative represented by the general formula (I) of the present invention are shown below.

[Chem. 18]
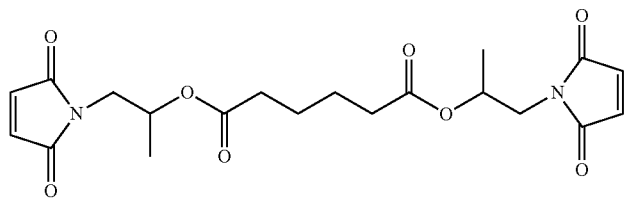
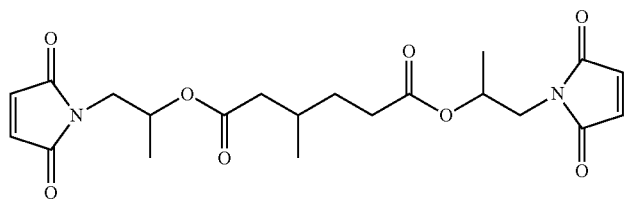
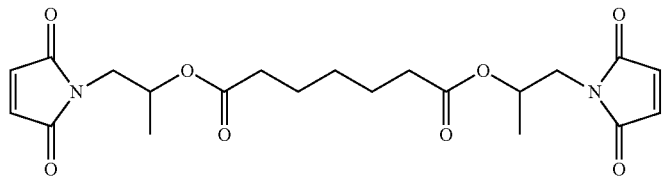
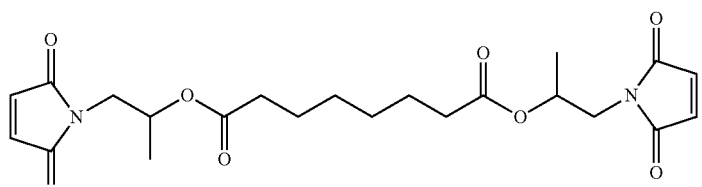
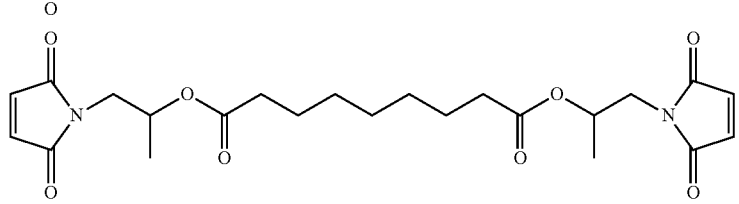
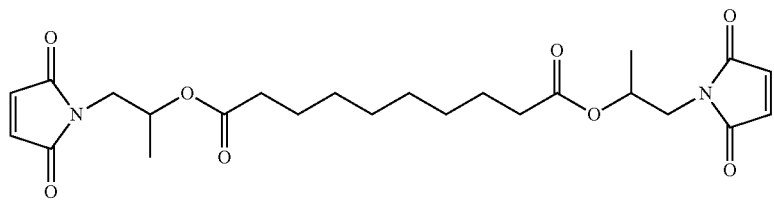
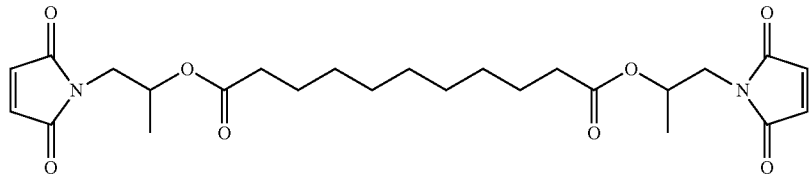
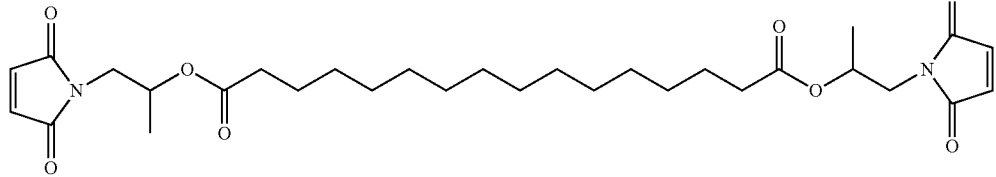

-continued
[Chem. 19]
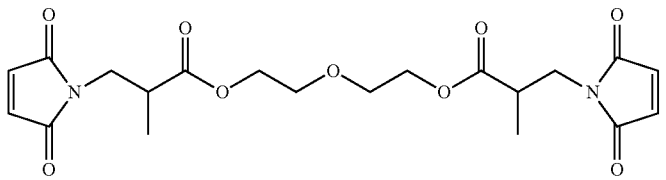
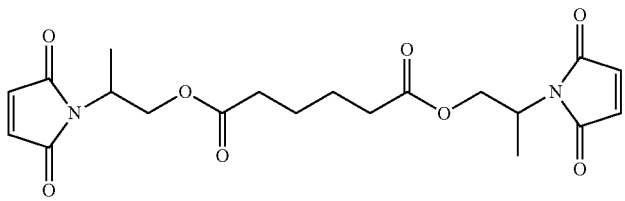
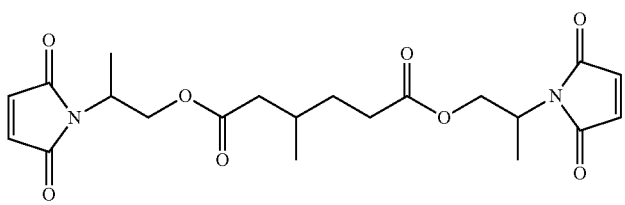
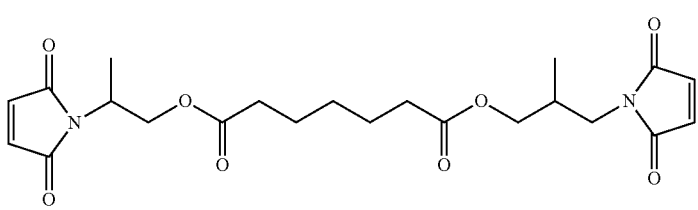
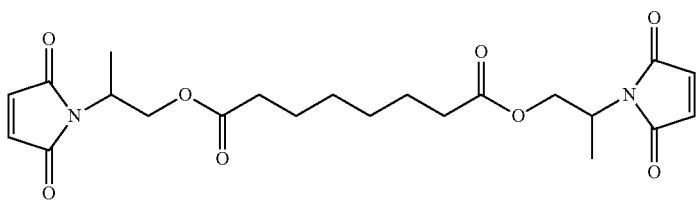
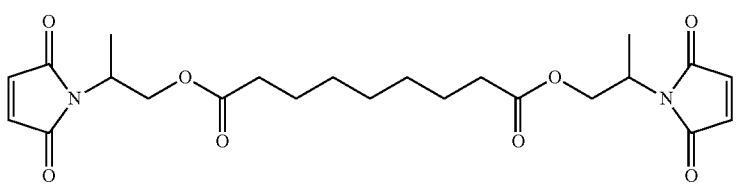
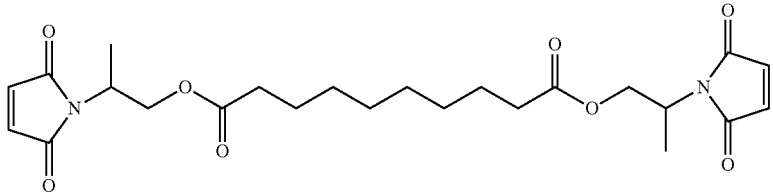
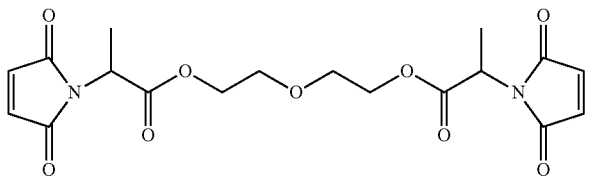

-continued
[Chem. 20]
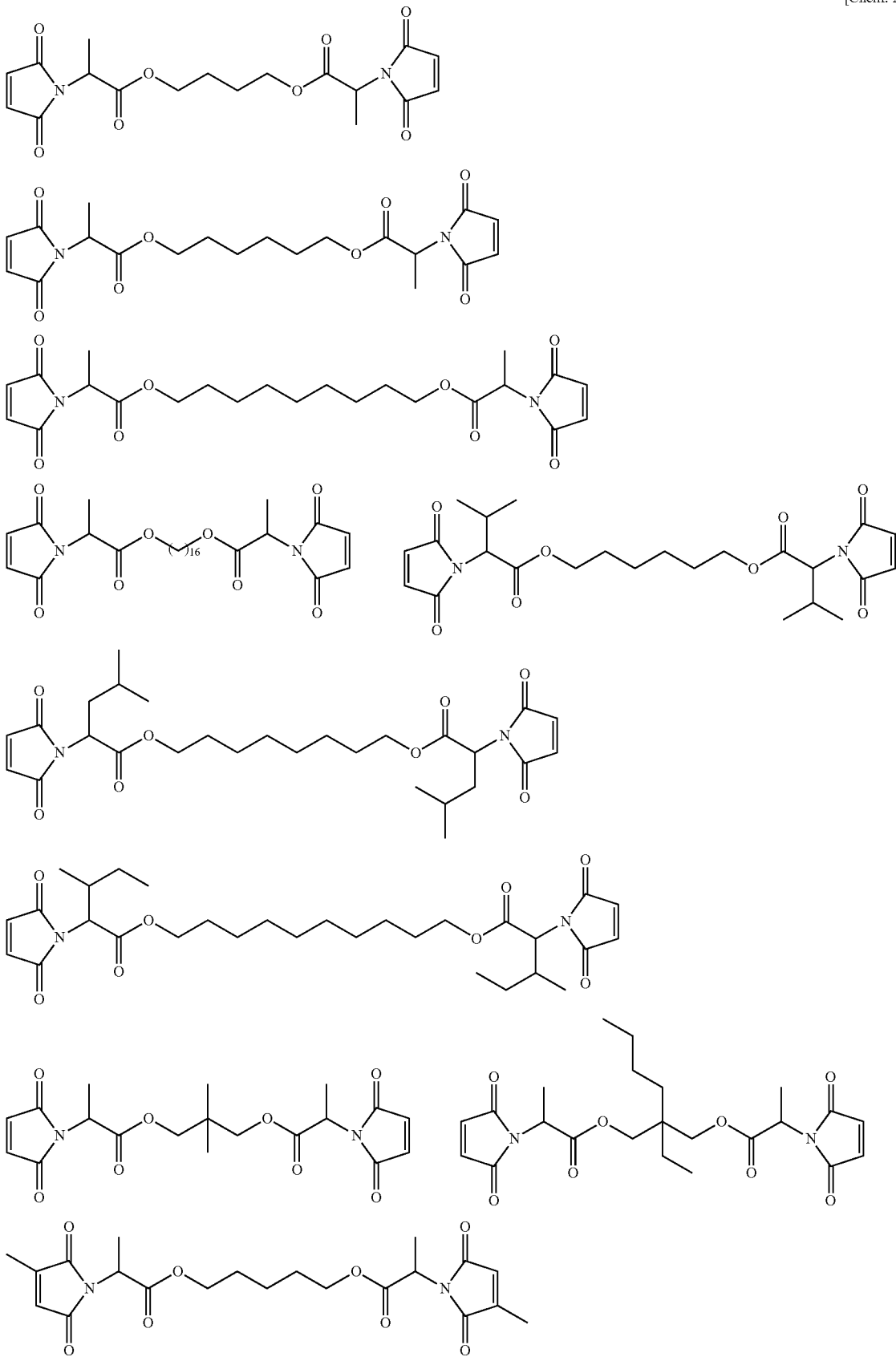

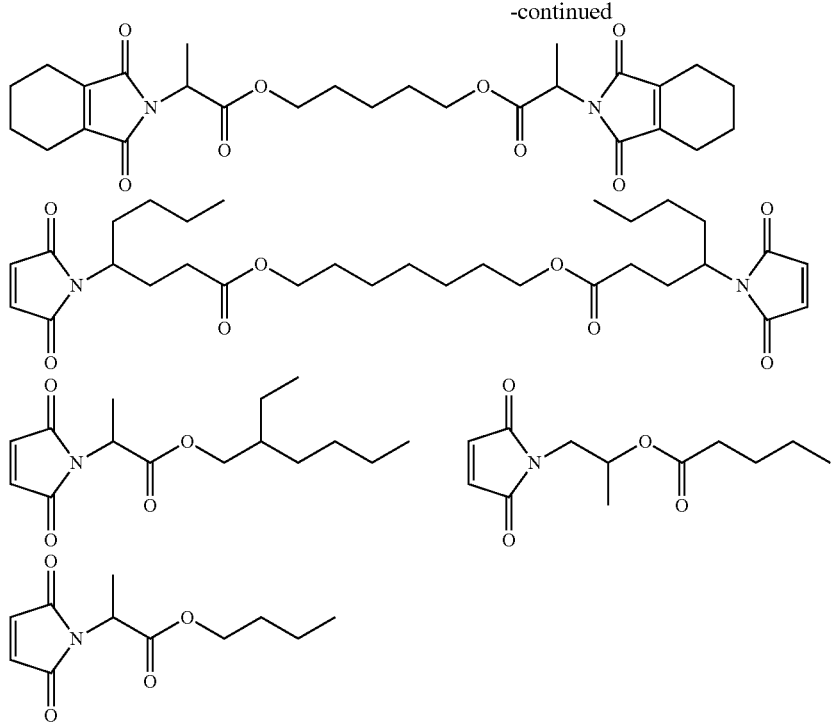

The monomer having a low electron density as described above is preferably maleic anhydride, maleic acid, fumaric acid, maleic acid esters, fumaric acid esters, maleimide compounds, or the like, from the viewpoints of high sensitivity.

(Monomer Having Low e Value or Monomer Having High Electron Density)

The monomer having a low e value in the present invention is a polymerizable compound containing at least one unsaturated bonding moiety containing the same or similar structure to that of a polymerizable compound having a low e value, and refers to a monomer having a relatively low e value among the polymerizable compounds having at least two kinds of unsaturated bonds. The e value is preferably −1.0 or less, and more preferably −1.5 or less. Further, the monomer having a high electron density in the present invention is a monomer having electron-rich unsaturated bonds, and the value of the charge (atomic charge) of the carbon atoms constituting the unsaturated bond is preferably −0.45 or less, and more preferably −0.50 or less.

In the polymerizable compounds having at least two kinds of unsaturated bonds in the ink composition of the present invention, a monomer having a minimum value of e values or a monomer having a high electron density is preferably an unsaturated compound represented by the general formula (3).

In the general formula (3), X represents —O—, —NR$_D$—, —S—, or —SO—. Y represents a hydrogen atom, a linear alkyl group, a branched alkyl group, a cyclic alkyl group, an alkyl group having a hydroxyl group, an aryl group, or an arylalkyl group, and may further have a substituent. R$_A$, R$_B$, R$_C$, and R$_D$ each independently represent a hydrogen atom, a linear or branched alkyl group, a cyclic alkyl group, an alkyl group having a hydroxyl group, an aryl group, or an arylalkyl group, and may further have a substituent. Further, parts of R$_B$ or R$_C$ and Y may be bonded to each other to form a cyclic structure. Further, parts of Y may form a polyfunctional polymerizable compound having two or more unsaturated bonding moieties via a linking group.

The polymerizable compound having an unsaturated bonding moiety represented by the general formula (3) according to the present invention may form a monofunctional polymerizable compound having one unsaturated bonding moiety, or a polyfunctional polymerizable compound having a linking group structure portion as Y and two or more unsaturated bonding moieties.

Examples of the unsaturated compound represented by the general formula (3) according to the present invention include alkenyl ethers such as vinyl ether and propenyl ether; alkenyl thioethers such as vinyl thioether and propenyl thioether; alkenyl sulfoxides such as vinyl sulfoxide and propenyl sulfoxide; vinyl esters in which vinyl groups are bonded to oxygen atoms of carboxylic acid esters; vinyl amines in which vinyl groups are bonded to nitrogen atoms of amino groups; vinyl amides in which vinyl groups are bonded to nitrogen atoms of amide groups; vinyl imidazoles in which vinyl groups are bonded to nitrogen atoms of imidazole rings; vinyl carbazoles in which vinyl groups are bonded to nitrogen atoms of carbazole rings; and cyclic 5-membered ring and cyclic 6-membered ring compounds in which a vinylene skeleton and an oxygen atom are included in the ring.

The unsaturated bonding moiety represented by the general formula (3) according to the present invention is preferably at least one kind of unsaturated compound selected from the general formulae (D-1) to (D-9).

In the general formulae (D-1) to (D-9), R$_5$ to R$_9$ each independently represent a hydrogen atom, a linear or branched alkyl group, a cyclic alkyl group, an alkyl group having a hydroxyl group, an aryl group, or an arylalkyl group. Further, they may have a substituent, and may be a linking group for forming a polyfunctional polymerizable compound having two or more unsaturated bonding moieties. Z represents —O—, —N(R$_{10}$)— or —S—. R$_{10}$ represents a hydrogen atom, a linear alkyl group, a branched alkyl group, a cyclic alkyl group, an alkyl group having a hydroxyl group, an aryl group, or an arylalkyl group, and may further have a substituent.

Then, examples of the e values of the unsaturated bonding moieties of the polymerizable compounds represented by the general formulae (D-1) to (D-9) according to the present invention are shown below. Further, the following e values are found in POLYMER HANDBOOK FOURTH EDITION Volume 1 (edited by J. BRANDRUP, E. H. IMMERGUT, and E. A. GRULKE, published in 1999, published by Wiley-Interscience Publications).

1) General formula (D-1): e value −6.86 (in the case where $R_8$ is aromatic: the value of vinyl-m-cresyl ether is substituted), −1.80 (in the case where $R_8$ is aliphatic: the value of vinyl ethyl ether is substituted)

2) General formula (D-2): e value −1.29 (the value of N-vinylcarbazole is substituted)

3) General formula (D-3): e value −1.18 (the value of N-vinylcaprolactam is substituted)

4) General formula (D-6): e value −1.79 (the value of vinyl methyl sulfoxide is substituted)

5) General formula (D-7): e value −1.66 (the value of vinyl methyl sulfide is substituted)

The unsaturated compounds represented by the general formulae (D-1) to (D-9) will be described below, but are not limited thereto. All of the charges of carbon atoms of the unsaturated bonds contained in the unsaturated compounds as described later are represented by a value of −0.4 or less. Preferable examples of the polymerizable compound having an unsaturated bonding moiety include the following polymerizable compounds having vinyl ether groups (vinyl ether compounds).

Examples of the vinyl ether compound include those that are shown below.

[Bifunctional Vinyl Ether Compound]

Example of the bifunctional vinyl ether compound include 1,4-butanediol divinyl ether, 1,6-hexanediol divinyl ether, neopentyl glycol divinyl ether, nonanediol divinyl ether, cyclohexanediol divinyl ether, cyclohexane dimethanol divinyl ether, diethylene glycol divinyl ether, triethylene glycol divinyl ether (TEGDVE), trimethylolpropane divinyl ether, ethylene oxide-modified trimethylolpropane divinyl ether, and pentaerythritol divinyl ether.

Other specific example include a vinyl ether compound having an alicyclic skeleton containing at least oxygen atom(s) disclosed in Japanese Patent No. 4037856, a vinyl ether compound having an alicyclic skeleton disclosed in Japanese Patent Application Laid-Open No. 2005-015396, a 1-indanyl vinyl ether disclosed in Japanese Patent Application Laid-Open No. 2008-137974, and a 4-acetoxycyclohexyl vinyl ether disclosed in Japanese Patent Application Laid-Open No. 2008-150341.

Furthermore, a compound in which a substituent is introduced into an α- or β-position of a vinyl ether group, for example, by substituting a vinyl ether group of the divinyl ether with a propenyl ether group, an isopropenyl ether group, a butenyl ether group, or an isobutenyl ether group may also be used as a polyfunctional unsaturated compound.

Among these bifunctional vinyl ether compounds, taking curability, adhesiveness, and surface hardness into consideration, diethylene glycol divinyl ether, triethylene glycol divinyl ether, cyclohexanediol divinyl ether, and cyclohexanedimethanol divinyl ether are excellent and preferable from the viewpoint of curability, compatibility with various materials, odor, and safety.

<Trifunctional or Higher Polyfunctional Vinyl Ether Compound>

Specific examples of the trifunctional or higher polyfunctional vinyl ether compound that are suitable for the present invention include trimethylolpropane trivinyl ether, ethylene oxide-modified trimethylolpropane trivinyl ether, pentaerythritol trivinyl ether, pentaerythritol tetravinyl ether, ethylene oxide-modified pentaerythritol trivinyl ether, ethylene oxide-modified pentaerythritol tetravinyl ether, dipentaerythritol hexavinyl ether, and ethylene oxide-modified dipentaerythritol hexavinyl ether.

As the trifunctional vinyl ether compound, a compound having an oxyalkylene group in a molecule represented by the following general formula (4) is preferable from the viewpoint of compatibility with other compounds or solubility, and substrate adhesiveness. Further, the total number of oxyalkylene groups is preferably 10 or less, and when the total number of oxyalkylene groups is more than 10, water resistance of a cured film decreases. Further, even though the following general formula (4) exemplifies an oxyethylene group, an oxyethylene group having another number of carbon atoms may also be used. The number of carbon atoms of an oxyethylene group is preferably from 1 to 4, and more preferably 1 or 2.

[Chem. 22]

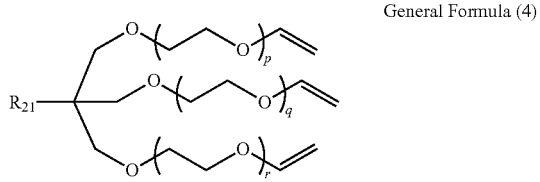

General Formula (4)

In the general formula (4), $R_{21}$ represents a hydrogen atom or an organic group. Examples of an organic group represented by $R_{21}$ include alkyl groups having 1 to 6 carbon atoms, such as a methyl group, an ethyl group, a propyl group, and a butyl group; fluoroalkyl groups having 1 to 6 carbon atoms; alkenyl groups having 1 to 6 carbon atoms, such as an aryl group, a furyl group, a thienyl group, an allyl group, a 1-propenyl group, a 2-propenyl group, a 2-methyl-1-propenyl group, a 2-methyl-2-propenyl group, a 1-butenyl group, a 2-butenyl group, and a 3-butenyl group; aryl groups such as a phenyl group, a benzyl group, a fluorobenzyl group, a methoxybenzyl group, and a phenoxyethyl group; alkoxy groups such as a methoxy group, an ethoxy group, and a butoxy group; alkyl carbonyl groups having 1 to 6 carbon atoms, such as a propylcarbonyl group, a butylcarbonyl group, and a pentylcarbonyl group; alkoxycarbonyl groups having 1 to 6 carbon atoms, such as an ethoxycarbonyl group, a propoxycarbonyl group, and a butoxycarbonyl group; and alkoxycarbamoyl groups having 1 to 6 carbon atoms, such as an ethoxycarbamoyl group, a propylcarbamoyl group, and a butylpentylcarbamoyl group, but are not particularly limited thereto. Among them, a hydrocarbon group containing no hetero atom is preferred as an organic group from the viewpoint of curability. Further, p, q, and r represent 0 or an integer of 1 or more, and p+q+r represents an integer of 3 to 10.

In addition, examples of the polyfunctional vinyl ether compound having 4 or more vinyl ether groups include compounds represented by the following general formula (5) or (6).

[Chem. 23]

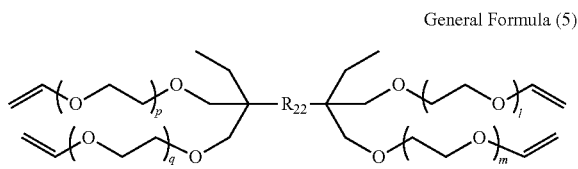

General Formula (5)

In the general formula (5), $R_{22}$ represents a linking group containing a methylene group or any one of an alkylene group, an oxyalkylene group, and an ester group, each having 1 to 6 carbon atoms. p, q, l, and m each represent 0 or an integer of 1 or more, and the total number of p+q+l+m is an integer of 3 to 12.

[Chem. 24]

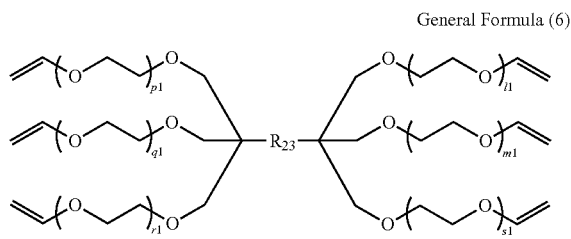

General Formula (6)

In the general formula (6), $R_{23}$ represents a linking group containing a methylene group or any one of an alkylene group, an oxyalkylene group, and an ester group, each having 1 to 6 carbon atoms. p1, q1, r1, l1, m1, and s1 represent 0 or an integer of 1 or more, and the total number of p1+q1+r1+l1+m1+s1 represents an integer of 3 to 12.

Even though the general formulae (5) and (6) are exemplified by an oxyethylene group, an oxyalkylene group having another number of carbon atoms may also be used. The number of carbon atoms of an oxyethylene group is preferably from 1 to 4, and more preferably 1 or 2.

In the present invention, the trifunctional or higher polyfunctional vinyl ether is more preferably tetrafunctional or higher from the viewpoint of obtaining excellent curing characteristics such as solvent resistance and weather resistance of a cured film.

Furthermore, a functional group represented by the following general formula (7) can also be used as the above trifunctional or higher polyfunctional vinyl ether from the viewpoint of improving the curing sensitivity and decreasing the odor.

[Chem. 25]

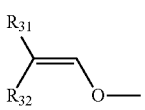

General Formula (7)

In the general formula (7), $R_{31}$ and $R_{32}$ each represent a hydrogen atom or an organic group, and a total sum of the number of carbon atoms in the organic groups represented by $R_{31}$ and $R_{32}$ is an integer of 1 or more.

[Monofunctional Vinyl Ether Compound]

Examples of the monofunctional vinyl ether compound include n-propyl vinyl ether, isopropyl vinyl ether, n-butyl vinyl ether, isobutyl vinyl ether, 2-ethylhexyl vinyl ether, octadecyl vinyl ether, cyclohexyl vinyl ether, allyl vinyl ether, hydroxyethyl vinyl ether, hydroxybutyl vinyl ether, 9-hydroxynonyl vinyl ether, 4-hydroxycyclohexyl vinyl ether, cyclohexanedimethanol monovinyl ether, and triethylene glycol monovinyl ether.

Other than the above, various types of vinyl ether compounds that have been disclosed so far can be applied. Examples thereof include the compounds containing a (meth)acryloyl group and a vinyl ether group in the molecule disclosed in Japanese Patent No. 3461501; the vinyl ether compounds having a heterocyclic skeleton containing at least an oxygen atom disclosed in Japanese Patent No. 4037856; the vinyl ethers having an alicyclic skeleton disclosed in Japanese Patent Application Laid-Open No. 2005-015396; a 1-indanyl vinyl ether disclosed in Japanese Patent Application Laid-Open No. 2008-137974; and a 4-acetoxycyclohexyl vinyl ether disclosed in Japanese Patent Application Laid-Open No. 2008-150341.

A polyfunctional bifunctional or higher vinyl ether contains a ring skeleton such as an alicyclic ring and an aromatic ring, and a monomer that is highly hydrophobic is preferred from the viewpoint of little yellowing of a cured film.

Among these ring skeletons, the alicyclic ring is particularly preferred from the viewpoint of having excellent sensitivity compared with an aromatic ring having UV absorption and obtaining higher sensitivity, as compared with a heterocyclic alicyclic type which contains a hetero atom such as an oxygen atom in a ring. Besides, from the viewpoint of odor, the alicyclic type is preferred.

Examples of the cyclic skeleton include homocyclic alicyclic ring groups such as a cyclopentane ring, a cyclohexane ring, a dicyclohexane ring, a dicyclopentadiene ring, a norbornen ring, an isobornene ring, and an adamantane ring; homocyclic aromatic ring groups such as a benzene ring, a naphthalene ring, a biphenyl ring, and a pyrene ring; heterocyclic ring groups such as an epoxy ring, an oxetane ring, a thiophene ring, a pyrrole ring, a furan ring, a pyridine ring, a pyrrolidine ring, a piperidine ring, a piperazine ring, a morpholine ring, a dioxane ring, a quinuclidine ring, a tetrahydrofuran ring, an aziridine ring, a dithiane ring, a pyrazole ring, a triazole ring, an imidazole ring, an oxazole ring, a thiazole ring, a pyridone ring, a quinolone ring, an indole ring, a benzotriazole ring, a quinoline ring, an isoquinoline ring, a pyridazine ring, a pyrimidine ring, a pyrazine ring, a thiadiazole ring, an isooxazole ring, and an isothiazole ring.

Examples of the monomer having an aromatic ring skeleton include hydroquinone divinyl ether and bisphenol A divinyl ether. Further, a linear or branched alkyl group and an alkoxy group may be substituted on an aromatic ring thereof.

Examples of the monomer having a heterocyclic skeleton include oxetanemethanol divinyl ether, oxapentanediol divinyl ether, oxacyclohexanediol divinyl ether, oxanorbornanediol divinyl ether, oxanorbornanedimethanol divinyl ether, oxatricyclodecanediol divinyl ether, oxaadamantanediol divinyl ether and dioxolane methanol divinyl ether. Further, the monomer disclosed in Japanese Patent Publication No. 4037856, which has a bridged skeleton of an oxetane ring or a hydrofuran ring, is also included.

Examples of the monomer having an alicyclic skeleton include cyclopentanediol divinyl ether, cyclopentanedimethanol divinyl ether, tricyclodecanediol divinyl ether, tricyclodecanedimethanol divinyl ether, adamantanediol divinyl ether, cyclohexanediol divinyl ether, cyclohexanedimethanol divinyl ether, norbornyldimethanol divinyl ether, and isobornyl divinyl ether.

Among them, from the viewpoint of curing sensitivity, yellowing of a cured film, or odor as described above, preferred is a monomer which has an alicyclic skeleton and does not include a hetero atom, such as cyclohexanediol divinyl ether, cyclohexanedimethanol divinyl ether, norbornyldimethanol divinyl ether, and isobornyl divinyl ether, and more preferred are cyclohexanediol divinyl ether and cyclohexanedimethanol divinyl ether.

Examples of other polymerizable compounds having an alkenyl ether group include the compounds described in each of the documents of 1) Crevello, Journal of Polymer Science: Part A: Polymer Chemistry, Vol. 31, 1473-1482 (1993), 2) Crevello, Journal of Polymer Science: Part A: Polymer Chemistry, Vol. 33, 1381-1389 (1995), 3) Oskar Nuyken, et, al, Macromol. Chem. Phys. 199, 191-196 (1998), and the like.

Examples of the polymerizable compounds including vinyl thioether and vinyl sulfoxide include vinyl methyl sulfoxide, vinyl-tert-butyl sulfide, vinyl methyl sulfide, and vinyl ethyl sulfide.

Examples of the polymerizable compound having a cyclic 5-membered ring compound and a cyclic 6-membered ring compound, each including a vinylene skeleton and an oxygen atom in the ring include imidazole, pyrrole, furan, dihydrofuran, pyran, and dihydropyran.

Examples of the N-vinyl compound having a structure having a vinyl group substituted on a nitrogen atom include N-vinylformamide, N-vinylcarbazole, N-vinylindole, N-vinylpyrrole, N-vinylacetamide, N-vinylpyrrolidone, N-vinylcaprolactam, N-vinyl-N-ethylurea, N-vinyloxazolidone, N-vinylsuccinimide, N-vinyl ethyl carbamate, and derivatives thereof. Among these compounds, N-vinylcaprolactam and N-vinylformamide are particularly preferred. N-vinylformamide is commercially available from, for example, Arakawa Chemical Industries, Ltd.

(Addition Ratio of Monomers)

The addition ratios of a monomer A (a monomer having a high e value or a monomer having a low electron density) and a monomer B (monomer having a low e value or monomer having a high electron density) according to the present invention are preferably such that the molar ratio of the unsaturated bonds of the monomer A and the monomer B (the number of the monomer A-derived unsaturated bonds/the number of unsaturated bonds of the monomer B) is in the range of 2/8 to 8/2, from the viewpoint of curing sensitivity, more preferably 2.5/7.5 to 7/3, and even more preferably 3/7 to 5/5. If the molar ratio of the unsaturated bonds is less than 2/8 or more than 8/2, the residual monomers not cured increase, and thus, the film is sticky and deficiency in the strength is caused.

Moreover, the ratio of the number of the unsaturated bonds of the monomer A represented by the general formula (1) or (2) to the number of the unsaturated bonds of the monomer B represented by the general formula (3) (the number of the monomer A-derived unsaturated bonds/the number of the unsaturated bonds of the monomer B) is preferably in the range of 2/8 to 8/2 from the viewpoint of curing sensitivity, more preferably 2.5/7.5 to 7/3, and even more preferably 3/7 to 5/5. If the molar ratio of the unsaturated bonds is less than 2/8 or more than 8/2, the residual monomers not cured increase, and thus, the film is sticky and deficiency in the strength is caused.

[Other Monomers]

Other examples of the polymerizable compounds include radically polymerizable compounds.

The radically polymerizable compound is a compound having radically polymerizable ethylenically unsaturated bonds, which may be any one of compounds having at least one radically polymerizable ethylenically unsaturated bond in the molecule thereof and may be in the form of any one of a monomer, an oligomer, and a polymer. One radically polymerizable compound may be used alone, and alternatively, two or more radically polymerizable compounds may be used together at an arbitrary ratio to improve the desired characteristics. Combined use of two or more radically polymerizable compounds is preferable for controlling performance such as the reactivity and the physical properties. The inventors have confirmed that cyclic allyl sulfide monomers can be copolymerized with other methacrylate monomers and acrylate monomers.

Examples of the polymerizable compound having radically polymerizable ethylenically unsaturated bonds include unsaturated carboxylic acids such as acrylic acid, methacrylic acid, or salts thereof; anhydrides having ethylenically unsaturated groups; and radically polymerizable compounds such as acrylonitrile, styrene, various unsaturated polyesters, unsaturated polyethers, unsaturated polyamides, and unsaturated urethane.

Specific examples of the radically polymerizable compound include acrylic acid derivatives such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate, bis(4-acryloxypolyethoxyphenyl)propane, polyethylene glycol diacrylate, polypropylene glycol diacrylate, dipentaerythritol tetraacrylate, trimethylolpropane triacrylate, oligoester acrylate, N-methylol acrylamide, diacetone acrylamide, epoxy acrylate, isobornyl acrylate, dicyclopentenyl acrylate, dicyclopentenyloxyethyl acrylate, and dicyclopentanyl acrylate;

methacrylic derivatives such as methyl methacrylate, n-butyl methacrylate, allyl methacrylate, glycidyl methacrylate, benzyl methacrylate, dimethylaminomethyl methacrylate, polyethylene glycol dimethacrylate, polypropylene glycol dimethacrylate, and 2,2-bis(4-methacryloxy polyethoxyphenyl)propane; and allyl compound derivatives such as allyl glycidyl ether, diallyl phthalate, and triallyl trimellitate.

More specific examples of the radically polymerizable compound include radically polymerizable or cross-linkable monomers, oligomers, and polymers, commercially available or known in the art, which are described in "Crosslinking Handbook" edited by Sinzo Yamashita (published by TAISEISHA Ltd. in 1981); "UV-EB Curing Handbook (Starting Materials), edited by Kiyomi Kato (Kobunshi Kankoukai, 1985); "UV-EB KOKA GIJUTSU (GENRYO HEN)" edited by RADOTECH KENKYUKAI, page 79 (published by CMC in 1989); "POLYESTER JUSHI HANDBOOK" by Eiichiro Takiyama (published by THE NIKKAN KYOGYO SHIMBUN, Ltd. in 1988); and the like.

Among these acrylates and methacrylates, an acrylate of an alcohol that has an ether oxygen atom, such as tetrahydrofurfuryl acrylate and 2-phenoxyethyl acrylate, is preferable, from the viewpoint of curing properties and physical properties of a film after being cured. Further, for the same reason, an acrylate of an alcohol that has an alicyclic structure is preferable, preferable examples of which include specifically an acrylate having a bicyclic ring structure or a tricyclic ring structure such as isobornyl acrylate, dicyclopentenyl acrylate, dicyclopentenyloxyethyl acrylate, and dicyclopentanyl acrylate. Among these, dicyclopentenyl acrylate and dicyclopentenyloxyethyl acrylate are particularly preferable, which have a double bond in the alicyclic structure.

Furthermore, as the radically polymerizable compound, optically curable, polymerizable compound used in the photopolymerizable compositions as described in, for example, Japanese Patent Application Laid-Open No. HEI 7-159983, Japanese Patent Application Publication No. HEI 7-31399, Japanese Patent Application Laid-Open No. HEI 8-224982, Japanese Patent Application Laid-Open No. HEI 10-863, Japanese Patent Application Laid-Open No. HEI 9-134011, Japanese Patent No. 2004-514014, and the like are known, and these may also be applied in the ink composition of the present invention.

In addition, as additional polymerizable compounds, (meth)acrylic acid esters (which will be hereinafter appropriately referred to as acrylate compounds) such as an (meth)acrylic monomer or prepolymer, an epoxy-based monomer or prepolymer, or a urethane-based monomer or prepolymer may be used. Examples thereof include the compounds shown below.

Specifically, examples of the additional polymerizable compounds include 2-ethylhexyl-diglycol acrylate, 2-hydroxy-3-phenoxypropyl acrylate, 2-hydroxybutyl acrylate, hydroxypivalic acid neopentyl glycol diacrylate, 2-acryloyloxyethylphthalic acid, methoxy-polyethylene glycol acrylate, tetramethylolmethane triacrylate, 2-acryloyloxyethyl-2-hydroxyethylphthalic acid, dimethyloltricyclodecane diacrylate, ethoxylated phenyl acrylate, 2-acryloyloxyethyl-succinic acid, nonylphenol EO adduct acrylate, modified glycerine triacrylate, bisphenol A diglycidyl ether acrylic acid adduct, modified bisphenol A diacrylate, phenoxy-polyethylene glycol acrylate, 2-acryloyloxyethyl hexahydrophthalic acid, bisphenol A PO adduct diacrylate, bisphenol A EO adduct diacrylate, dipentaerythritol hexaacrylate, pentaerythritol triacrylate tolylene diisocyanate urethane prepolymer, lactone-modified flexible acrylate, butoxyethyl acrylate, propylene glycol diglycidyl ether acrylic acid adduct, pentaerythritol triacrylate hexamethylene diisocyanate urethane prepolymer, 2-hydroxyethyl acrylate, methoxy-dipropylene glycol acrylate, ditrimethylolpropane tetraacrylate, pentaerythritol triacrylate hexamethylene diisocyanate urethane prepolymer, stearyl acrylate, isoamyl acrylate, isomyristyl acrylate, isostearyl acrylate, and lactone-modified acrylate.

These acrylate compounds are polymerizable compounds used in UV curable inks and have less skin irritation and a lower sensitizing property (being easily sensitized). Further, since the viscosities of the acrylate compounds are relatively low, the acrylate compounds allow ink to be stably jetted, and have high polymerization sensitivity, and good adhesiveness to a substrate.

The monomers listed as the additional polymerizable compounds have a low sensitizing property, regardless of their having low molecular weights, and have high reactivity, low viscosity, and excellent adhesiveness to a recording medium.

Examples of the monofunctional monomer include monofunctional acrylates, and examples of the acrylate include stearyl acrylate, isoamyl acrylate, isomyristyl acrylate, isostearyl acrylate, 2-hydroxyethyl acrylate, butoxyethyl acrylate, carbitol acrylate, cyclohexyl acrylate, tetrahydrofurfurykacrylate, benzyl acrylate, ethylene glycol monovinyl ether, and triethylene glycol monovinyl ether, with the monofunctional acrylate being preferable. Examples of the monofunctional acrylate include stearyl acrylate, isoamyl acrylate, isomystyl acrylate, and isostearyl acrylate. These have high sensitivity and can prevent generation of curls with a low shrinking property, and further, it is preferable from the viewpoint of prevention of penetration, and reduction in the odor of printed matter and the cost of an irradiating device. Specifically, SR339, SR489, and SR506 (all manufactured by Sartomer) are preferable.

Epoxy acrylate oligomers or urethane acrylate oligomers are particularly preferable as the oligomer used in combination with the monofunctional acrylates.

Further, methacrylates have desirably less skin irritation than acrylates.

Examples of the bifunctional monomer include bifunctional acrylate, polyethylene glycol diacrylate, and polypropylene glycol diacrylate, with bifunctional acrylate being preferred.

Specifically, SR508 and SR9045 (both manufactured by Sartomer) are preferred.

Examples of the polyfunctional monomer include polyfunctional acrylates, dipentaerythritol tetraacrylates, trimethylolpropane triacrylates, and oligoester acrylates, with the polyfunctional acrylates being preferable.

Specifically, SR399 (manufactured by Sartomer) is preferable.

[Elemental Ions]

The actinic energy radiation curable ink jet ink of the present invention may contain an elemental ion, classified into a "hard acid" or "a boundary between a hard acid and a soft acid" according to a HSAB rule. The elemental ion is at least one selected from Fe, Co, Ca, Na, Mg, Al, Ti, Sn, and Zn. The total content of these elemental ions is preferably in the range of 5.0 ppm to 100 ppm.

If the total content of the elemental ions is 5.0 ppm or more, storage stability of a monomer having a low electron density, that is unstable to alkali, can be ensured. Further, if the total content of the elemental ions is 100 ppm or less, storage stability of a monomer having a high electron density, that is unstable to acids, can be ensured. In addition, the total content of the elemental ions is preferably from 5.0 ppm to 50 ppm.

The elemental ions (Fe, Co, Ca, Na, Mg, Al, Ti, Sn, and Zn) are elemental ions having a tendency of easily bonding to a Lewis base since it has an unoccupied orbital in the outermost shell, and having a tendency of discharging protonic acids $H^+$ as a result of bonding to a Lewis base that bonds to H. Such an elemental ion is called a Lewis acid. The elemental ions called Lewis acids are classified into a "hard acid", a "soft acid", or "a boundary between a hard acid and a soft acid". The elemental ions easily bonding to Lewis bases bonding to $H^+$ are included in the elemental ions classified into "a hard acid", or "a boundary between a hard acid and a soft acid" according to an HSAB rule. Accordingly, in order to obtain the effect of improving the storage stability of the ink, it is preferable to combine elemental ions easily bonding to Lewis bases bonding to $H^+$; that is, it is preferable to combine the elemental ions classified into "a hard acid", or "a boundary between a hard acid and a soft acid". Examples of such elemental ions include metal ions described in "Structures of Coordination Compounds, Kagaku-Dojin Publishing Company, Inc., Shoichiro Yamada". In the present invention, the metal ion is defined as at least one metal ion selected from Fe, Co, Ca, Na, Mg, Al, Ti, Sn, and Zn. When such an elemental ion is contained in an amount ranging from 5.0 ppm to 100 ppm, hydrolysis or polymerization of a monomer having a high electron density by an acid and decomposition of a monomer having a low electron density by an alkali can be prevented at the same time.

Furthermore, the content of such elemental ions can be determined by a known analysis means such as elemental analysis, atomic absorption analysis, titration analysis, and mass spectrometry.

In the actinic energy radiation curable ink jet ink composition of the present invention, with a content of the elemental ions of from 5.0 ppm to 100 ppm, in the case where the content is intended to be increased, the content can be controlled by the addition of salts of the elemental ions. In some cases, the elemental ions may be contained in the pigments, polymerizable monomers, photopolymerization initiators, sensitizers, or the like. Accordingly, in the case where the content is intended to be decreased, the content can be controlled by carrying out a separation/purification means such as an adsorption treatment using a basic adsorbent, a column chromatographic treatment such as silica gel column chromatography, a treatment with activated carbon, crystallization, and recrystallization. Further, according to the present invention, from the viewpoint of controlling the effect of producing H acids by the elemental ions, the elemental ions are removed by the purification treatment above and a coordinating compound (chelating agent) having stability with a complex stability constant log $K_1$ of 10 or more with the elemental ions above. By this, the elemental ions are masked to reduce the elemental ions in the state of being capable of bonding to a Lewis base for such a control. As such a chelating agent, ones known in the related art may be used, and examples thereof include aminopolycarboxylic acid derivatives such as ethylenediaminetetraacetic acid (EDTA), nitrile triacetic acid (NTA), diethylenetriaminepentaacetic acid (DTPA), and hydroxyethyliminodiacetic acid (HIDA), and diketones such as acetylacetone.

The present inventors have found that an actinic energy radiation curable ink jet ink composition having excellent viscosity stability, curing sensitivity, and discharge stability, when stored for a long period of time, can be realized, thereby completing the present invention. With regard to the composition, the actinic energy radiation curable ink jet ink composition containing at least two kinds of polymerizable monomers having unsaturated bonds is characterized in that the maximum value in the difference of the charges of the carbon atoms constituting the respective unsaturated bond atoms contained in the at least two kinds of polymerizable monomers is from 0.24 to 0.46, and further, the total content of the elemental ions of Fe, Co, Ca, Na, Mg, Al, Ti, Sn, and Zn is from 5.0 ppm to 100 ppm.

The present inventors have analyzed the objects of the actinic energy radiation curable ink jet ink composition as described above (which is hereinafter also referred to as an ink composition or simply an ink), and as a result, the following problems have become apparent.

That is, combined use of the monomers having largely different charges of the carbon atoms constituting the unsaturated bond means combined use of the monomer having a high electron density of the unsaturated bond and the monomer having a low electron density of the unsaturated bond. However, it is proved that the monomer having a high electron density is susceptible to hydrolysis in the presence of an acid, and further, the polymerization also easily occurs. On the other hand, it is proved that the monomer having a low electron density is easily affected by the hydrolysis in the presence of an alkali (base). That is, when the monomer having a high electron density and the monomer having a low electron density are used in combination, there is derived a problem of a risk with both of an acid and an alkali.

Accordingly, the present inventors have investigated how the stability of the ink is ensured by minimizing the effects of both of the acid and the alkali. As a result, they have found that the elemental ions of Fe, Co, Ca, Na, Mg, Al, Ti, Sn, and Zn according to the present invention, that are elemental ions classified into "a hard acid" or "a boundary between a hard acid and a soft acid" by an HSAB rule, are contained in the total amount in the range of 5.0 ppm to 100 ppm. The present inventors have found that these elemental ions act as a Lewis acid, and the amount of the protonic acid produced is in the region having no effect on the storage stability of the monomer having a large electron density. Further, it has been possible to avoid the risk of the decomposition by an alkali with respect to the monomer having a low electron density. As a result, it becomes possible to satisfy the storage stability of both the monomer having a high electron density and the monomer having a low electron density.

[Compound Having Substituent Capable of Reacting with Nucleophilic Agent]

The actinic energy radiation curable ink jet ink of the present invention may contain a compound having a substituent capable of reacting with a nucleophilic agent which is non-polymerizable.

As described above, a nucleophilic substituent such as a hydroxyl group and a carboxyl group is present on a surface of a rigid substrate. As the substituent capable of reacting with a nucleophilic agent, a substituent that reacts with a hydroxyl group or a carboxyl group is particularly preferable. Examples of the substituent include —X (in which X represents a halogen atom or a nitro group), —OW (in which W represents an alkylcarbonyl group, an arylcarbonyl group, an alkylsulfonyl group, or an arylsulfonyl group), a cyclic ether group such as an epoxy group, —COOR$_S$ (in which R$_S$ represents an alkyl group or an aryl group, and may be bonded to other moieties to form a cyclic structure), and —COOCO—R$_T$ (in which R$_T$ represents an alkyl group or an aryl group, and may be bonded to other moieties to form a cyclic structure). Among these, an epoxy group represented by the general formula (8) and succinic anhydride derivatives or maleic acid copolymers represented by the general formulae (9) and (10) are preferable. R$_D$ and R$_E$ represent a hydrogen atom or an alkyl group having 1 to 4 carbon atoms, and * represents a bonding site.

The compound having a substituent capable of reacting with a nucleophilic agent which is non-polymerizable may be generally a commercially available compound. Examples thereof include epoxy resins (Series EPICLON) manufactured by DIC Corporation, maleic anhydride-modified resins (NAK ACE GB-301) manufactured by Nippon Unicar Co., Ltd.), and isobutylene/maleic anhydride copolymerization resins (Series ISOBAM) manufactured by Kuraray Co., Ltd.

These compounds may exhibit the effects whether they have low molecular weights or high molecular weights, but when they have a molecular weight of 500 or more, the effect is significant and thus, these compounds are preferably used. The addition amounts of these compounds are preferably from 0.1 to 10%, and more preferably from 0.2 to 5%. By setting the addition amount to 0.1% or more, the effects of the present invention are easily obtained, whereas by setting the addition amount to 10% or less, the viscosity is not increased too high, and the jetting from the ink jet head is stabilized. Thus, the film strength after curing is improved.

The present inventors have found that an actinic energy radiation curable ink jet ink composition which forms an image having high curing sensitivity and excellent durability even when posted for a long period of time can be realized, thereby completing the present invention. With regard to the composition, the actinic energy radiation curable ink jet ink composition containing at least two kinds of polymerizable compounds having an unsaturated bond is characterized in that the difference in the e values of the at least two kinds of polymerizable compounds is from 2.8 to 6.0, and contains a compound having a substituent capable of reacting with a nucleophilic agent which is non-polymerizable.

In a case where an image is posted outdoors as a poster, the image is always exposed to sunlight or moisture such as rain and dew. Therefore, it is known that the image is decomposed by the effect of light, oxygen, or moisture on the surface of the image on a surface thereof. An image formed using an actinic energy radiation curable ink is also affected in the same manner. When posted for a long period of time, a polymer formed from a polymerizable compound is decomposed, and the image itself is affected by cracking, peeling, or flow-out from moisture such as rain. In the printing in the related art, in order to reduce the effects thereof, actions such as addition of a polyfunctional polymerizable compound in a large amount so as to increase the crosslinking degree, or preliminary addition of a polymer in a large amount have been taken.

In the case where an actinic energy radiation curable ink is used for an ink jet, when the viscosity increases, jetting is not allowed. Therefore, the addition amount of the polyfunctional polymerizable compound or the polymer compound is limited, and thus, it is difficult to add the compound in such an amount to reduce the effect of light, oxygen, or moisture above. Further, in the case where it is difficult to provide a sufficient cumulative amount of light due to, for example, printing at a high speed or using a light source at a low illuminance such as an LED, the crosslinking degree in a film formed is insufficient, and thus, it becomes that there is a particularly strong effect of light, oxygen, or moisture. In particular, in the case of using a so-called rigid substrate, such as a plastic cardboard and a resin board, this phenomenon becomes to be seen prominently.

In the case of a rigid substrate, it is said that for the purpose of, for example, improving the image quality and improving adhesiveness, a nucleophilic group such as a hydroxyl group and a carboxyl group is present on the surface. These substituents have an ability to attack a polymer formed from the polymerizable compound in the image, and thus, cleaving the polymer chain to reduce the resistance of the image. Therefore, in addition to the effect of light, oxygen, or moisture, when the image on a rigid substrate is posted outdoors for a long period of time, the polymer chains in the image are cleaved by these substituents to accelerate the peeling/flow-out of the image.

By the investigation of the present inventors, it has been proved that by the addition of a compound having a substituent capable of reacting with such a nucleophilic substituent, the deterioration of the image outdoors can be inhibited. The reason therefor is thought that a substituent capable of reacting with a nucleophilic substituent is detoxified before cleaving the polymer chain so as to rapidly react with a nucleophilic group. Particularly, since these compounds are non-polymerizable, they are present independent of a polymer chain formed from the polymerizable compound in the ink and the effect on the polymer chain can be minimized.

[Acidic Compound]

The actinic energy radiation curable ink jet ink of the present invention may contain an acidic compound.

The acidic compound is preferably an organic compound that is a protonic acid, such as acetic acid and p-toluene-sulfonic acid. Further, a so-called photo acid generator, that is decomposed by the action of light to generate a protonic acid can also be more preferably used.

Examples of the photo acid generator include any compound used, for example, for a chemical amplification type photoresist and a photo-cationic polymerization (refer to "Organic Materials Used for Imaging Applications" edited by Study Society of Organic Electronics Materials published by Bunshin Design Printing Publishing And Digital Communications (1993), pages 187-192). Examples of compounds suitable for the present invention will be listed below. Initially, examples thereof include $B(C_6F_5)_4^-$, $PF_6^-$, $AsF_6^-$, $SbF_6^-$, and $CF_3SO_3^-$ salts of aromatic onium compounds such as diazonium, ammonium, iodonium, sulfonium, and phosphonium.

Specific examples of such onium compounds that can be used in the present invention are shown below.

[Chem. 26]

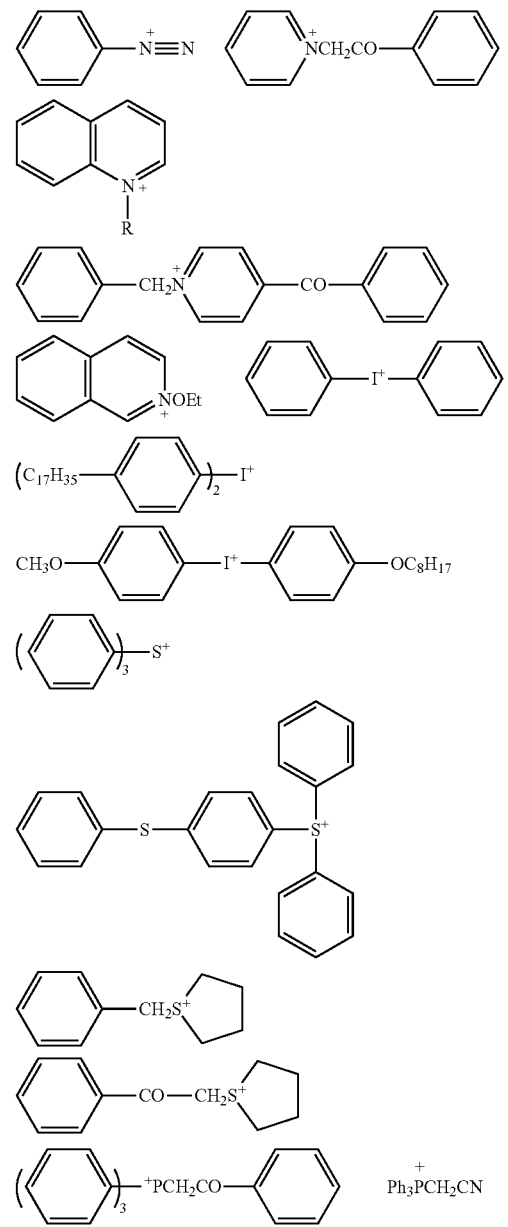

Secondly, sulfonated compounds generating sulfonic acid can be listed and specific compounds will be exemplified below.

[Chem. 27]

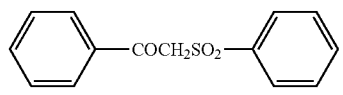

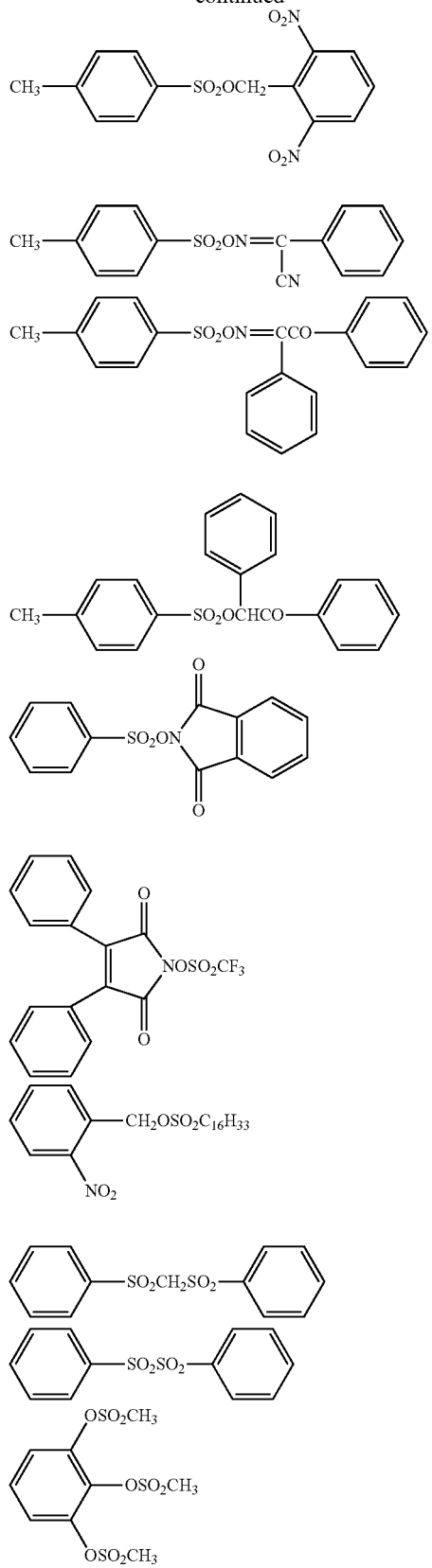

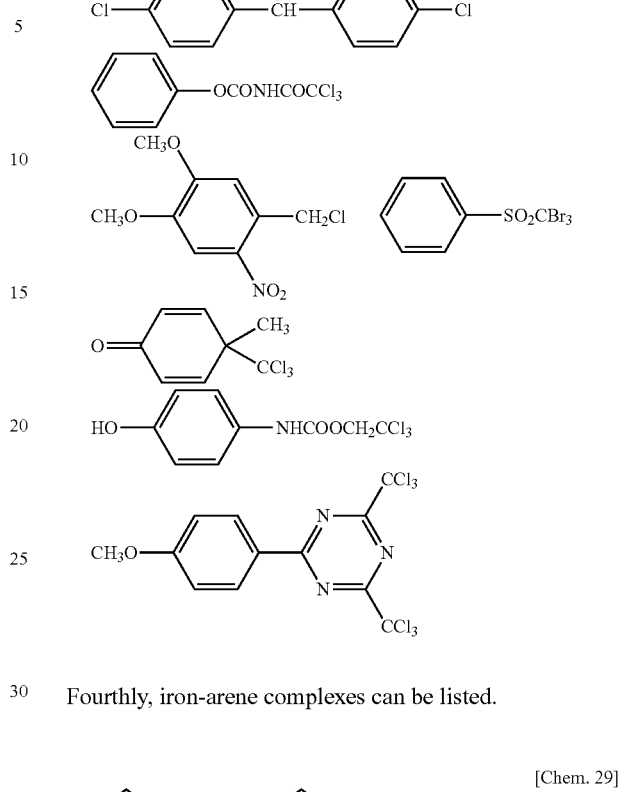

Thirdly, halides photo-generating hydrogen halides can be used, and specific compounds will be exemplified below.

Fourthly, iron-arene complexes can be listed.

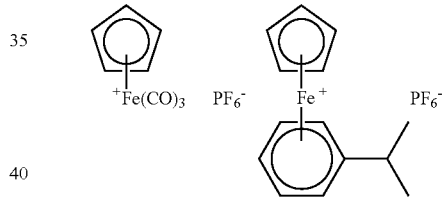

Preferable examples of the photo acid generator include compounds containing a triarylsulfonium salt.

The addition amount of the acidic compound is preferably from 0.1 to 5.0%, and more preferably from 0.2 to 2.5%. By setting the addition amount to 0.1% or more, the effects of the present invention are easily obtained, whereas by setting the addition amount to 5% or less, good curability is obtained.

One kind or two or more kinds selected from these acidic compounds may be used.

The present inventors have found that an actinic energy radiation curable ink jet ink composition which forms an image having high curing sensitivity and excellent adhesiveness even when recording on a rigid substrate can be realized, thereby completing the present invention. With regard to the composition, the actinic energy radiation curable ink jet ink composition containing at least two kinds of polymerizable compounds having an unsaturated bond is characterized in that the difference in the e values of the at least two kinds of polymerizable compounds is from 2.8 to 6.0, and contains an acidic compound.

In a case where an image is posted outdoors as a poster, a so-called rigid substrate is often used. This is a material formed by molding various resins such as polypropylene and acryl into a plate shape, which is a hard material having a thickness of about several millimeters to several centimeters.

Particularly, the polypropylene resin is often used as a material for a plastic cardboard from the viewpoints of being inexpensive and easy molding. However, in the case of a rigid substrate, for the reasons that in order to provide hardness, the addition amount of a plasticizer is restricted, and therefore, it is difficult for the ink to penetrate and further, there are a small number of polar groups on the surface and the interaction with the ink is small, the adhesiveness of the image is deteriorated. As described above, in the printing in the related art, in order to reduce the effects thereof, actions such as addition of a polyfunctional polymerizable compound in a large amount so as to increase the crosslinking degree, or preliminary addition of a polymer in a large amount have been taken, which are, however, not helpful for overcoming the problems.

As described above, it has been said that a group having nucleophilicity is present on the rigid substrate. The present inventors have extensively investigated, and as a result, it has become apparent that addition of an acidic material to a CT polymerization type ink jet ink improves the adhesiveness. Particularly, the addition of a so-called photo acid generator that generates an acid by the irradiation of light has a significant effect. It is thought that by the action of the acid, a nucleophilic substituent such as a hydroxyl group and a carboxylic group, present on a surface of the substrate above reacts with the monomer in the ink jet ink to form a covalent bond, thereby improving the adhesiveness.

[Photoradical Polymerization Initiator]

From a viewpoint of obtaining high sensitivity, it is preferable that the ink composition of the present invention contain a photoradical polymerization initiator and a sensitizer.

A molecular cleavage type or a hydrogen pull-off type photoradical polymerization initiator that can be applied in the ink composition of the present invention is preferable for the present invention. As specific examples thereof, benzoin isobutyl ether, 2,4-diethylthioxanthone, 2-isopropylthioxanthone, benzil, 2,4,6-trimethylbenzoyldiphenylphosphine oxide, 2-benzyl-2-dimethylamino-1-(4-morpholinophenyl)-butan-1-one, bis(2,6-dimethoxybenzoyl)-2,4,4-trimethylpentylphosphine oxide, bis(2,4,6-trimethylbenzoyl)phenylphosphine oxide, or the like is suitably used.

Furthermore, a molecular cleavage type photopolymerization initiator other than the above may be additionally used, such as 1-hydroxycyclohexyl phenyl ketone, benzoin ethyl ether, benzyl dimethyl ketal, 2-hydroxy-2-methyl-1-phenyl-propan-1-one, 1-(4-isopropylphenyl)-2-hydroxy-2-methyl-propan-1-one and 2-methyl-1-(4-methylthiophenyl)-2-morpholinopropan-1-one, 1-[4-(2-hydroxyethoxy)-phenyl]-2-hydroxy-2-methyl-1-propan-1-one, or the like.

Moreover, examples of the hydrogen pull-off type photopolymerization initiator include benzophenone, 4-phenyl-benzophenone, isophthalphenone, 4-benzoyl-4'-methyl-diphenylsulfide, bis(2,4-cyclopentadien-1-yl)-bis(2,6-difluoro-3-(1H-pyrrol-1-yl)-phenyl)titanium which is a metallocene type polymerization initiator, 1,2-octanedione which is an oxime ester-based polymerization initiator, 1-(4-(phenylthio)-, 2-(O-benzoyloxime)), ethanone, and 1-(9-ethyl-6-(2-methylbenzoyl)-9H-carbazol-3-yl)-, 1-(O-acetyloxime).

A sensitizer may be used in combination with the photoradical polymerization initiator. As the examples of the sensitizer, amines that do not cause an addition reaction with a radically polymerizable product such as trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, 4,4'-bis(diethylamino)benzophenone, and the like can be used. It is also be preferable in any case to select and use the photoradical polymerization initiator or the sensitizer, which is excellent in solubility in a radically polymerizable compound.

The amounts of the photoradical polymerization initiator and the sensitizer are in the range of 0.1 to 20% by mass, and preferably 1 to 12% by mass, based on the total mass of the actinic energy radiation curable ink jet ink composition.

Other examples of the photoradical polymerization initiator include polymerization initiators of a type formed by bonding an amine-based initiating aid as an initiator structure to a dendrimer core described in the specification of European Patent No. 1,674,499A, initiators or amine-based initiating agents having polymerizable groups described in the specifications of European Patent Nos. 2,161,264A and 2,189,477A, a type having plural amine-based initiating aids in one molecule described in European Patent No. 1,927,632B1, a type containing plural thioxanthones in the molecule described in WO 2009/060235, ESACURE ONE commercially available from Lamberti, and an oligomer type having α-hydroxypropiophenone bonded in the side chain, typified by ESACURE KIP150.

Furthermore, in the present invention, in the case of using a maleimide-containing polymerizable compound, the compound itself can function as an initiator.

Then, other components of the ink composition of the present invention will be described.

[Colorant]

When the ink jet ink of the present invention is colored, a pigment is preferably used as a colorant. The pigment may be carbon black, colorless inorganic pigments such as titanium oxide and calcium carbonate, or colored organic pigments.

The organic pigments include insoluble azo pigments such as Toluidine Red, Toluidine Maroon, Hanza Yellow, Benzidine Yellow, and Pyrazolone Red; soluble azo pigments such as Lithol Red, Helio Bordeaux, Pigment Scarlet, and Permanent Red 2B;

derivatives from vat dyes such as alizarin, indanthrone, and Thioindigo Maroon;

phthalocyanine-based organic pigments such as Phthalocyanine Blue and Phthalocyanine Green;

quinacridone-based organic pigments such as Quinacridone Red and Quinacridone Magenta;

perylene-based organic pigments such as Perylene Red and Perylene Scarlet;

isoindolinone-based organic pigments such as Isoindolinone Yellow and Isoindolinone Orange;

pyranthrone-based organic pigments such as Pyranthrone Red and Pyranthrone Orange;

thioindigo-based organic pigments; condensed azo-based organic pigments; benzimidazolone-based organic pigments; quinophtharone-based organic pigments such as Quinophtharone Yellow;

isoindoline-based organic pigments such as Isoindoline Yellow; and as other pigments, Flavanthrone Yellow, Acylamide Yellow, Nickel Azo Yellow, Copper Azomethine Yellow, Perynone Orange, Anthrone Orange, Dianthraquinonyl Red, and Dioxazine Violet.

Such organic pigments are exemplified with Color Index (C. I.) numbers as follows.

C. I. Pigment Yellow 12, 13, 14, 17, 20, 24, 74, 83, 86, 93, 109, 110, 117, 120, 125, 128, 129, 137, 138, 139, 147, 148, 150, 151, 153, 154, 155, 166, 168, 180, and 185;

C. I. Pigment Orange 16, 36, 43, 51, 55, 59, and 61;

C. I. Pigment Red 9, 48, 49, 52, 53, 57, 97, 122, 123, 149, 168, 177, 180, 192, 202, 206, 215, 216, 217, 220, 223, 224, 226, 227, 228, 238, and 240;

C. I. Pigment Violet 19, 23, 29, 30, 37, 40, and 50;
C. I. Pigment Blue 15, 15:1, 15:3, 15:4, 15:6, 22, 60, and 64;
C. I. Pigment Green 7 and 36; and
C. I. Pigment Brown 23, 25, and 26.

Among the above pigments, due to excellent light stability, preferred are quinacridone-based organic pigments, phthalocyanine-based organic pigments, benzimidazolone-based organic pigments, isoindolinone-based organic pigments, condensed azo-based organic pigments, quinophtharone-based organic pigments, and isoindoline-based organic pigments.

The organic pigment is preferably in the form of fine particles having an average particle diameter of 10 to 150 nm in an ink as a determined value via laser scattering. When the average particle diameter of the pigment is less than 10 nm, light stability decreases due to the decreased particle diameter. In the case of more than 150 nm, it becomes difficult to maintain dispersion stability and then the pigment tends to precipitate and also ejection stability decreases, resulting in the problem of occurrence of fine mists referred to as satellites. However, in the case of titanium oxide, in order to provide whiteness and opacifying properties, average particle diameter is allowed to be from 150 to 300 nm, and preferably from 180 to 250 nm.

Further, coarse particles are preferably eliminated via sufficient dispersion or filtration so as for the maximum particle diameter of a pigment in an ink not to exceed 1.0 µm. The presence of such coarse particles also degrades discharge stability.

To prepare an organic pigment to be fine-sized, the following method can be performed, and that is, a mixture containing at least 3 parts of an organic pigment, a water-soluble inorganic salt of at least 3 times by mass the amount of the organic pigment, and a water-soluble solvent is formed into clay, which then is strongly kneaded to form fine sizes, followed by being placed into water to give a slurry form by stirring using a high speed mixer; and then the slurry is repeatedly filtered and washed to eliminate the water-soluble inorganic salt and the water-soluble solvent via aqueous treatment. In such a step to prepare fine-sized particles, a resin and a pigment dispersant may be added.

As the water-soluble inorganic salt, sodium chloride and potassium chloride are listed. Any of these inorganic salts are used in the range of 3 to 20 times by mass the amount of an organic pigment. After dispersion treatment, to realize the contents of the halogen ions specified in the present invention, chlorine ions (halogen ions) are eliminated via washing treatment. When the amount of the inorganic salt is less than 3 times by mass, a treated pigment is unable to be obtained at a desired size. In contrast, in the case of more than 20 times by mass, enormous washing treatment in the post-process is required, resulting in a substantially small treated amount of the organic pigment.

A water-soluble solvent makes it possible to produce an appropriate clay state of an organic pigment and a water-soluble inorganic salt used as a pulverizing aid which is employed to efficiently carry out sufficient pulverization. The solvent is not particularly limited if being a water-soluble solvent. However, since temperature elevation during kneading allows the solvent to easily evaporate, a solvent of a boiling point of 120 to 250° C. is preferable from the viewpoint of safety. Such a water-soluble solvent includes 2-(methoxymethoxy)ethanol, 2-butoxyethanol, 2-(i-pentyloxy)ethanol, 2-(hexyloxy)ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, and low-molecular-weight polypropylene glycol.

To accelerate adsorption of the pigment dispersant onto the surface, the pigment may be surface-treated via well-known technology using an acidic treatment or basic treatment, a synergist, or various types of coupling agents, from the viewpoint of ensuring dispersion stability.

To realize sufficient density and sufficient light resistance, the pigment is preferably contained in the amount ranging from 1.5 to 8% by mass in the case of a color except white in an ink jet ink and from 10 to 30% by mass in the case of a white ink employing titanium oxide.

[Pigment Dispersant]

As pigment dispersants, listed are a hydroxyl group-containing carboxylic acid ester, a salt of a long-chain polyaminoamide and a high molecular weight acid ester, a salt of a high molecular weight polycarboxylic acid, a salt of a long-chain polyaminoamide and a polar acid ester, a high molecular weight unsaturated acid ester, a copolymer, a modified polyurethane, a modified polyacrylate, a polyether ester-type anionic surfactant, a naphthalenesulfonic acid formalin condensate salt, an aromatic sulfonic acid formalin condensate salt, a polyoxyethylene alkyl phosphoric acid ester, a polyoxyethylene nonylphenyl ether, stearyl amine acetate, and a pigment derivative.

Examples of the pigment dispersant include "Anti-Terra-U (a polyaminoamide phosphoric acid salt)", "Anti-Terra-203/204 (a high molecular weight polycarboxylic acid salt)", "Disperbyk-101 (a polyaminoamide phosphoric acid salt and an acid ester), 107 (a hydroxyl group-containing carboxylic acid ester), 110 (an acid group-containing copolymer), 130 (a polyamide), 161, 162, 163, 164, 165, 166, and 170 (a copolymer)", "400", "Bykumen (a high molecular weight unsaturated acid ester)", "BYK-P104, P105 (a high molecular weight unsaturated acid polycarboxylic acid)", "P104S, 240S (a high molecular weight unsaturated acid polycarboxylic acid and a silicon-base)", and "Lactimon (a long-chain amine, an unsaturated acid polycarboxylic acid, and silicon)", manufactured by BYK Chemie GmbH.

Further, listed are "Efka 44, 46, 47, 48, 49, 54, 63, 64, 65, 66, 71, 701, 764, and 766" and "Efka Polymer 100 (a modified polyacrylate), 150 (an aliphatic modified polymer), 400, 401, 402, 403, 450, 451, 452, 453 (a modified polyacrylate), and 745 (a copper phthalocyanine-base)", manufactured by Efka Chemicals Co.; "Flowlen TG-710 (a urethane oligomer)", "Flownon SH-290 and SP-1000", and "Polyflow Nos. 50E and 300 (an acrylic copolymer)", manufactured by Kyoeisha Chemicals Co., Ltd.; and "Disparlon KS-860, 873SN, and 874 (a polymer dispersant), #2150 (an aliphatic polycarboxylic acid), and #7004 (a polyether ester-type)", manufactured by Kusumoto Chemicals, Ltd.

Still further, listed are "Demol RN, N (a naphthalenesulfonic acid formalin condensate sodium salt), MS, C, SN-B (an aromatic sulfonic acid formalin condensate sodium salt), and EP", "Homogenol L-18 (a polycarboxylic acid-type polymer)", "Emulgen 920, 930, 931, 935, 950, and 985 (a polyoxyethylene nonyl phenyl ether)", and "Acetamin 24 (a coconut amine acetate) and 86 (a stearylamine acetate)", manufactured by Kao Corp.; "Solsperse 5000 (a phthalocyanine ammonium salt-base), 13240, 13940 (a polyester amine-base), 17000 (a fatty acid amine-base), 24000, 32000, and 7000", manufactured by Zeneca Co.; "Nikkol T106 (a polyoxyethylene sorbitan monooleate)," "MYS-IEX (a polyoxyethylene monostearate)," and "Hexagline 4-0 (a hexaglyceryl tetraoleate)", manufactured by Nikko Chemicals Co., Ltd.; and "AJISPER 821, 822, and 824", manufactured by Ajinomoto Fine-Techno Co., Inc.

These pigment dispersants in the ink jet ink are preferably contained in the content ranging from 5 to 70% by mass, and more preferably 10 to 50% by mass, based on 100% by mass of a pigment. In the case of less than 5%, there are some cases where dispersion stability is hardly obtained, and in the case of more than 70% by mass, there are some cases where discharge stability is deteriorated.

Furthermore, such a pigment dispersant preferably has a solubility of 5% by mass or more with respect to the entire cationically polymerizable compound at 0° C. If the solubility is less than 5% by mass, when the ink is stored at a low temperature of from about 0° C. to 10° C., an unfavorable polymer gel or a soft aggregate of a pigment may occur in some cases, and thus, the storage stability and the discharge stability of the ink may be deteriorated in some cases.

[Radical Polymerization Inhibitors]

For the actinic energy radiation curable ink jet ink composition or the ink jet ink of the present invention, from a viewpoint of storage stability, it is preferable to add a radical polymerization inhibitor. There are some cases where radical polymerization occurs by the radicals generated by the effect of heat or light during storage. By adding a radical polymerization inhibitor to the actinic energy radiation curable ink jet ink composition or ink jet ink of the present invention, radical polymerization occurring during storage is inhibited. On the other hand, from a viewpoint that curing of photocation polymerization is not inhibited, there are actions that photocuring of the ink having excellent curability, mainly containing vinyl ether as in the present invention is not inhibited and only storage stability over time of the ink is enhanced, which is thus a highly preferable embodiment.

Examples of the radical polymerization inhibitor include a phenol-based hydroxyl group-containing compound, quinones such as methoquinone (hydroquinone monomethyl ether), hydroquinone, 4-methoxy-1-naphthol; a hindered amine-based anti-oxidant, 1,1-diphenyl-2-picrylhydrazyl free radicals, N-oxide compounds, piperidine 1-oxy free radical compounds, pyrrolidine 1-oxy free radical compounds, N-nitrosophenylhydroxylamines, a nitrogen-containing heterocyclic mercapto-based compound, a thioether-based anti-oxidant, a hindered phenol-based anti-oxidant, ascorbic acid, zinc sulfate, thiocyanates, thiourea derivatives, various sugars, a phosphoric acid-based anti-oxidant, a nitrite, a sulfite, a thiosulfate, hydroxylamine derivatives, a polycondensate of a dicyandiamide and a polyalkylenepolyamine, and phenothiazine.

Specific examples of the radical polymerization inhibitor include the following compounds.

Examples of the phenolic compound as a radical polymerization inhibitor include phenol, an alkylphenol such as o-, m-, or p-cresol(methylphenol), 2-t-butyl-4-methylphenol, 6-t-butyl-2,4-dimethylphenol, 2,6-di-t-butyl-4-methylphenol, 2-t-butylphenol, 4-t-butylphenol, 2,4,-di-t-butylphenol, 2-methyl-4-t-butylphenol, 4-t-butyl-2,6-dimethylphenol, or 2,2'-methylene-bis-(6-t-butyl-methylphenol), 4,4'-oxydiphenol, 3,4-methylenedioxydiphenol (sesame oil), 3,4-dimethylphenol, benzcatechin(1,2-dihydroxybenzole), 2-(1'-methylcyclohex-1'-yl)-4,6-dimethylphenol, 2- or 4-(1'-phenyleth-1'-yl)phenol, 2-t-butyl-6-methylphenol, 2,4,6-tris-t-butylphenol, 2,6-di-t-butylphenol, nonylphenol [CAS No. 11066-49-2], octylphenol [CAS No. 140-66-9], 2,6-dimethylphenol, bisphenol A, bisphenol B, bisphenol C, bisphenol F, bisphenol S, 3,3',5,5'-tetrabromobisphenol A, 2,6-di-t-butyl-p-cresol, Koresin (manufactured by BASF Aktiengesellschaft), methyl 3,5-di-t-butyl-4-hydroxybenzoate, 4-t-butylbeozocatechin, 2-hydroxybenzyl alcohol, 2-methoxy-4-methylphenol, 2,3,6-trimethylphenol, 2,4,5-trimethylphenol, 2,4,6-trimethylphenol, 2-isopropylphenol, 4-isopropylphenol, 2,4,6-trimethylphenol, 6-isopropyl-m-cresol, n-octadecyl-β-(3,5-di-t-butyl-4-hydroxyphenyl)propionate, 1,1,3-tris-(2-methyl-4-hydroxyl-5-t-butylphenyl)butane, 1,3,5-trimethyl-2,4,6-tris-(3,5-di-t-butyl-4-hydroxybenzyl)benzole, 1,3,5-tris-(3,5-di-t-butyl-4-hydroxybenzyl)isocyanurate, 1,3,5-tris-(3,5-di-t-butyl-4-hydroxyphenyl)propionyloxyethyl-isocyanurate, 1,3,5-tris-(2,6-dimethyl-3-hydroxy-4-t-butylbenzyl)isocyanurate, pentaerythrit-tetrakis-[β-(3,5-di-t-butyl-4-hydroxyphenyl)propionate], 2,6-di-t-butyl-4-dimethylaminomethylphenol, 6-s-butyl-2,4-dinitrophenol, Irganox 565, 1010, 1076, 1141, 1192, 1222, and 1425 (manufactured by Firma Ciba Spezialitaetenchemie), octadecyl 3-(3',5'-di-t-butyl-4'-hydroxyphenyl)propionate, hexadecyl 3-(3',5'-di-t-butyl-4'-hydroxyphenyl)propionate, octyl 3-(3',5'-di-t-butyl-4'-hydroxyphenyl)propionate, 3-thia-1,5-pentanediol-bis-[(3',5'-di-t-butyl-4'-hydroxyphenyl)propionate], 4,8-dioxa-1,11'-undecanediol-bis[(3',5'-di-t-butyl-4'-hydroxyphenyl) propionate], 4,8-dioxa-1,11'-undecanediol-bis-[(3'-t-butyl-4'-hydroxy-5'-methylphenyl)propionate], 1,9-nonanediol-bis[(3',5'-di-t-butyl-4'-hydroxyphenyl)propionate], 1,7-heptanediamine-bis[3-(3',5'-di-t-butyl-4'-hydroxyphenyl) propionamide], 1,1-methanediamine-bis[3-(3',5'-di-t-butyl-4'-hydroxyphenyl)propionamide], 3-(3',5'-di-t-butyl-4'-hydroxyphenyl)propionic acid hydrazide, 3-(3',5'-dimethyl-4'-hydroxyphenyl)propionic acid hydrazide, bis-(3-t-butyl-5-ethyl-2-hydroxyphen-1-yl)methane, bis-(3,5-di-t-butyl-4-hydroxyphen-1-yl)methane, bis-[3-(1'-methylcyctohex-1'-yl)-5-methyl-2-hydroxyphen-1-yl]methane, bis-(3-t-butyl-2-hydroxy-5-methylphen-1-yl)methane, 1,1-bis-(5-t-butyl-4-hydroxy-2-methylphen-1-yl)ethane, bis-(5-t-butyl-4-hydroxy-2-methylphen-1-yl)sulfide, bis-(3-t-butyl-2-hydroxy-5-methylphen-1-yl)sulfide, 1,1-bis-(3,4-dimethyl-2-hydroxyphen-1-yl)-2-methylpropane, 1,1-bis-(5-t-butyl-3-methyl-2-hydroxyphen-1-yl)butane, 1,3,5-tris[1'-(3",5"-di-t-butyl-4"-hydroxyphen-1"'-yl)meth-1'-yl]2,4,6-trimethylbenzene, 1,1,4-tris-(5'-t-butyl-4'-hydroxy-2'-methylphen-1'-yl)butane, t-butylcatechol, an aminophenol such as p-aminophenol, a nitrosophenol such as p-nitrosophenol or p-nitroso-o-cresol, an alkoxyphenol such as 2-methoxyphenol (guaiacol, benzcatechin monomethyl ether), 2-ethoxyphenol, 2-isopropoxyphenol, 4-methoxyphenol (hydroquinone monomethyl ether), or mono- or di-t-butyl-4-methoxyphenol, 3,5-di-t-butyl-4-hydroxyanisole, 3-hydroxy-4-methoxybenzyl alcohol, 2,5-dimethoxy-4-hydroxybenzyl alcohol (syringa alcohol), 4-hydroxy-3-methoxybenzaldehyde (vanillin), 4-hydroxy-3-ethoxybenzaldehyde (ethylvanillin), 3-hydroxy-4-methoxybenzaldehyde (isovanillin), 1-(4-hydroxy-3-methoxyphenyl)ethanone (acetovanillone), eugenol, dihydroeugenol, isoeugenol, tocopherols such as α-, β-, γ-, δ-, and ε-tocopherol, tocol, α-tocopherolhydroquinone, and 2,3-dihydro-2,2-dimethyl-7-hydroxybenzofuran (2,2-dimethyl-7-hydroxycoumarane).

Examples of the quinone and the hydroquinone as a radical polymerization inhibitor include hydroquinone, hydroquinone monomethyl ether (4-methoxyphenol), methylhydroquinone, 2,5-di-t-butylhydroquinone, 2-methyl-p-hydroquinone, 2,3-dimethylhydroquinone, trimethylhydroquinone, 4-methylbenzcatechin, t-butylhydroquinone, 3-methylbenzcatechin, benzoquinone, 2-methyl-p-hydroquinone, 2,3-dimethylhydroquinone, trimethylhydroquinone, t-butylhydroquinone, 4-ethoxyphenol, 4-butoxyphenol, hydroquinone monobenzyl ether, p-phenoxyphenol, 2-methylhydroquinone, tetramethyl-p-benzoquinone, diethyl-1,4-cyclohexanedione-2,5-dicarboxylate, phenyl-p-benzoquinone, 2,5-dimethyl-3-benzyl-p-benzoquinone, 2-isopropyl-5-methyl-p-benzoquinone (thymoquinone), 2,6-diisopropyl-p-benzoquinone, 2,5-dimethyl-3-hydroxy-p-benzoquinone, 2,5-dihydroxy-p-benzoquinone, embelin, tetrahydroxy-p-benzoquinone, 2,5-dimethoxy-1,4-benzoquinone, 2-amino-5-methyl-p-benzoquinone, 2,5-bisphenylamino-1,4-benzoquinone, 5,8-dihydroxy-1,4-naphthoquinone, 2-anilino-1,4-naphthoquinone, anthraquinone, N,N-dimethylindoaniline, N,N-diphenyl-p-benzoquinonediimine, 1,4-benzoquinonedioxime, ceruligone, 3,3'-di-t-butyl-5,5'-dimethyldiphenoquinone, p-rosolic acid (aurin), 2,6-di-t-butyl-4-benzylidenebenzoquinone, and 2,5-di-t-butyl-amylhydroquinone.

Examples of the N-oxyl compounds (compounds containing a nitroxyl or N-oxyl group, or at least one >N—O group) as a radical polymerization inhibitor include 4-hydroxy-2,2,6,6-tetramethyl-piperidine-N-oxyl, 4-oxo-2,2,6,6-tetramethyl-piperidine-N-oxyl, 4-methoxy-2,2,6,6-tetramethyl-piperidine-N-oxyl, 4-acetoxy-2,2,6,6-tetramethyl-piperidine-N-oxyl, 2,2,6,6-tetramethyl-piperidine-N-oxyl, Uvinul 4040P (manufactured by BASF Aktiengesellschaft), 4,4',4"-tris-(2,2,6,6-tetramethyl-piperidine-N-oxyl)phosphite, 3-oxo-2,2,5,5-tetramethyl-pyrrolidine-N-oxyl, 1-oxyl-2,2,6,6-tetramethyl-4-methoxypiperidine, 1-oxyl-2,2,6,6-tetramethyl-4-trimethylsilyloxypiperidine, 1-oxyl-2,2,6,6-tetramethylpiperidin-4-yl 2-ethylhexanoate, 1-oxyl-2,2,6,6-tetramethylpiperidin-4-yl sebacate, 1-oxyl-2,2,6,6-tetramethylpiperidin-4-yl stearate, 1-oxyl-2,2,6,6-tetramethylpiperidin-4-yl benzoate, 1-oxyl-2,2,6,6-tetramethylpiperidin-4-yl(4-t-butyl)benzoate, bis-(1-oxyl-2,2,6,6-tetramethylpiperidin-4-yl)succinate, bis-(1-oxyl-2,2,6,6-tetramethylpiperidin-4-yl)adipate, bis-(1-oxyl-2,2,6,6-tetramethylpiperidin-4-yl) 1,10-decanedioate, bis-(1-oxyl-2,2,6,6-tetramethylpiperidin-4-yl) n-butylmalonate, bis-(1-oxyl-2,2,6,6-tetramethylpiperidin-4-yl)phthalate, bis-(1-oxyl-2,2,6,6-tetramethylpiperidin-4-yl)isophthalate, bis-(1-oxyl-2,2,6,6-tetramethylpiperidin-4-yl)terephthalate, bis-(1-oxyl-2,2,6,6-tetramethylpiperidin-4-yl) hexahydroterephthalate, N,N'-bis-(1-oxyl-2,2,6,6-tetramethylpiperidin-4-yl)adipamide, N-(1-oxyl-2,2,6,6-tetramethylpiperidin-4-yl)caprolactam, N-(1-oxyl-2,2,6,6-tetramethylpiperidin-4-yl)dodecylsuccinimide, 2,4,6-tris-[N-butyl-N-(1-oxyl-2,2,6,6-tetramethylpiperidin-4-yl) triazine, N,N'-bis-(1-oxyl-2,2,6,6-tetramethylpiperidin-4-yl)-N,N'-bis-formyl-1,6-di aminohexane, and 4,4'-ethylene-bis-(1-oxyl-2,2,6,6-tetramethylpiperazin-3-one).

Examples of the aromatic amine or the phenylenediamine as a radical polymerization inhibitor include N,N-diphenylamine, N-nitroso-diphenylamine, nitrosodiethylaniline, p-phenylenediamine, an N,N'-dialkyl-p-phenylenediamine (in which the alkyl groups may be the same as or different from each other and each may be independently straight-chained or branched having 1 to 4 carbon atoms) such as N,N'-di-isobutyl-p-phenylenediamine, or N,N'-di-isopropyl-p-phenylenediamine, Irganox 5057 (manufactured by Firma Ciba Spezialitaetenchemie), N-phenyl-p-phenylenediamine, N,N'-diphenyl-p-phenylenediamine, N-isopropyl-N-phenyl-p-phenylenediamine, N,N'-di-s-butyl-p-phenylenediamine (Kerobit BPD produced by BASF Aktiengesellschaft), N-phenyl-N'-isopropyl-p-phenylenediamine (Vulkanox 4010 produced by Bayer A G), N-(1,3-dimethylbutyl)-N'-phenyl-p-phenylenediamine, N-phenyl-2-naphthylamine, iminodibenzyl, N,N'-diphenylbenzidine, N-phenyltetraaniline, acridone, 3-hydroxydiphenylamine, and 4-hydroxydiphenylamine.

Examples of the imine as a radical polymerization inhibitor include methylethylimine, (2-hydroxyphenyl)benzoquinonimine, (2-hydroxyphenyl)benzophenonimine, N,N-dimethylindoaniline, thionine(7-amino-3-imino-3H-phenothiazine), and Methylene Violet (7-dimethylamino-3-phenothiazinone).

Examples of the sulfonamides as a radical polymerization inhibitor include N-methyl-4-toluolenesulfonamide, N-t-butyl-4-toluenesulfonamide, N-t-butyl-N-oxyl-4-toluenesulfonamide, N,N'-bis(4-sulfanilamide)piperidine, and 3-{[5-(4-aminobenzoyl)-2,4-dimethylbenzenesulfonyl]ethylamino}-4-meth ylbenzenesulfonic acid.

Examples of the oxime as a radical polymerization inhibitor include aldoximes, ketoximes, or amidoximes, preferably diethyl ketoxime, acetoxime, methyl ethyl ketoxime, cyclcohexanone oxime, benzaldehyde oxime, benzyl dioxime, dimethylglyoxime, 2-pyridinaldoxime, salicylaldoxime, phenyl-2-pyridyl ketoxime, 1,4-benzoquinone dioxime, 2,3-butanedione dioxime, 2,3-butanedione monooxime, 9-fluorenone oxime, 4-t-butyl-cyclohexanone oxime, ethyl N-ethoxyacetimidate, 2,4-dimethyl-3-pentanone oxime, cyclododecanone oxime, 4-heptanone oxime, and di-2-furanylethanedione dioxime, or other aliphatic or aromatic oximes or alkyl transfer reagents such as alkyl halides, alkyl triflates, alkyl sulfonates, alkyl tosylates, alkyl carbonates, alkyl sulfates, or alkyl phosphates, as well as reaction products thereof.

Examples of the hydroxylamine as a radical polymerization inhibitor include N,N-diethylhydroxylamine and the compounds described in the International Application Publication of PCT/EP03/03139.

Examples of the urea derivative as a radical polymerization inhibitor include urea or thiourea.

Examples of the phosphorus-containing compound include triphenylphosphine, triphenyl phosphite, hypophosphorous acid, trinonyl phosphite, triethyl phosphite, and diphenyl isopropylphosphine.

Examples of the sulfur-containing compound as a radical polymerization inhibitor include diphenyl sulfide, phenothiazine, and sulfur-containing natural substances such as cysteine.

Examples of the complexing agent based on tetraazaannulene (TAA) as a radical polymerization inhibitor include dibenzotetraaza[14] rings and porphyrins as listed in Chem. Soc. Rev., 1998, 27, 105-115.

Other examples of the radical polymerization inhibitor include metals (copper, manganese, cerium, nickel, and chromium) salts such as carbonates, chlorides, dithiocarbamates, sulfates, salicylates, acetates, stearates, and ethylhexanoates.

Further, an N-oxyl free radical compound having a vinyl ether functional group, as described in Macromol. Rapid Commun., 28, 1929 (2007), which is structured so as to have both a polymerizable function and a radical trapping function in the same molecule, can be added to the ink jet ink of the present invention from the viewpoints of curability and ink storability. A polymer obtained through the polymerization of such a compound has free radicals in its side chains. This polymer can also be added to the ink jet ink of the present invention from the viewpoints of the physical properties of a cured film, such as solvent resistance, anti-abrasion properties, and weather resistance, or ink storability.

The content of the radical polymerization inhibitor in the actinic energy radiation curable ink jet ink composition or the ink jet ink (per 1 g) of the present invention is preferably from 1.0 to 5000 µg/g in ink, and more preferably from 10 to 2000 µg/g in ink. If the content is 1.0 µg/g in ink or more, desired storage stability is obtained and increased viscosity of the ink and liquid repellency to the ink jet nozzles can be realized, which is thus preferable from the viewpoint of discharge stability. Further, in the case of 5000 µg/g in ink or less, high curing sensitivity can be maintained while not impairing the acid generating efficiency of the polymerization initiator.

[Other Additives]

The actinic energy radiation curable ink jet ink composition or the ink jet ink of the present invention may contain, if necessary, various additives. Examples of the additives include surfactants, lubricants, fillers, anti-foaming agents, gelling agents, thickeners, resistivity modifiers, film forming agents, ultraviolet absorbers, antioxidants, discoloration inhibitors, anti-fungal agents, and rust inhibitors. These are added according to the purposes of improving jetting stability, suitability of printheads or ink packaging containers, storage stability, image storability, and other various performances.

In addition, if necessary, a small amount of a solvent such as an ester-based solvent, an ether-based solvent, an ether ester-based solvent, a ketone-based solvent, an aromatic hydrocarbon solvent, and a nitrogen-containing organic solvent may also be contained.

Examples of the solvent include dimethyl sulfoxide, diethyl sulfoxide, methyl ethyl sulfoxide, diphenyl sulfoxide, tetraethylene sulfoxide, dimethyl sulfone, methyl ethyl sulfone, methyl isopropyl sulfone, methyl hydroxyethyl sulfone, sulfolane, N-methyl-2-pyrrolidone, 2-pyrrolidone, β-lactam, N,N-dimethylformamide, N,N-diethylformamide, N,N-dimethyl acetamide, 1,3-dimethyl-2-imidazolidinone, 3-methyl-2-oxazolidinone, γ-butyrolactone, γ-valerolactone, isophorone, cyclohexanone, propylene carbonate, anisole, methyl ethyl ketone, acetone, ethyl lactate, butyl lactate, dioxane, ethyl acetate, butyl acetate, diethylene glycol dimethyl ether, dibasic acid esters, and methoxybutyl acetate. Any of these is added to the ink in the amount of 1.5 to 30%, and preferably at 1.5 to 15% to enhance the adhesion properties to a resin recording medium such as polyvinyl chloride.

Other specific examples of the solvent include alkylene glycol monoalkyl ethers such as diethylene glycol monoethyl ether, triethylene glycol monomethyl ether, dipropylene glycol monomethyl ether, and tripropylene glycol monomethyl ether; alkylene glycol dialkyl ethers such as ethylene glycol dibutyl ether and tetraethylene glycol dimethyl ether; and alkylene glycol monoalkyl ether acetates such as ethylene glycol monobutyl ether acetate, as well as diethylene glycol diethyl ether, dipropylene glycol dimethyl ether, dipropylene glycol diethyl ether, ethylene glycol diacetate, and propylene glycol diacetate.

Examples of the surfactant that can be used in the actinic energy radiation curable ink jet ink composition or the ink jet ink of the present invention include anionic surfactants such as dialkyl sulfosuccinates, alkyl naphthalene sulfonates, and fatty acid salts; nonionic surfactants such as polyoxyethylene alkyl ethers, polyoxyethylene alkyl allyl ethers, acetylene glycols, and polyoxyethylene-polyoxypropylene block copolymers; cationic surfactants such as alkylamine salts and quaternary ammonium salts; and silicone-based and fluorine-based surfactants. The silicone-based and fluorine-based surfactants are particularly preferred.

By adding a silicone-based or fluorine-based surfactant, ink mixing properties with a recording medium formed of various hydrophobic resins including vinyl chloride sheets, or a recording medium having slow absorption, such as printing paper, can be further suppressed, and therefore, a printed image having a high image quality is obtained. The surfactant is particularly preferably used in combination with a water-soluble organic solvent having a low surface tension.

Preferable examples of the silicone-based surfactant include polyether-modified polysiloxane compounds, for example, KF-351A, KF-642, and X-22-4272, manufactured by Shin-Etsu Chemical Co., Ltd., BYK307, BYK345, BYK347, and BYK348, manufactured by BYK-Chemie GmbH, and TSF4452 manufactured by Momentive Performance Materials.

The fluorine-based surfactant means an ordinary surfactant, in which a part of or the total of hydrogen bonds to carbon of a hydrophobic group are substituted by fluorine. Among them, those having a perfluoroalkyl group in a molecule are preferred.

The fluorine-based surfactants are each commercially available under a product name of Megaface F from Dainippon Ink & Chemicals, Inc.; under a product name of Surflon from Asahi Glass Co., Ltd.; under a product name of Fluorad FC from 3M Company; under a product name of Monflor from Imperial Chemical Industries; under a product name of Zonyl from E. I. du Pont de Numours and Company; under a product name of Licowet VPF from Hoechst AG; and under a product name of Ftergent from Neos Corp.

The addition amount of the surfactant in the actinic energy radiation curable ink jet ink composition or the ink jet ink of the present invention is preferably 0.1% by mass or more and less than 2.0% by mass, based on the total mass of the ink.

When the surface tension of the ink jet ink is set to 15 mN/m or more, the periphery of the nozzles of the ink jet head are wet, whereby it is difficult to decrease the discharge performance. Further, when the surface tension of the ink jet ink is set to less than 35 mN/m, there is good wettability in a coating paper having a lower surface energy than that of a common species or a resin-made recording medium, thereby generating no white turbidity, which is thus preferable.

[Ink Physical Properties]

The ink jet ink of the present invention preferably has the same physical property values as those of a common actinic energy radiation curable ink jet ink.

The ink jet ink preferably exhibits a viscosity of 2 to 50 mPa·s at 25° C., as little as possible shear rate dependency, and a surface tension in the range of 22 to 35 mN/m at 25° C. In the case of using a pigment as a colorant, it is preferable to provide an ink, which has, other than pigment particles, no gel-shaped substance having an average particle diameter of more than 1.01 µm; exhibits a conductivity of 10 µS/cm or less; and induces no electrical corrosion in the interior of the head. In a continuous type, the conductivity needs to be adjusted using an electrolyte, and in this case, the conductivity needs to be adjusted to 0.5 mS/cm or more.

In addition, for the ink jet ink of the present invention, it is preferable that when DSC measurement of the ink is carried out at a dropping rate of 5° C./minute in the range of 25° C. to −25° C., the calorific value per mass is not exhibited at 10 mJ/mg or more as the exothermic peak. Selection of materials based on the constitution of the present invention makes it possible to prevent heat generation of a given amount or more based on the DSC measurement. With such a constitution, even when an ink is stored at low temperatures, generation of gel and generation of deposits can be inhibited.

[Ink Preparation Method]

The ink jet ink of the present invention is prepared by dispersing a polymerizable compound which is an actinic energy radiation curable compound, a photopolymerization initiator, and a colorant. When the colorant is a pigment, a pigment dispersant is dispersed together, using a common homogenizer such as a sand mill.

Preferably, a highly concentrated liquid of a pigment is previously prepared, followed by being diluted with a polymerizable compound, to prepare an ink jet ink. According to this method, dispersion using such a common homogenizer enables carrying out sufficient dispersion and thus, an excessive amount of dispersion energy and excessively long dispersion duration are not required, whereby the quality of the ink components is unlikely to be changed during the dispersion step, and an ink exhibiting excellent stability can be prepared.

The prepared ink is preferably filtered with a filter of a pore diameter of 3 µm or less, and more preferably 1 µM or less.

<<Recording Media>>

As a recording medium used for the ink jet recording method of the present invention, a wide variety of all the synthetic resins having been used for the applications are considered exemplified, and specific examples thereof include polyester, polyvinyl chloride, polyethylene, polyurethane, polypropylene, acrylic resins, polycarbonate, polystyrene, an acrylonitrile-butadiene-styrene copolymer, polyethylene terephthalate, and polybutadiene terephthalate. The thicknesses and shapes of these synthetic resin substrates are not particularly limited. In addition, metals, glass, and printing paper may also be used.

Examples of the polyvinyl chloride include SOL-371G, SOL-373G, and SOL-4701 (manufactured by VIGteQnos Co., Ltd.); glossy vinyl chloride (manufactured by System Graphi Co., Ltd.); KSM-VS, KSM-VST, and KSM-VT (manufactured by Kimoto Co., Ltd.); J-CAL-HGX, J-CAL-YHG, and J-CAL-WWWG (manufactured by Kyosyo Co., Ltd., Osaka); BUS MARK V400F vinyl and LITEcal V-600F vinyl (manufactured by Flexcon Co.); FR2 (manufactured by Hanwha Corp.); LLBAU13713 and LLSP20133 (manufactured by Sakurai Co., Ltd.); P-370B and P-400M (manufactured by Kanbo Pras Corp.); S02P, S12P, S13P, S14P, S22P, S24P, S34P, and S27P (manufactured by Grafityp Co.); P-223RW, P-224RW, P-249ZW, and P-284ZC (manufactured by Lintec Corp.); LKG-19, LPA-70, LPE-248, LPM-45, LTG-11, and LTG-21 (manufactured by Shinseisha Co., Ltd.); MPI3023 (manufactured by Toyo Corp.); Napoleon Gloss glossy vinyl chloride (manufactured by Niki Inc.); JV-610 and Y-114 (manufactured by IKC Co., Ltd.); NIJ-CAPVC and NIJ-SPVCGT (manufactured by Nitie Corp.); 3101/H12/P4, 3104/H12/P4, 3104/H12/P4S, 9800/H12/P4, 3100/H12/R2, 3101/H12/R2, 3104/H12/R2, 1445/H14/P3, and 1438/One Way Vision (manufactured by Intercoat Co.); JT5129PM, JT5728P, JT5822P, JT5829P, JT5829R, JT5829PM, JT5829RM, and JT5929PM (manufactured by Mactac AG); MPI1005, MPI1900, MPI2000, MPI2001, MPI2002, MP13000, MPI3021, MPI3500, and MPI3501 (manufactured by Avery Corp.); AM-101G and AM-501G (manufactured by Gin-Ichi Corp.); FR2 (manufactured by Hanwha Japan Co., Ltd.), AY-15P, AY-60P, AY-80P, DBSP137GGH, and DBSP137GGL (manufactured by Insight Co.); SJT-V200F and SJT-V400E-1 (manufactured by Hiraoka & Co., Ltd.); SPS-98, SPSM-98, SPSH-98, SVGL-137, SVGS-137, MD3-200, MD3-301M, MD5-100, MD5-101M, and MD5-105 (manufactured by Metamark UK Ltd.); 640M, 641G, 641M, 3105M, 3105SG, 3162G, 3164G, 3164M, 3164XG, 3164XM, 3165G, 3165SG, 3165M, 3169M, 3451SG, 3551G, 3551M, 3631, 3641M, 3651G, 3651M, 3651SG, 3951G, and 3641M (manufactured by Orafol Europe GmbH); SVTL-HQ130 (Lami Corporation Inc.); SP300 GWF and SPCLEARAD vinyl (manufactured by Catalina Co.); RM-SJR (manufactured by Ryoyoshoji Co., Ltd.), Hi Lucky and New Lucky PVC (manufactured by LG Corp.); SIY-110, SIY-310, and SIY-320 (manufactured by Sekisui Chemical Co., Ltd.); PRINT MI Frontlit and PRINT XL Light weight banner (manufactured by Endutex S. A.); RIJET 100, RIJET 145, and RIJET 165 (manufactured by Ritrama S.p.A.); NM-SG and NM-SM (manufactured by Nichiei Kakoh Co., Ltd.); LTO3GS (Rukio Co., Ltd.); Easy Print 80 and Performance Print 80 (manufactured by Jet-Graph Co., Ltd.); DSE 550, DSB 550, DSE 800G, DSE 802/137, V250WG, V300WG, and V350WG (manufactured by Hexis AG); and Digital White 6005PE and 6010PE (manufactured by Multi-fix N.V.).

Furthermore, for a recording medium (a so-called rigid substrate) formed of a resin substrate containing no plasticizer or a non-absorbable inorganic substrate as a component, one kind of substrate may be used singly or plural kinds of substrates may be used in combination, using any of the following various substrates as a component.

Examples of the resin substrate containing no plasticizer include ABS resins, polycarbonate (PC) resins, polyacetal (POM) resins, polyamide (PA) resins, polyethylene terephthalate (PET) resins, polyimide (PI) resins, acrylic resins, polyethylene (PE) resins, polypropylene (PP) resins, and hard polyvinyl chloride (PVC) resins containing no plasticizer.

These resins are characterized by containing no plasticizer, but other various characteristics such as thickness, shape, color, softening temperature, and hardness are not particularly limited.

The ink jet ink of the present invention can exhibit the effect of the present invention particularly favorably, in a recording medium having a surface energy of 25 mN/m or more and less than 50 mN/m. Examples of the surface energy of the recording medium include IJ180CV2 (manufactured by 3M, vinyl polychloride, surface energy=38.0 mN/m), MD5 (manufactured by Metamark, vinyl polychloride, surface energy=36.6 mN/m), ORAJET (manufactured by ORACAL, vinyl polychloride, surface energy=33.1 mN/m), OPAQUE MATT FILM (manufactured by Oce, polyethylene terephthalate, surface energy=35.4 mN/m), Tokubishi Art (manufactured by Mitsubishi Paper Mills Ltd., art paper, surface energy=37.6 mN/m), HANITA (manufactured by Hanita Coatings, polyethylene terephthalate, surface energy=35.4 mN/m), LUMIRROR 38-T60 (manufactured by Toray Industries, Inc., untreated polyethylene terephthalate, surface energy=36.9 mN/m), Sanroidoyuni G400 (manufactured by Sumitomo Bakelite Co., Ltd., vinyl polychloride, surface energy=34.5 mN/m), SUMIPEX 068 (manufactured by Sumitomo Chemical Co., Ltd., acryl cast, surface energy=39.5 mN/m), SUNLOID PET ACE EPG400 (manufactured by Sumitomo Bakelite Co., Ltd., non-crystalline polyethylene terephthalate, surface energy=35.7 mN/m), Lintec gloss (cast coated paper, surface energy=27 mN/m), manufactured by MAUL Adhesion), and White PET #50 solvent high-viscosity PGS (polyethylene terephthalate, surface energy 50 mN/m).

Furthermore, the surface energy and the surface tension of the recording medium according to the present invention can be calculated by measuring a contact angle using the exiting two or more kinds of liquid.

<<Ink Jet Recording Method>>

The ink jet ink is jetted to a recording medium as liquid droplets from the nozzles (jetting ports) of an ink jet head. The ink jet head system may be either an on-demand system or a continuous system. Further, as a jetting system, there may be used any of the discharge methods including an electrical-mechanical conversion system (for example, a single cavity type, a double cavity type, a vendor type, a piston type, a share mode type, and a shared-wall type) and an electrical-thermal conversion system (for example, a thermal ink jet type and a BUBBLE JET (a registered trademark) type).

The ink jet recording method of the present invention is a recording method in which the actinic energy radiation curable ink jet ink of the present invention is discharged onto a recording medium from the ink jet nozzles and then the ink is cured by the irradiation with actinic energy radiation such as ultraviolet radiation.

(Actinic Energy Radiation Irradiation Conditions after Ink Deposition)

In the ink jet recording method of the present invention, actinic energy radiation is preferably irradiated 0.001 seconds to 1.0 second after ink deposition, and more preferably 0.001 seconds to 0.5 seconds. In order to form high-precision images, it is preferable that the irradiation timing be as early as possible.

The method for irradiating actinic energy radiation is not particularly limited, and may be performed by, for example, the following methods.

The method for irradiating actinic energy radiation is not particularly limited, and may be performed by, for example, the following methods. Light sources are arranged on both sides of the head unit, and the head and the light sources are scanned via a shuttle system, and then irradiation is carried out within a specified period of time after ink deposition. Further, curing may be completed with another light source being stationary (see Japanese Patent Application Laid-Open No. SHO 60-132767). Alternatively, optical fibers are used for light irradiation or ultraviolet radiation is irradiated to a recording portion by hitting collimated radiation onto a mirror surface provided on the side of the head unit (see the specification of U.S. Pat. No. 6,145,979).

Further, the following method is also one of the preferred embodiments: namely, actinic energy radiation irradiation is divided into two stages; initially, actinic energy radiation is irradiated 0.001 to 2.0 seconds after ink deposition by the above method, and after completion of entire printing, actinic energy radiation is further irradiated. Dividing actinic energy radiation irradiation into two stages makes it possible to inhibit contraction of a recording material which tends to occur during ink curing.

(Total Ink Film Thickness after Ink Deposition)

In the ink jet recording method of the present invention, after deposition of an ink onto a recording medium and then curing via irradiation of actinic energy radiation, the total ink film thickness is preferably from 2 to 20 μm, from the viewpoint of curling and wrinkling of a recording medium and texture change of the recording medium. Herein, the term "total ink film thickness" refers to the maximum value of ink film thickness of an image recorded on a recording medium. The total ink film thickness is preferably from 2 to 20 μm in cases in which recording is conducted via a single-color ink jet recording method, as well as a 2-color superimposing (secondary color), 3-color superimposing, or 4-color superimposing (white ink base) ink jet recording method.

(Ink Heating and Discharge Conditions)

In the ink jet recording method of the present invention, actinic energy radiation is preferably irradiated while an actinic energy radiation curable ink jet ink is heated from the viewpoint of discharge stability. The heating temperature is preferably from 35 to 100° C., and more preferably from 35 to 80° C.

The method of heating the ink jet ink at a predetermined temperature and maintaining the temperature is not particularly limited, and examples thereof include a method in which an ink feeding system such as an ink tank constituting the ink jet head carriage, a feeding pipe, and a pre-chamber ink tank just prior to the head, piping with filters, and a piezo head are thermally insulated and heated to the predetermined temperature, using a panel heater, a ribbon heater, temperature-regulated water, or the like.

The ink jet ink is preferably heated and maintained at a controlled width in the range of a set temperature of ±5° C., more preferably a set temperature of ±2° C., and particularly preferably a set temperature of ±1° C., from the viewpoint of dischargeability.

The liquid droplet amount discharged from each nozzle is preferably from 2 to 20 pl, from the viewpoint of the recording speed and the image quality.

Next, an ink jet recording apparatus (hereinafter simply referred to as a recording apparatus) which can be used for the ink jet recording method of the present invention will be described.

The recording apparatus will be described with appropriate reference to Drawings below.

FIG. 1 is a front view showing the constitution of a main section of a recording apparatus.

Recording apparatus 1 is constituted with head carriage 2, recording head 3, irradiation member 4, and platen section 5.

In the recording apparatus 1, platen section 5 is arranged under recording medium P.

Platen section 5 functions to absorb ultraviolet radiation and absorbs any extra ultraviolet radiation which has passed through recording medium P.

As a result, a high-precision image can be reproduced very stably.

Recording medium P is guided by guide member 6 and is transported from the front to the rear in FIG. 1 via the action of a transporting member (not shown). A head scanning member (not shown) allows head carriage 2 to reciprocate in the direction Y in FIG. 1, whereby recording head 3 held by head carriage 2 is scanned.

Head carriage 2 is arranged on the upper side of recording medium P, and a plurality of recording heads 3, as described later, corresponding to the number of colors used for image printing on recording medium P, are housed in such a manner that the discharge orifices are arranged on the lower side.

Head carriage 2 is arranged for recording apparatus 1 main body to enable reciprocation in the direction Y in FIG. 1. Via the driving of the head scanning member, reciprocation is conducted in the direction Y in FIG. 1.

Furthermore, FIG. 1 is drawn so that head carriage 2 houses recording heads 3 for white (W), yellow (Y), magenta (M), cyan (C), black (K), light yellow (Ly), light magenta (Lm), light cyan (Lc), light black (Lk), and white (W). In practice, the number of colors of recording heads 3 housed in head carriage 2 is appropriately determined.

Recording head 3 discharges an actinic energy radiation curable ink jet ink (for example, a UV curable ink) fed by an ink feeding member (not shown) onto recording medium P from the discharge orifice via the operation of a plurality of discharge members (not shown) provided within the interior.

Recording head 3 moves from one end of recording medium P to the other end thereof in the direction Y in FIG. 1 via the driving of the head scanning member. Then, during this scanning, the UV ink is discharged onto a specified area (being a depositable area) of recording medium P in the form of ink droplets and then the ink droplets are deposited onto the depositable area, using recording head 3.

The above scanning is carried out a specified number of times to discharge the actinic energy radiation curable ink jet ink onto one depositable area. Thereafter, recording medium P is appropriately moved from the front to the rear in FIG. 1 via the transporting member. While scanning using the scanning member is carried out again, the UV ink is discharged onto a next depositable area adjacent to the above depositable area in the rearward direction in FIG. 1, using recording head 3.

The above operation is repeated, and the actinic energy radiation curable ink jet ink is discharged from recording head 3 under synchronization with the head scanning member and the transporting member to form an image containing an aggregate of the actinic energy radiation curable ink jet ink droplets on recording medium P.

Irradiation member 4 is constituted with an ultraviolet radiation lamp which emits ultraviolet radiation having a specific wavelength range at stable exposure energy and a filter which transmits ultraviolet radiation at a specific wavelength.

Herein, as the ultraviolet radiation lamp, a mercury lamp, a metal halide lamp, an excimer laser, an UV laser, a cold-cathode tube, a hot-cathode tube, a black light, an LED (light emitting diodes), or the like may be applied, with a band-shaped metal halide lamp, a cold-cathode tube, a hot-cathode tube, a mercury lamp, or a blacklight being preferable.

Preferred are a low-pressure mercury lamp, a hot-cathode tube, a cold-cathode tube, and a sterilization lamp, which particularly emit ultraviolet radiation at a wavelength of 254 nm, from the viewpoint of efficiently performing bleeding prevention and dot diameter control.

Use of a black light as a light source for irradiation member 4 makes it possible to inexpensively produce irradiation member 4 to cure a UV ink.

Irradiation member 4 is nearly similar in shape to the maximum capable of being set for the recording apparatus (a UV ink jet printer) 1 or is larger in shape than the depositable area among the depositable areas on which the UV ink is discharged via one scanning of recording head 3 driven by the head scanning member.

Irradiation member 4 is arranged via fixation on both the sides of head carriage 2 to be nearly parallel to recording medium P. Irradiation member 4 includes an illumination light source 8 which emits ultraviolet radiation at a specific wavelength, and a filter (not shown) which transmits ultraviolet radiation at a specific wavelength.

As described above, the illuminance in the ink discharge section is regulated, of course, by shielding the entire recording head 3 from light. Further, it is effective that a distance h1 between irradiation member 4 and recording medium P be set to be smaller than a distance h2 between ink discharge section 31 of recording head 3 and recording medium P (h1<h2); and also a distance between recording head 3 and irradiation member 4 be set to be large. Still further, it is more preferable that a bellows structure 7 be arranged between recording head 3 and irradiation member 4.

Herein, it is possible to appropriately change the wavelength of ultraviolet radiation irradiated by irradiation member 4 by replacing an ultraviolet radiation lamp or a filter provided for irradiation member 4.

Figure 2:
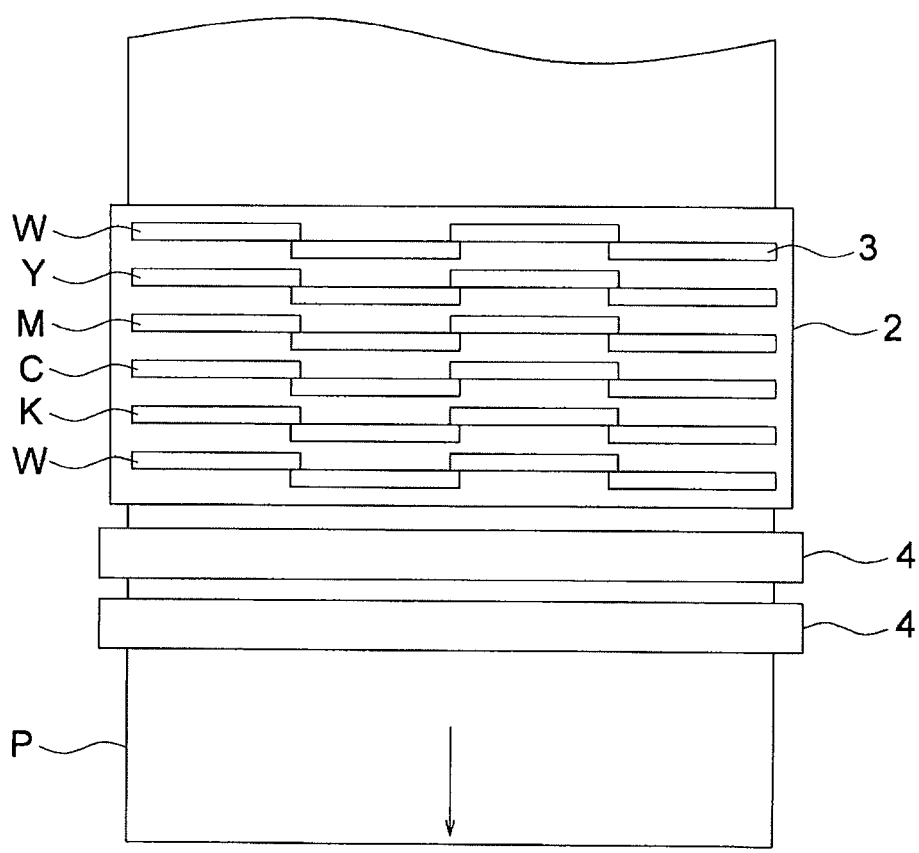
FIG. 2 is a top view showing another example of the constitution of a main section of an ink jet recording apparatus used in the ink jet recording method of the present invention.

FIG. 2 is a top view showing another example of the constitution of a main section of an ink jet recording apparatus.

The ink jet recording apparatus shown in FIG. 2 is referred to as a line head system, and a plurality of ink jet recording heads 3 of the individual colors are fixed and arranged on head carriage 2 to cover the entire width of recording medium P.

On the other hand, on the downstream side of head carriage 2, namely in the rear of head carriage 2 in the direction of transporting recording medium P, irradiation member 4 is provided via arrangement to cover the entire ink printing area, and similarly to cover the entire width of recording medium P.

As an ultraviolet radiation lamp used for irradiation member 4, the same one as shown in FIG. 1 can be used.

In this line head system, head carriage 2 and irradiation member 4 are fixed and only recording medium P is transported in the arrow direction to carry out image formation via ink discharge and curing.

EXAMPLES

Hereinbelow, the present invention will be specifically described with reference to Examples that by no means limit the scope of the present invention. Incidentally, the expression of "part" or "%" referred to in Examples represents "part by mass" or "% by mass" unless otherwise specified.

<<Synthesis of Maleimide Compound>>
[Synthesis of Maleimide Compound 1]

Into a 300-ml eggplant flask with a stirrer, a decompressing device, and a trap, 33.8 g of 2-maleimide 2-methyl acetic acid synthesized by the method as described in PTL "No. 3599160", 10.2 g of diethylene glycol, 4.47 g of p-toluenesulfonic acid monohydrate, 0.35 g of 2,6-tert-butyl-p-cresol, and 20 ml of toluene were put sequentially. Further, water and toluene thus produced were distilled off azeotropically under reduced pressure, and a reaction was performed while stirring for 5 hours under a condition of a reaction temperature of 80° C. The solution after the completion of the reaction was cooled to room temperature, dissolved in 300 ml of ethyl acetate, and washed with 100 ml of a saturated aqueous sodium hydrogen carbonate solution three times and with 100 ml of saturated physiological saline once. The obtained organic layer was dried over magnesium sulfate and then concentrated to obtain 24.7 g of a maleimide compound 1. This material is liquid at room temperature. Further, the e value of maleimide which is a polymerizable compound including the same structure as the unsaturated bonding moiety contained in the maleimide compound 1 is 2.86, and the charge of the carbon atoms constituting the unsaturated bond is −0.27.

The maleimide compound 1 synthesized above was analyzed by means of NMR.

$^1$H NMR (400 MHz, CDCl$_3$): 6.75 (s, 4H, —CH═CH—), 4.82 (q, 2H, N—CH—), 4.20-4.32 (m, 4H, —(C═O)—O—CH$_2$—), 3.58-3.67 (m, 4H, —CH$_2$—O—), 1.59 (d, 6H, —CH$_3$)

$^{13}$C NMR (100 MHz, CDCl$_3$): 169.7 [N—(C═O)], 169.5 [—(C═O)—O—], 134.3 (—CH═CH—), 68.7 [—(C═O)—O—CH$_2$—], 64.6 (—CH$_2$—O—), 47.4 (—CH—), 15.1 (—CH$_3$)

[Synthesis of Maleimide Compound 2]

Into a 300-ml eggplant flask with a stirrer, a decompressing device, and a trap, 5.0 g of N-β-oxy-n-propyl maleimide synthesized by the method as described in "Journal of Synthetic Organic Chemistry, Japan, Vol. 23, No. 2 (1965)", 2.82 g of azelaic acid, 0.7 g of p-toluenesulfonic acid monohydrate, 0.05 g of 2,6-tert-butyl-p-cresol, and 20 ml of toluene were put sequentially. Further, water and toluene thus produced were distilled off azeotropically under reduced pressure, and a reaction was performed while stirring for 12 hours under a condition of a reaction temperature of 80° C. The solution after the completion of the reaction was cooled to room temperature, dissolved in 300 ml of ethyl acetate, and washed with 100 ml of a saturated aqueous sodium hydrogen carbonate solution three times and with 100 ml of saturated physiological saline once. The obtained organic layer was dried over magnesium sulfate and then concentrated to obtain 3.2 g of a maleimide compound 2. This material is liquid at room temperature. Further, the e value of maleimide which is a polymerizable compound including the same structure as the unsaturated bonding moiety contained in the maleimide compound 2 is 2.86, and the charge of the carbon atoms constituting the unsaturated bond is −0.27.

The maleimide compound 2 synthesized above was analyzed by means of NMR.

$^1$H NMR (400 MHz, CDCl$_3$): 6.74 (s, 4H, —CH=CH—), 5.11-5.15 (m, 2H, —(C=O)—O—CH—), 3.64-3.68 (m, 4H, N—CH$_2$—), 2.23 (t, 4H, —O—(C=O)—CH$_2$—), 1.55 (brs, 4H, —CH$_2$—), 1.24-1.27 (m, 6H, —CH$_2$—), 1.24 (d, 6H, —CH$_3$)

$^{13}$C NMR (100 MHz, CDCl$_3$): 173.1 [—(C=O)—O—], 170.4 [N—(C=O)], 134.0 (—CH=CH—), 67.9 [—(C=O)—O—CH—], 41.8 (—N—CH$_2$—), 34.1 [—O—(C=O)—CH$_2$—], 28.7 (2C) (—CH$_2$—), 24.5 (—CH$_2$—), 17.5 (—CH$_3$)

[Synthesis of Maleimide Compound 3]

By the synthesis under the same conditions as in synthesis of the maleimide compound 1 above except that 15.4 g of 1,9-nonanediol was used instead of 10.2 g of diethylene glycol, 22.3 g of a maleimide compound 3 was obtained. This material was liquid at room temperature. Further, the e value of maleimide which is a polymerizable compound including the same structure as the unsaturated bonding moiety contained in the maleimide compound 3 is 2.86, and the charge of the carbon atoms constituting the unsaturated bond is −0.27.

The maleimide compound 3 synthesized above was analyzed by means of NMR.

$^1$H NMR (400 MHz, CDCl$_3$): 6.74 (s, 4H, —CH=CH—), 4.78 (q, 2H, N—CH—), 4.08-4.18 (m, 4H, —(C=O)—O—CH$_2$—), 1.58-1.65 (m, 10H, —CH$_2$—, —CH$_3$), 1.24-1.28 (m, 10H, —CH$_2$—)

$^{13}$C NMR (100 MHz, CDCl$_3$): 169.8 [N—(C=O)], 169.6 [—(C=O)—O—], 134.3 (—CH=CH—), 65.8 [—(C=O)—O—CH$_2$—], 47.5 (N—CH—), 29.2 (—CH$_2$—), 28.9 (—CH$_2$—), 28.3 (—CH$_2$—), 25.6 (—CH$_2$—), 15.1 (—CH$_3$)

[Synthesis of Maleimide Compounds 4 to 6]

A maleimide compound 4, a maleimide compound 5, and a maleimide compound 6 were synthesized in accordance with the methods described in Japanese Patent Application Laid-Open No. HEI 11-124403 and Japanese Patent Application Laid-Open No. 2003-213171. The charge of the carbon atoms constituting the unsaturated bond contained in the synthesized maleimide compound 4 is −0.27; the charge of the carbon atoms constituting the unsaturated bond contained in the synthesized maleimide compound 5 is −0.09; and the charge of the carbon atoms constituting the unsaturated bond contained in the synthesized maleimide compound 6 is −0.27.

The specific structures of the synthesized maleimide compounds 1 to 6 synthesized above are shown below.

[Chem. 30]

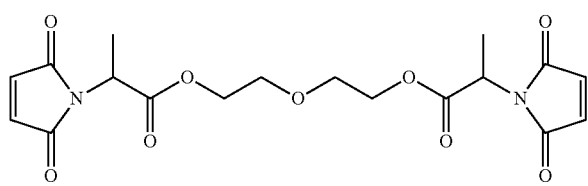

Maleimide Compound 1

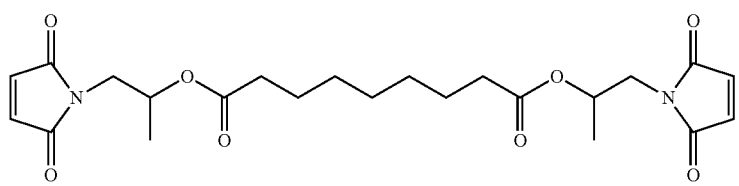

Maleimide Compound 2

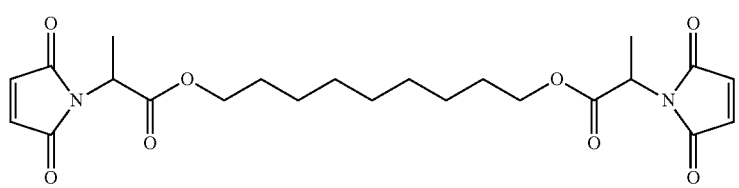

Maleimide Compound 3

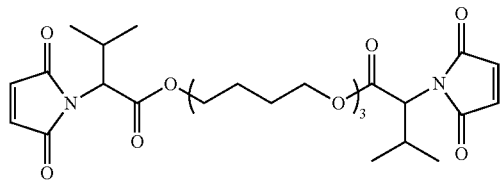

Maleimide Compound 4

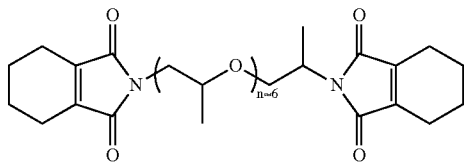

Maleimide Compound 5

Maleimide Compound 6

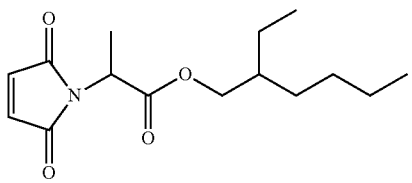

[Preparation of Pigment Dispersion Product 1]

6.0 g of C. I. Pigment Red 122 (surface-treated, purified product) as a magenta pigment, 3.0 g of AJISPER-PB822 (manufactured by Ajinomoto Fine-Techno Co., Inc.) as a pigment dispersant, and 40 g of triethylene glycol divinyl ether (purified product) together with 200 g (200 parts by mass) of 0.5-mm zirconia beads were put into a 100-ml polypropylene closed container, and dispersed using a paint shaker (manufactured by Red Devil Equipment Co., TWIN-ARM ONE-GALLON SHAKER 5400) for 6 hours to obtain a pigment dispersion product 1.

Example 1

Preparation of Ink (Preparation of Ink 1-1)

Into a mixed liquid formed by mixing the maleimide compound 1 prepared above and the triethylene glycol divinyl ether (purified product) under the conditions where the molar ratio of the functional groups is 35:65, the pigment dispersion product 1 prepared above in such an amount that the pigment concentration was 4.5% by mass, 3.0% by mass of an acylphosphine oxide-based photopolymerization initiator Lucirin TPO (manufactured by BASF), 2.0% by mass of isopropylthioxanthone (purified product), and 0.15% by mass of IRGASTAB UV-10 (manufactured by BASF) as a polymerization inhibitor were mixed, and finally, finished to 100% by mass with a mixed liquid formed by mixing the maleimide compound 1 and the triethylene glycol divinyl ether (purified product) under the conditions where the molar ratio of the functional groups is 35:65, thereby preparing an ink 1-1.

Then, the contents of the elemental ions of the ink 1-1 were analyzed using a high frequency inductively coupled plasma mass spectrometer (ICP-MS), a high frequency inductively coupled plasma-atomic emission spectrometer (ICP-AES), the amounts of the elemental ions (Fe, Co, Ca, Na, Mg, Al, Ti, Sn, and Zn) in the ink 1-1, and as a result, it was proved that only Ca ions were contained at 1 ppm.

(Preparation of Inks 1-2 to 1-5)

In the same manner as for the preparation of the ink 1-1, except that the purification conditions of the respective additives of the pigments, the maleimide compounds, and triethylene glycol divinyl ether, used in the preparation, were appropriately adjusted and the contents of the elemental ions described in Table 1 were used, inks 1-2 to 1-5 were prepared.

The charge of the carbon atoms constituting the unsaturated bond contained in the maleimide compound 1 is −0.27, and charge of the carbon atoms constituting the unsaturated bond contained in triethylene glycol divinyl ether (purified product) is −0.54, with the difference in the charges being 0.27.

[Evaluation of Inks]

(Evaluation of Storability 1: Evaluation of Viscosity Stability)

After subjecting each ink to forced deterioration storage at 60° C. for 2 weeks in the state of being sealed in a glass bottle, the viscosity (mPa·s) of each of the inks before and after the forced deterioration treatment at 50° C. was measured by a rheometer (MCR300 manufactured by Paar Physica), and the viscosity variation between before and after the forced deterioration treatment was determined by the following equation and the stability 1 (storage stability) was evaluated based on the following criteria.

Viscosity variation rate={(Viscosity of ink after forced degradation treatment−Viscosity of ink before forced degradation treatment/(Viscosity of ink before forced degradation treatment)}×100(%)

A: The viscosity variation rate is less than 5.0%.
B: The viscosity variation rate is 5.0% or more and less than 10.0%.
C: The viscosity variation rate is 10.0% or more and less than 15.0%.
D: The viscosity variation rate is 15.0% or more.

(Evaluation of Storability 2: Evaluation of Curing Sensitivity Stability)

Using each of the inks before and after the forced deterioration treatment, prepared in Evaluation of Storability 1 above, each of the inks was coated on a polyethylene terephthalate film with a wire bar (No. 3) and irradiated with light by means of an LED at 385 nm with an output of 2 W/cm². Further, the film surface immediately after curing was contacted and the light amount (cured light amount) at a time of the surface tack (stickiness) disappearing was measured, and the curing sensitivity variation of the ink between before and after the forced deterioration treatment was measured in the following manner, and the storability 2 (curing sensitivity stability) was evaluated by the following criteria.

Curing sensitivity rate={(Curing sensitivity of ink after forced degradation treatment−Curing sensitivity of ink before forced degradation treatment/(Curing sensitivity of ink before forced degradation treatment)}×100(%)

A: The curing sensitivity rate is less than 20%.
B: The curing sensitivity rate is 20% or more and less than 50%.
C: The curing sensitivity rate is 50% or more and less than 150%.
D: The curing sensitivity rate is 150% or more.

(Evaluation of Storability 3: Evaluation of Jetting Stability)

With each of the inks before and after the forced deterioration treatment, prepared in Evaluation of Storability 1 above, using a piezo head KM512MH manufactured by Konica Minolta IJ Technologies, a solid image at 720 dpi× 720 dpi (in which dpi mentioned in the present invention represents the number of dots per 2.54 cm) with a liquid droplet amount per dot of 14 pl was printed on a polyethylene terephthalate film, and irradiated with light in a light amount of 320 mJ/cm² by means of an LED at 385 nm with an output of 2 W/cm² to form a cured image film.

At this time, for each of the inks before and after the forced deterioration treatment, jetting was performed under the same condition as the driving voltage of the piezoelectric head KM512MH, the image state of the cured image film was visually observed, and evaluation of the storability 3 (jetting stability) was performed by the following evaluation criteria.

A: With both the inks before and after the forced deterioration treatment, the color missing of an image and the distortion of the image on the boundary portion (edge portion) with the non-printing portion were not observed at all.

B: As compared with the image formed using the ink before the forced deterioration treatment, with the image formed using the ink after the forced deterioration treatment, the color missing of an image and the distortion of the image on the boundary portion (edge portion) with the non-printing portion were hardly observed.

C: As compared with the image formed using the ink before the forced deterioration treatment, with the image formed using the ink after the forced deterioration treatment, the color missing of an image and the distortion of the image on the boundary portion (edge portion) with the non-printing portion were deteriorated more or less, but the quality is acceptable for practical use.

D: As compared with the image formed using the ink before the forced deterioration treatment, with the image formed using the ink after the forced deterioration treatment, the color missing of an image and the distortion of the image on the boundary portion (edge portion) with the non-printing portion were deteriorated observably, and the quality is not acceptable for practical use.

The results obtained above are shown in Table 1.

of 5.0 ppm to 100 ppm is excellent in ink storability (viscosity stability, curing sensitivity stability, and jetting stability), as compared with that in Comparative Example.

Example 2

Preparation of Inks 2-1 to 2-5

In the same manner as for the preparation of the ink 1-1 described in Example 1, except that the maleimide compound 1 was changed to the maleimide compound 2, the ink 2-1 was prepared.

Then, in the same manner as for the preparation of the ink 2-1, except that the purification conditions of the respective additives such as the pigment, the maleimide compound, and triethylene glycol divinyl ether, used in the preparation, were appropriately adjusted to give the contents of the elemental ions described in Table 2, inks 2-2 to 2-5 were prepared.

The charge of the carbon atoms constituting the unsaturated bond contained in the maleimide compound 2 is −0.27, the charge of the carbon atoms constituting the unsaturated bond contained in the triethylene glycol divinyl ether (purified product) is −0.54, and the difference in the charges is 0.27.

TABLE 1

| Ink No. | Difference in charge *1 | Content (ppm) of elemental ions | | | | | | | | | | Viscosity stability | Curing sensitivity stability | Jetting stability | Note |
|---|---|---|---|---|---|---|---|---|---|---|---|---|---|---|---|
| | | Total content | Fe | Co | Ca | Na | Mg | Al | Ti | Sn | Zn | | | | |
| 1-1 | 0.27 | 1 | 0 | 0 | 1 | 0 | 0 | 0 | 0 | 0 | 0 | C | D | C | Comparative Example |
| 1-2 | 0.27 | 5 | 3 | 0 | 1 | 1 | 0 | 0 | 0 | 0 | 0 | A | A | A | The present invention |
| 1-3 | 0.27 | 53 | 3 | 0 | 7 | 9 | 4 | 0 | 0 | 0 | 30 | A | A | A | The present invention |
| 1-4 | 0.27 | 100 | 5 | 0 | 25 | 10 | 10 | 0 | 0 | 0 | 50 | B | B | B | The present invention |
| 1-5 | 0.27 | 176 | 10 | 2 | 40 | 40 | 30 | 2 | 2 | 0 | 50 | D | D | D | Comparative Example |

*1: Difference in the charges of the carbon atoms constituting unsaturated bonds contained in the two kinds of polymerizable monomers As clear from the results described in Table 1, the difference in the charges of the carbon atoms constituting unsaturated bonds contained in the two kinds of polymerizable monomers (the maleimide compound 1 and triethylene glycol divinyl ether (purified product)) is 0.27, and further, the ink of the present invention in which the total content of elemental ions of Fe, Co, Ca, Na, Mg, Al, Ti, Sn, and Zn is in the range

[Evaluation of Inks]

For the inks 2-1 to 2-5 prepared above, by the same method as described in Example 1, evaluation of storability 1 (evaluation of viscosity stability), evaluation of storability 2 (evaluation of curing sensitivity stability), and evaluation of storability 3 (evaluation of jetting stability) were carried out, and the obtained results are shown in Table 2.

TABLE 2

| Ink No. | Difference in charges *1 | Content (ppm) of elemental ions | | | | | | | | | | Viscosity stability | Curing sensitivity stability | Jetting stability | Note |
|---|---|---|---|---|---|---|---|---|---|---|---|---|---|---|---|
| | | Total content | Fe | Co | Ca | Na | Mg | Al | Ti | Sn | Zn | | | | |
| 2-1 | 0.27 | 1 | 0 | 0 | 1 | 0 | 0 | 0 | 0 | 0 | 0 | C | D | C | Comparative Example |
| 2-2 | 0.27 | 5 | 3 | 0 | 1 | 1 | 0 | 0 | 0 | 0 | 0 | A | A | A | The present invention |
| 2-3 | 0.27 | 48 | 3 | 0 | 7 | 9 | 4 | 0 | 0 | 25 | 0 | A | A | A | The present invention |
| 2-4 | 0.27 | 90 | 5 | 0 | 25 | 10 | 10 | 0 | 0 | 40 | 0 | B | B | B | The present invention |
| 2-5 | 0.27 | 166 | 10 | 2 | 40 | 40 | 30 | 2 | 2 | 40 | 0 | D | D | D | Comparative Example |

*1: Difference in the charges of the carbon atoms constituting unsaturated bonds contained in the two kinds of polymerizable monomers As clear from the results described in Table 2, the difference in the charges of the carbon atoms constituting unsaturated bonds contained in the two kinds of polymerizable monomers (the maleimide compound 2 and triethylene glycol divinyl ether (purified product)) is 0.27, and further, the ink of the present invention in which the total content of elemental ions of Fe, Co, Ca, Na, Mg, Al, Ti, Sn, and Zn is in the range of 5.0 ppm to 100 ppm is excellent in ink storability (viscosity stability, curing sensitivity stability, and jetting stability), as compared with that in Comparative Example.

Example 3

Preparation of Inks 3-1 to 3-5

In the same manner as for the preparation of the ink 1-1 described in Example 1, except that the maleimide compound 1 was changed to the maleimide compound 3, the ink 3-1 was prepared.

Then, in the same manner as for the preparation of the ink 3-1, except that the purification conditions of the respective additives such as the pigment, the maleimide compound, and triethylene glycol divinyl ether, used in the preparation, were appropriately adjusted to give the contents of the elemental ions described in Table 3, inks 3-2 to 3-5 were prepared.

The charge of the carbon atoms constituting the unsaturated bond contained in the maleimide compound 3 is −0.27, the charge of the carbon atoms constituting the unsaturated bond contained in the triethylene glycol divinyl ether (purified product) is −0.54, and the difference in the charges is 0.27.

[Evaluation of Inks]

For the inks 3-1 to 3-5 prepared above, by the same method as described in Example 1, evaluation of storability 1 (evaluation of viscosity stability), evaluation of storability 2 (evaluation of curing sensitivity stability), and evaluation of storability 3 (evaluation of jetting stability) were carried out, and the obtained results are shown in Table 3.

As clear from the results described in Table 3, the difference in the charges of the carbon atoms constituting unsaturated bonds contained in the two kinds of polymerizable monomers (the maleimide compound 3 and triethylene glycol divinyl ether (purified product)) is 0.27, and further, the ink of the present invention in which the total content of elemental ions of Fe, Co, Ca, Na, Mg, Al, Ti, Sn, and Zn is in the range of 5.0 ppm to 100 ppm is excellent in ink storability (viscosity stability, curing sensitivity stability, and jetting stability), as compared with that in Comparative Example.

Example 4

Preparation of Inks 4-1 to 4-5

In the same manner as for the preparation of the ink 1-1 described in Example 1, except that the maleimide compound 1 was changed to the maleic anhydride, the ink 4-1 was prepared.

Then, in the same manner as for the preparation of the ink 4-1, except that the purification conditions of the respective additives such as the pigment, the maleic anhydride, and triethylene glycol divinyl ether, used in the preparation, were appropriately adjusted to give the contents of the elemental ions described in Table 4, inks 4-2 to 4-5 were prepared.

In the inks 4-1 to 4-5, the charge of the carbon atoms constituting the unsaturated bond contained in the maleic anhydride is −0.29, the charge of the carbon atoms constituting the unsaturated bond contained in the triethylene glycol divinyl ether (purified product) is −0.54, and the difference in the charges is 0.25.

[Evaluation of Inks]

For the inks 4-1 to 4-5 prepared above, by the same method as described in Example 1, evaluation of storability 1 (evaluation of viscosity stability), evaluation of storability 2 (evaluation of curing sensitivity stability), and evaluation of storability 3 (evaluation of jetting stability) were carried out, and the obtained results are shown in Table 4.

TABLE 3

| Ink No. | Difference in charges *1 | Content (ppm) of elemental ions | | | | | | | | | | Viscosity stability | Curing sensitivity stability | Jetting stability | Note |
|---|---|---|---|---|---|---|---|---|---|---|---|---|---|---|---|
| | | Total content | Fe | Co | Ca | Na | Mg | Al | Ti | Sn | Zn | | | | |
| 3-1 | 0.27 | 1 | 0 | 0 | 1 | 0 | 0 | 0 | 0 | 0 | 0 | C | D | C | Comparative Example |
| 3-2 | 0.27 | 5 | 3 | 0 | 1 | 1 | 0 | 0 | 0 | 0 | 0 | A | A | A | The present invention |
| 3-3 | 0.27 | 53 | 3 | 0 | 7 | 9 | 4 | 0 | 30 | 0 | 0 | A | A | A | The present invention |
| 3-4 | 0.27 | 95 | 5 | 0 | 25 | 10 | 10 | 0 | 45 | 0 | 0 | B | B | B | The present invention |
| 3-5 | 0.27 | 174 | 10 | 2 | 40 | 40 | 30 | 2 | 50 | 0 | 0 | D | D | D | Comparative Example |

*1: Difference in the charges of the carbon atoms constituting unsaturated bonds contained in the two kinds of polymerizable monomers

TABLE 4

| Ink No. | Difference in charges *1 | Content (ppm) of elemental ions | | | | | | | | | | Curing | | | Note |
|---|---|---|---|---|---|---|---|---|---|---|---|---|---|---|---|
| | | Total content | Fe | Co | Ca | Na | Mg | Al | Ti | Sn | Zn | Viscosity stability | sensitivity stability | Jetting stability | |
| 4-1 | 0.25 | 1 | 0 | 0 | 1 | 0 | 0 | 0 | 0 | 0 | 0 | C | D | C | Comparative Example |
| 4-2 | 0.25 | 5 | 3 | 0 | 1 | 1 | 0 | 0 | 0 | 0 | 0 | B | A | B | The present invention |
| 4-3 | 0.25 | 40 | 20 | 0 | 7 | 9 | 4 | 0 | 0 | 0 | 0 | B | A | B | The present invention |
| 4-4 | 0.25 | 85 | 40 | 0 | 25 | 10 | 10 | 0 | 0 | 0 | 0 | C | B | C | The present invention |
| 4-5 | 0.25 | 174 | 60 | 2 | 40 | 40 | 30 | 2 | 0 | 0 | 0 | D | D | D | Comparative Example |

*1: Difference in the charges of the carbon atoms constituting unsaturated bonds contained in the two kinds of polymerizable monomers As clear from the results described in Table 4, the difference in the charges of the carbon atoms constituting unsaturated bonds contained in the two kinds of polymerizable monomers (the maleic anhydride and triethylene glycol divinyl ether (purified product)) is 0.25, and further, the ink of the present invention in which the total content of elemental ions of Fe, Co, Ca, Na, Mg, Al, Ti, Sn and Zn is in the range of 5.0 ppm to 100 ppm is excellent in ink storability (viscosity stability, curing sensitivity stability, and jetting stability), as compared with that in Comparative Example.

Example 5

Preparation of Inks 5-1 to 5-5

In the same manner as for the preparation of the ink 1-1 described in Example 1, except that the maleimide compound 1 was changed to diethyl maleate, and further, the molar ratio of functional groups in diethyl maleate to triethylene glycol divinyl ether was 5:5, the ink 5-1 was prepared.

Then, in the same manner as for the preparation of Ink 5-1, except for appropriately adjusting the purification conditions for each additive pigment used in the preparation, diethyl maleate, and triethylene glycol divinyl ether, and using the contents of the elemental ions listed in Table 5, ink 5-2 to 5-5 were prepared.

In the inks 5-1 to 5-5, the charge of the carbon atoms constituting the unsaturated bond contained in diethyl maleate is −0.27, the charge of the carbon atoms constituting the unsaturated bond contained in the triethylene glycol divinyl ether (purified product) is −0.54, and the difference in the charges is 0.27.

[Evaluation of Inks]

For the inks 5-1 to 5-5 prepared above, by the same method as described in Example 1, evaluation of storability 1 (evaluation of viscosity stability), evaluation of storability 2 (evaluation of curing sensitivity stability), and evaluation of storability 3 (evaluation of jetting stability) were carried out, and the obtained results are shown in Table 5. Further, in the evaluation of storability 2 (evaluation of curing sensitivity stability) and the evaluation of storability 3 (evaluation of jetting stability), as a light source used for curing an ink provided on the polyethylene terephthalate film, a 200-W high-pressure mercury lamp was used instead of an LED at 385 nm with an output of 2 W/cm².

TABLE 5

| Ink No. | Difference in charges *1 | Content (ppm) of elemental ions | | | | | | | | | | Curing | | | Note |
|---|---|---|---|---|---|---|---|---|---|---|---|---|---|---|---|
| | | Total content | Fe | Co | Ca | Na | Mg | Al | Ti | Sn | Zn | Viscosity stability | sensitivity stability | Jetting stability | |
| 5-1 | 0.27 | 1 | 0 | 0 | 1 | 0 | 0 | 0 | 0 | 0 | 0 | C | D | C | Comparative Example |
| 5-2 | 0.27 | 5 | 3 | 0 | 1 | 1 | 0 | 0 | 0 | 0 | 0 | B | B | B | The present invention |
| 5-3 | 0.27 | 40 | 20 | 0 | 7 | 9 | 4 | 0 | 0 | 0 | 0 | B | B | B | The present invention |
| 5-4 | 0.27 | 85 | 40 | 0 | 25 | 10 | 10 | 0 | 0 | 0 | 0 | C | C | C | The present invention |
| 5-5 | 0.27 | 174 | 60 | 2 | 40 | 40 | 30 | 2 | 0 | 0 | 0 | D | D | D | Comparative Example |

*1: Difference in the charges of the carbon atoms constituting unsaturated bonds contained in the two kinds of polymerizable monomers As clear from the results described in Table 5, the difference in the charges of the carbon atoms constituting unsaturated bonds contained in the two kinds of polymerizable monomers (diethyl maleate and triethylene glycol divinyl ether (purified product)) is 0.27, and further, the ink of the present invention in which the total content of elemental ions of Fe, Co, Ca, Na, Mg, Al, Ti, Sn, and Zn is in the range of 5.0 ppm to 100 ppm is excellent in ink storability (viscosity stability, curing sensitivity stability, and jetting stability), as compared with that in Comparative Example.

Example 6

Preparation of Inks 6-1 to 6-5

In the same manner as for the preparation of the ink 1-1 described in Example 1, except that the maleimide compound 1 was changed to diisopropyl fumarate and the molar ratio of the functional groups of diisopropyl fumarate to triethylene glycol divinyl ether was 5:5, ink 6-1 was prepared.

Then, in the same manner as for the preparation of the ink 6-1, except that the purification conditions of the respective additives such as the pigment, diisopropyl fumarate, and triethylene glycol divinyl ether, used in the preparation, were appropriately adjusted to give the contents of the elemental ions described in Table 6, inks 6-2 to 6-5 were prepared.

Further, in the inks 6-1 to 6-5, the charge of the carbon atoms constituting the unsaturated bond contained in diisopropyl fumarate is −0.30, the charge of the carbon atoms constituting the unsaturated bond contained in the triethylene glycol divinyl ether (purified product) is −0.54, and the difference in the charges is 0.24.

[Evaluation of Inks]

For the inks 6-1 to 6-5 prepared above, by the same method as described in Example 1, evaluation of storability 1 (evaluation of viscosity stability), evaluation of storability 2 (evaluation of curing sensitivity stability), and evaluation of storability 3 (evaluation of jetting stability) were carried out, and the obtained results are shown in Table 6. Further, in the evaluation of storability 2 (evaluation of curing sensitivity stability) and the evaluation of storability 3 (evaluation of jetting stability), as a light source used for curing an ink provided on the polyethylene terephthalate film, a 200-W high-pressure mercury lamp was used instead of an LED at 385 nm with an output of 2 W/cm².

As clear from the results described in Table 6, the difference in the charges of the carbon atoms constituting unsaturated bonds contained in the two kinds of polymerizable monomers (diisopropyl fumarate and triethylene glycol divinyl ether (purified product)) is 0.24, and further, the ink of the present invention in which the total content of elemental ions of Fe, Co, Ca, Na, Mg, Al, Ti, Sn, and Zn is in the range of 5.0 ppm to 100 ppm is excellent in ink storability (viscosity stability, curing sensitivity stability, and jetting stability), as compared with that in Comparative Example.

Example 7

Preparation of Inks 7-1 to 7-5

In the same manner as for the preparation of the ink 1-1 described in Example 1, except that triethylene glycol divinyl ether was changed to N-vinylformamide, ink 7-1 was prepared.

Then, in the same manner as for the preparation of the ink 7-1, except that the purification conditions of the respective additives such as the pigment, the maleimide compound 1, and N-vinylformamide, used in the preparation, were appropriately adjusted to give the contents of the elemental ions described in Table 7, inks 7-2 to 7-5 were prepared.

Further, in the inks 7-1 to 7-5, the charge of the carbon atoms constituting the unsaturated bond contained in the maleimide compound 1 is −0.27, the charge of the carbon atoms constituting the unsaturated bond contained in the N-vinylformamide (purified product) is −0.53, and the difference in the charges is 0.26.

[Evaluation of Inks]

For the inks 7-1 to 7-5 prepared above, by the same method as described in Example 1, evaluation of storability 1 (evaluation of viscosity stability), evaluation of storability 2 (evaluation of curing sensitivity stability), and evaluation of storability 3 (evaluation of jetting stability) were carried out, and the obtained results are shown in Table 7.

TABLE 6

| Ink No. | Difference in charges *1 | Content (ppm) of elemental ions | | | | | | | | | | Curing | | | Note |
|---|---|---|---|---|---|---|---|---|---|---|---|---|---|---|---|
| | | Total content | Fe | Co | Ca | Na | Mg | Al | Ti | Sn | Zn | Viscosity stability | sensitivity stability | Jetting stability | |
| 6-1 | 0.24 | 1 | 0 | 0 | 1 | 0 | 0 | 0 | 0 | 0 | 0 | C | D | C | Comparative Example |
| 6-2 | 0.24 | 5 | 3 | 0 | 1 | 1 | 0 | 0 | 0 | 0 | 0 | B | B | B | The present invention |
| 6-3 | 0.24 | 40 | 20 | 0 | 7 | 9 | 4 | 0 | 0 | 0 | 0 | B | B | B | The present invention |
| 6-4 | 0.24 | 85 | 40 | 0 | 25 | 10 | 10 | 0 | 0 | 0 | 0 | C | C | C | The present invention |
| 6-5 | 0.24 | 174 | 60 | 2 | 40 | 40 | 30 | 2 | 0 | 0 | 0 | D | D | D | Comparative Example |

*1: Difference in the charges of the carbon atoms constituting unsaturated bonds contained in the two kinds of polymerizable monomers

TABLE 7

| Ink No. | Difference in charges *1 | Content (ppm) of elemental ions | | | | | | | | | Curing | | | Note |
|---|---|---|---|---|---|---|---|---|---|---|---|---|---|---|
| | | Total content | Fe | Co | Ca | Na | Mg | Al | Ti | Sn | Zn | Viscosity stability | sensitivity stability | Jetting stability | |
| 7-1 | 0.26 | 1 | 0 | 0 | 1 | 0 | 0 | 0 | 0 | 0 | 0 | C | D | C | Comparative Example |
| 7-2 | 0.26 | 5 | 3 | 0 | 1 | 1 | 0 | 0 | 0 | 0 | 0 | B | A | B | The present invention |
| 7-3 | 0.26 | 53 | 3 | 0 | 7 | 9 | 4 | 0 | 0 | 0 | 30 | B | A | B | The present invention |
| 7-4 | 0.26 | 100 | 5 | 0 | 25 | 10 | 10 | 0 | 0 | 0 | 50 | C | B | C | The present invention |
| 7-5 | 0.26 | 176 | 10 | 2 | 40 | 40 | 30 | 2 | 2 | 0 | 50 | D | D | D | Comparative Example |

*1: Difference in the charges of the carbon atoms constituting unsaturated bonds contained in the two kinds of polymerizable monomers As clear from the results described in Table 7, the difference in the charges of the carbon atoms constituting unsaturated bonds contained in the two kinds of polymerizable monomers (the maleimide compound 1 and N-vinylformamide) is 0.26, and further, the ink of the present invention in which the total content of elemental ions of Fe, Co, Ca, Na, Mg, Al, Ti, Sn, and Zn is in the range of 5.0 ppm to 100 ppm is excellent in ink storability (viscosity stability, curing sensitivity stability, and jetting stability), as compared with that in Comparative Example.

Example 8

Preparation of Inks 8-1 to 8-5

In the same manner as for the preparation of the ink 1-1 described in Example 1, except that the maleimide compound 1 was changed to the maleimide compound 4, ink 8-1 was prepared.

Then, in the same manner as for the preparation of the ink 8-1, except that the purification conditions of the respective additives such as the pigment, the maleimide compound 4, and triethylene glycol divinyl ether, used in the preparation, were appropriately adjusted to give the contents of the elemental ions described in Table 8, inks 8-2 to 8-5 were prepared.

Further, in the inks 8-1 to 8-5, the charge of the carbon atoms constituting the unsaturated bond contained in the maleimide compound 4 is −0.27, the charge of the carbon atoms constituting the unsaturated bond contained in the triethylene glycol divinyl ether (purified product) is −0.54, and the difference in the charges is 0.27.

[Evaluation of Inks]

For the inks 8-1 to 8-5 prepared above, by the same method as described in Example 1, evaluation of storability 1 (evaluation of viscosity stability), evaluation of storability 2 (evaluation of curing sensitivity stability), and evaluation of storability 3 (evaluation of jetting stability) were carried out, and the obtained results are shown in Table 8.

TABLE 8

| Ink No. | Difference in charges *1 | Content (ppm) of elemental ions | | | | | | | | | | Curing | | | Note |
|---|---|---|---|---|---|---|---|---|---|---|---|---|---|---|---|
| | | Total content | Fe | Co | Ca | Na | Mg | Al | Ti | Sn | Zn | Viscosity stability | sensitivity stability | Jetting stability | |
| 8-1 | 0.27 | 1 | 0 | 0 | 1 | 0 | 0 | 0 | 0 | 0 | 0 | C | D | C | Comparative Example |
| 8-2 | 0.27 | 5 | 3 | 0 | 1 | 1 | 0 | 0 | 0 | 0 | 0 | B | B | B | The present invention |
| 8-3 | 0.27 | 53 | 3 | 0 | 7 | 9 | 4 | 0 | 0 | 0 | 30 | B | A | B | The present invention |
| 8-4 | 0.27 | 100 | 5 | 0 | 25 | 10 | 10 | 0 | 0 | 0 | 50 | C | C | C | The present invention |
| 8-5 | 0.27 | 176 | 10 | 2 | 40 | 40 | 30 | 2 | 2 | 0 | 50 | D | D | D | Comparative Example |

*1: Difference in the charges of the carbon atoms constituting unsaturated bonds contained in the two kinds of polymerizable monomers As clear from the results described in Table 8, the difference in the charges of the carbon atoms constituting unsaturated bonds contained in the two kinds of polymerizable monomers (the maleimide compound 4 and triethylene glycol divinyl ether (purified product)) is 0.27, and further, the ink of the present invention in which the total content of elemental ions of Fe, Co, Ca, Na, Mg, Al, Ti, Sn, and Zn is in the range of 5.0 ppm to 100 ppm is excellent in ink storability (viscosity stability, curing sensitivity stability, and jetting stability), as compared with that in Comparative Example.

Example 9

Preparation of Inks 9-1 to 9-5

In the same manner as for the preparation of the ink 1-1 described in Example 1, except that the maleimide compound 1 was changed to the maleimide compound 5, the ink 9-1 was prepared.

Then, in the same manner as for the preparation of the ink 9-1, except that the purification conditions of the respective additives such as the pigment, the maleimide compound 5, and triethylene glycol divinyl ether, used in the preparation, were appropriately adjusted to give the contents of the elemental ions described in Table 9, inks 9-2 to 9-5 were prepared.

Further, in the inks 9-1 to 9-5, the charge of the carbon atoms constituting the unsaturated bond contained in the maleimide compound 5 is −0.09, the charge of the carbon atoms constituting the unsaturated bond contained in the triethylene glycol divinyl ether (purified product) is −0.54, and the difference in the charges is 0.45.

[Evaluation of Inks]

For the inks 9-1 to 9-5 prepared above, by the same method as described in Example 1, evaluation of storability 1 (evaluation of viscosity stability), evaluation of storability 2 (evaluation of curing sensitivity stability), and evaluation of storability 3 (evaluation of jetting stability) were carried out, and the obtained results are shown in Table 9.

TABLE 9

| Ink No. | Difference in charges *1 | Content (ppm) of elemental ions | | | | | | | | | | Curing | | | Note |
|---|---|---|---|---|---|---|---|---|---|---|---|---|---|---|---|
| | | Total content | Fe | Co | Ca | Na | Mg | Al | Ti | Sn | Zn | Viscosity stability | sensitivity stability | Jetting stability | |
| 9-1 | 0.45 | 1 | 0 | 0 | 1 | 0 | 0 | 0 | 0 | 0 | 0 | C | D | C | Comparative Example |
| 9-2 | 0.45 | 5 | 3 | 0 | 1 | 1 | 0 | 0 | 0 | 0 | 0 | B | B | B | The present invention |
| 9-3 | 0.45 | 53 | 3 | 0 | 7 | 9 | 4 | 0 | 0 | 0 | 30 | B | A | B | The present invention |
| 9-4 | 0.45 | 100 | 5 | 0 | 25 | 10 | 10 | 0 | 0 | 0 | 50 | C | C | C | The present invention |
| 9-5 | 0.45 | 176 | 10 | 2 | 40 | 40 | 30 | 2 | 2 | 0 | 50 | D | D | D | Comparative Example |

*1: Difference in the charges of the carbon atoms constituting unsaturated bonds contained in the two kinds of polymerizable monomers As clear from the results described in Table 9, the difference in the charges of the carbon atoms constituting unsaturated bonds contained in the two kinds of polymerizable monomers (the maleimide compound 4 and triethylene glycol divinyl ether (purified product)) is 0.45, and further, the ink of the present invention in which the total content of elemental ions of Fe, Co, Ca, Na, Mg, Al, Ti, Sn, and Zn is in the range of 5.0 ppm to 100 ppm is excellent in ink storability (viscosity stability, curing sensitivity stability, and jetting stability), as compared with that in Comparative Example.

Example 10

Preparation of Inks 10-1 to 10-5

In the same manner as for the preparation of the ink 1-1 described in Example 1, except that the maleimide compound 1 was changed to the maleimide compound 6, and further, the molar ratio of functional groups in the maleimide compound 6 and triethylene glycol divinyl ether was 5:5, ink 10-1 was prepared.

Then, in the same manner as for the preparation of the ink 10-1, except that the purification conditions of the respective additives such as the pigment, the maleimide compound 6, and triethylene glycol divinyl ether, used in the preparation, were appropriately adjusted to give the contents of the elemental ions described in Table 10, inks 10-2 to 10-5 were prepared.

Further, in the inks 10-1 to 10-5, the charge of the carbon atoms constituting the unsaturated bond contained in the maleimide compound 6 is −0.27, the charge of the carbon atoms constituting the unsaturated bond contained in the triethylene glycol divinyl ether (purified product) is −0.54, and the difference in the charges is 0.27.

[Evaluation of Inks]

For the inks 10-1 to 10-5 prepared above, by the same method as described in Example 1, evaluation of storability 1 (evaluation of viscosity stability), evaluation of storability 2 (evaluation of curing sensitivity stability), and evaluation of storability 3 (evaluation of jetting stability) were carried out, and the obtained results are shown in Table 6. Further, in the evaluation of storability 2 (evaluation of curing sensitivity stability) and the evaluation of storability 3 (evaluation of jetting stability), as a light source used for curing an ink provided on the polyethylene terephthalate film, a 200-W high-pressure mercury lamp was used instead of an LED at 385 nm with an output of 2 W/cm².

TABLE 10

| Ink No. | Difference in charges *1 | Content (ppm) of elemental ions | | | | | | | | | | Curing | | | Note |
|---|---|---|---|---|---|---|---|---|---|---|---|---|---|---|---|
| | | Total content | Fe | Co | Ca | Na | Mg | Al | Ti | Sn | Zn | Viscosity stability | sensitivity stability | Jetting stability | |
| 10-1 | 0.27 | 1 | 0 | 0 | 1 | 0 | 0 | 0 | 0 | 0 | 0 | C | D | C | Comparative Example |
| 10-2 | 0.27 | 5 | 3 | 0 | 1 | 1 | 0 | 0 | 0 | 0 | 0 | B | B | B | The present invention |
| 10-3 | 0.27 | 53 | 3 | 0 | 7 | 9 | 4 | 0 | 0 | 0 | 30 | B | A | B | The present invention |

TABLE 10-continued

| Ink No. | Difference in charges *1 | Content (ppm) of elemental ions | | | | | | | | | Curing | | | Note |
| | | Total content | Fe | Co | Ca | Na | Mg | Al | Ti | Sn | Zn | Viscosity stability | sensitivity stability | Jetting stability | |
| --- | --- | --- | --- | --- | --- | --- | --- | --- | --- | --- | --- | --- | --- | --- | --- |
| 10-4 | 0.27 | 100 | 5 | 0 | 25 | 10 | 10 | 0 | 0 | 0 | 50 | C | C | C | The present invention |
| 10-5 | 0.27 | 176 | 10 | 2 | 40 | 40 | 30 | 2 | 2 | 0 | 50 | D | D | D | Comparative Example |

*1: Difference in the charges of the carbon atoms constituting unsaturated bonds contained in the two kinds of polymerizable monomers As clear from the results described in Table 10, the difference in the charges of the carbon atoms constituting unsaturated bonds contained in the two kinds of polymerizable monomers (the maleimide compound 6 and triethylene glycol divinyl ether (purified product)) is 0.27, and further, the ink of the present invention in which the total content of elemental ions of Fe, Co, Ca, Na, Mg, Al, Ti, Sn, and Zn is in the range of 5.0 ppm to 100 ppm is excellent in ink storability (viscosity stability, curing sensitivity stability, and jetting stability), as compared with that in Comparative Example.

Example 11

Preparation of Inks 11-1 to 11-5

In the same manner as for the preparation of the ink 1-1 described in Example 1, except that as the pigment types, C. I. Pigment Red 122 was changed to C. I. Pigment Yellow 180, and further, the content of the pigment was changed to 3.5% by mass, an ink 11-1 was prepared.

Then, in the same manner as for the preparation of the ink 11-1, except that the purification conditions of the respective additives such as the pigment, the maleimide compound 1, and triethylene glycol divinyl ether, used in the preparation, were appropriately adjusted to give the contents of the elemental ions described in Table 11, inks 11-2 to 11-5 were prepared.

Further, in the inks 11-1 to 11-5, the charge of the carbon atoms constituting the unsaturated bond contained in the maleimide compound 1 is −0.27, the charge of the carbon atoms constituting the unsaturated bond contained in the triethylene glycol divinyl ether (purified product) is −0.54, and the difference in the charges is 0.27.

[Evaluation of Inks]

For the inks 11-1 to 11-5 prepared above, by the same method as described in Example 1, evaluation of storability 1 (evaluation of viscosity stability), evaluation of storability 2 (evaluation of curing sensitivity stability), and evaluation of storability 3 (evaluation of jetting stability) were carried out, and the obtained results are shown in Table 11.

TABLE 11

| Ink No. | Difference in charges *1 | Content (ppm) of elemental ions | | | | | | | | | Curing | | | Note |
| | | Total content | Fe | Co | Ca | Na | Mg | Al | Ti | Sn | Zn | Viscosity stability | sensitivity stability | Jetting stability | |
| --- | --- | --- | --- | --- | --- | --- | --- | --- | --- | --- | --- | --- | --- | --- | --- |
| 11-1 | 0.27 | 1 | 0 | 0 | 1 | 0 | 0 | 0 | 0 | 0 | 0 | C | D | C | Comparative Example |
| 11-2 | 0.27 | 7 | 5 | 0 | 1 | 1 | 0 | 0 | 0 | 0 | 0 | A | A | A | The present invention |
| 11-3 | 0.27 | 55 | 8 | 0 | 10 | 4 | 3 | 0 | 0 | 0 | 30 | A | A | A | The present invention |
| 11-4 | 0.27 | 92 | 10 | 0 | 25 | 4 | 3 | 0 | 0 | 0 | 50 | B | B | B | The present invention |
| 11-5 | 0.27 | 135 | 20 | 0 | 50 | 8 | 7 | 0 | 0 | 0 | 50 | D | D | D | Comparative Example |

*1: Difference in the charges of the carbon atoms constituting unsaturated bonds contained in the two kinds of polymerizable monomers As clear from the results described in Table 11, the difference in the charges of the carbon atoms constituting unsaturated bonds contained in the two kinds of polymerizable monomers (the maleimide compound 1 and triethylene glycol divinyl ether) is 0.27, and further, the ink of the present invention in which the total content of elemental ions of Fe, Co, Ca, Na, Mg, Al, Ti, Sn, and Zn is in the range of 5.0 ppm to 100 ppm is excellent in ink storability (viscosity stability, curing sensitivity stability, and jetting stability), as compared with that in Comparative Example.

Example 12

Preparation of Inks 12-1 to 12-5

In the same manner as for the preparation of the ink 1-1 described in Example 1, except that as the pigment types, C. I. Pigment Red 122 was changed to C. I. Pigment Blue 15:4, and further, the content of the pigment was changed to 2.5% by mass, an ink 12-1 was prepared.

Then, in the same manner as for the preparation of the ink 12-1, except that the purification conditions of the respective additives such as the pigment, the maleimide compound 1, and triethylene glycol divinyl ether, used in the preparation, were appropriately adjusted to give the contents of the elemental ions described in Table 12, inks 12-2 to 12-5 were prepared.

Further, in the inks 12-1 to 12-5, the charge of the carbon atoms constituting the unsaturated bond contained in the maleimide compound 1 is −0.27, the charge of the carbon atoms constituting the unsaturated bond contained in the triethylene glycol divinyl ether (purified product) is −0.54, and the difference in the charges is 0.27.

[Evaluation of Inks]

For the inks 12-1 to 12-5 prepared above, by the same method as described in Example 1, evaluation of storability 1 (evaluation of viscosity stability), evaluation of storability 2 (evaluation of curing sensitivity stability), and evaluation of storability 3 (evaluation of jetting stability) were carried out, and the obtained results are shown in Table 12.

TABLE 12

| Ink No. | Difference in charges *1 | Total content | Content (ppm) of elemental ions | | | | | | | | | Viscosity stability | Curing sensitivity stability | Jetting stability | Note |
|---|---|---|---|---|---|---|---|---|---|---|---|---|---|---|---|
| | | | Fe | Co | Ca | Na | Mg | Al | Ti | Sn | Zn | | | | |
| 12-1 | 0.27 | 1 | 0 | 0 | 1 | 0 | 0 | 0 | 0 | 0 | 0 | C | D | C | Comparative Example |
| 12-2 | 0.27 | 7 | 5 | 0 | 1 | 1 | 0 | 0 | 0 | 0 | 0 | A | A | A | The present invention |
| 12-3 | 0.27 | 55 | 7 | 0 | 8 | 5 | 5 | 0 | 0 | 0 | 30 | A | A | A | The present invention |
| 12-4 | 0.27 | 92 | 7 | 0 | 15 | 10 | 5 | 5 | 0 | 0 | 50 | B | B | B | The present invention |
| 12-5 | 0.27 | 159 | 7 | 2 | 30 | 50 | 10 | 10 | 0 | 0 | 50 | D | D | D | Comparative Example |

*1: Difference in the charges of the carbon atoms constituting unsaturated bonds contained in the two kinds of polymerizable monomers As clear from the results described in Table 12, the difference in the charges of the carbon atoms constituting unsaturated bonds contained in the two kinds of polymerizable monomers (the maleimide compound 1 and triethylene glycol divinyl ether) is 0.27, and further, the ink of the present invention in which the total content of elemental ions of Fe, Co, Ca, Na, Mg, Al, Ti, Sn, and Zn is in the range of 5.0 ppm to 100 ppm is excellent in ink storability (viscosity stability, curing sensitivity stability, and jetting stability), as compared with that in Comparative Example.

Example 13

Preparation of Inks 13-1 and 13-2

In the same manner as for the preparation of the ink 1-1 described in Example 1, except that as the pigment types, C. I. Pigment Red 122 was changed to Carbon Black MA-7, and further, the content of the pigment was changed to 2.0% by mass, an ink 13-1 having a total content of elemental ions of 2 ppm was prepared.

Then, in the same manner as for the preparation of the ink 13-1, except that the purification conditions of the respective additives such as the pigment, the maleimide compound 1, and triethylene glycol divinyl ether, used in the preparation, were appropriately adjusted to give a total content of the elemental ions of 32 ppm, an ink 13-2 was prepared.

Further, in the inks 13-1 and 13-2, the charge of the carbon atoms constituting the unsaturated bond contained in the maleimide compound 1 is −0.27, the charge of the carbon atoms constituting the unsaturated bond contained in the triethylene glycol divinyl ether (purified product) is −0.54, and the difference in the charges is 0.27.

[Evaluation of Inks]

For the inks 13-1 and 13-2 prepared above, by the same method as described in Example 1, evaluation of storability 1 (evaluation of viscosity stability), evaluation of storability 2 (evaluation of curing sensitivity stability), and evaluation of storability 3 (evaluation of jetting stability) were carried out, and the obtained results are shown in Table 13.

TABLE 13

| Ink No. | Difference in charges *1 | Total content | Content (ppm) of elemental ions | | | | | | | | | Viscosity stability | Curing sensitivity stability | Jetting stability | Note |
|---|---|---|---|---|---|---|---|---|---|---|---|---|---|---|---|
| | | | Fe | Co | Ca | Na | Mg | Al | Ti | Sn | Zn | | | | |
| 13-1 | 0.27 | 2 | 0 | 0 | 0 | 0 | 2 | 0 | 0 | 0 | 0 | C | D | C | Comparative Example |
| 13-2 | 0.27 | 32 | 0 | 0 | 0 | 0 | 2 | 0 | 0 | 0 | 30 | A | A | A | The present invention |

*1: Difference in the charges of the carbon atoms constituting unsaturated bonds contained in the two kinds of polymerizable monomers As clear from the results described in Table 13, the difference in the charges of the carbon atoms constituting unsaturated bonds contained in the two kinds of polymerizable monomers (the maleimide compound 1 and triethylene glycol divinyl ether) is 0.27, and further, the ink of the present invention in which the total content of elemental ions of Fe, Co, Ca, Na, Mg, Al, Ti, Sn, and Zn is in the range of 5.0 ppm to 100 ppm is excellent in ink storability (viscosity stability, curing sensitivity stability, and jetting stability), as compared with that in Comparative Example.

Example 14

Preparation of Inks 14-1 and 14-2

In the same manner as for the preparation of the ink 1-1 described in Example 1, except that as the pigment types, C. I. Pigment Red 122 was changed to C. I. Pigment Yellow 150, and further, the content of the pigment was changed to 3.5% by mass, an ink 14-1 having a total content of the elemental ions of 2 ppm was prepared.

Then, in the same manner as for the preparation of the ink 14-1, except that the purification conditions of the respective additives such as the pigment, the maleimide compound 1, and triethylene glycol divinyl ether, used in the preparation, were appropriately adjusted to give a total content of the elemental ions of 32 ppm, an ink 14-2 was prepared.

Further, in the inks 14-1 and 14-2, the charge of the carbon atoms constituting the unsaturated bond contained in the maleimide compound 1 is −0.27, the charge of the carbon atoms constituting the unsaturated bond contained in the triethylene glycol divinyl ether (purified product) is −0.54, and the difference in the charges is 0.27.

[Evaluation of Inks]

For the inks 14-1 and 14-2 prepared above, by the same method as described in Example 1, evaluation of storability 1 (evaluation of viscosity stability), evaluation of storability 2 (evaluation of curing sensitivity stability), and evaluation of storability 3 (evaluation of jetting stability) were carried out, and the obtained results are shown in Table 14.

pound 1 was changed to methyl acrylate, an ink 16-1 was prepared.

Further, in the ink 16-1, the charge of the carbon atoms constituting the unsaturated bond contained in methyl acrylate is −0.35, the charge of the carbon atoms constituting the unsaturated bond contained in the triethylene glycol divinyl ether (purified product) is −0.54, and the difference in the charges is 0.19.

[Evaluation of Inks]

For the ink 16-1 prepared above, a curing test was carried out under the conditions described in evaluation of Storability 2 of Example 1, and as a result, the polymerization did not proceed sufficiently, and thus, a cured film could not be obtained. As clear from these results, it was confirmed that the difference in the charges of the carbon atoms constituting unsaturated bonds contained in the two kinds of polymerizable monomers (methyl acrylate and triethylene glycol divinyl ether) is 0.19, and further, the ink 16-1 of Comparative Example not having the conditions specified in the present invention had insufficient curing characteristics in practical use.

TABLE 14

| Ink No. | Difference in charges *1 | Content (ppm) of elemental ions | | | | | | | | | Curing | | | Note |
| | | Total content | Fe | Co | Ca | Na | Mg | Al | Ti | Sn | Zn | Viscosity stability | sensitivity stability | Jetting stability | |
|---|---|---|---|---|---|---|---|---|---|---|---|---|---|---|---|
| 14-1 | 0.27 | 2 | 0 | 0 | 0 | 2 | 0 | 0 | 0 | 0 | 0 | C | D | C | Comparative Example |
| 14-2 | 0.27 | 32 | 0 | 0 | 0 | 2 | 0 | 0 | 0 | 0 | 30 | A | A | A | The present invention |

*1: Difference in the charges of the carbon atoms constituting unsaturated bonds contained in the two kinds of polymerizable monomers As clear from the results described in Table 14, the difference in the charges of the carbon atoms constituting unsaturated bonds contained in the two kinds of polymerizable monomers (the maleimide compound 1 and triethylene glycol divinyl ether) is 0.27, and further, the ink of the present invention in which the total content of elemental ions of Fe, Co, Ca, Na, Mg, Al, Ti, Sn, and Zn is in the range of 5.0 ppm to 100 ppm is excellent in ink storability (viscosity stability, curing sensitivity stability, and jetting stability), as compared with that in Comparative Example.

Example 15

To the inks 1-5, 2-5, and 3-5 prepared in Examples 1, 2, and 3 was added MS-8 (aminopolycarboxylic acid-based chelating agent) manufactured by Chelest Corporation to adjust free metal ions not masked by a chelating agent to a range of from 5 ppm to 50 ppm, and then by the same method as described in Example 1, evaluation of storability 1 (evaluation of viscosity stability), evaluation of storability 2 (evaluation of curing sensitivity stability), and evaluation of storability 3 (evaluation of jetting stability) were carried out, and as a result, any ink was evaluated as a rank "A".

Example 16

Preparation of Ink 16-1

In the same manner as for the preparation of the ink 1-1 described in Example 1, except that as the maleimide com- Example 17

Preparation of Ink 17-1

In the same manner as for the preparation of the ink 1-1 as described in Example 1, except that the maleimide compound 1 was changed to 7,7,8,8-tetracyanoquinodimethane, an ink 17-1 was prepared.

The charge of the carbon atoms constituting the unsaturated bond contained in 7,7,8,8-tetracyanoquinodimethane is 0.05, the charge of the carbon atoms constituting the unsaturated bond contained in the triethylene glycol divinyl ether is −0.54, and the difference in the charges is 0.49.

[Evaluation of Inks]

For the ink 17-1 prepared above, a curing test was carried out under the conditions described in evaluation of Storability 2 of Example 1, and as a result, the polymerization did not proceed sufficiently and thus, a cured film could not be obtained. As clear from these results, it was confirmed that the difference in the charges of the carbon atoms constituting unsaturated bonds contained in the two kinds of polymerizable monomers (7,7,8,8-tetracyano quino dimethane and triethylene glycol divinyl ether) is 0.49, and further, the ink 17-1 of Comparative Example not having the conditions specified in the present invention had insufficient curing characteristics in practical use.

Example 18

Preparation of Ink (Preparation of Ink 18-1)

Into a mixed liquid formed by mixing the maleimide compound 1 and triethylene glycol divinyl ether (manufactured by Nippon Carbide Industries Co., Inc.) under the condition such that the molar ratio of the functional groups thereof is 35:65, the pigment dispersion product 1 prepared above was mixed at a pigment concentration of 4.5% by mass. Further, 3.0% by mass of an acylphosphine oxide-based photopolymerization initiator Lucirin TPO (manufactured by BASF), 2.0% by mass of isopropylthioxanthone as a sensitizer, and 0.15% by mass of IRGASTAB UV-10 as a polymerization inhibitor (manufactured by BASF) were mixed therewith. Finally, finishing was carried out to 100% by mass using a mixed liquid formed by mixing the maleimide compound 1 and triethylene glycol divinyl ether (manufactured by Nippon Carbide Industries Co., Inc.) under the condition such that the molar ratio of the functional groups thereof is 35:65 to prepare an ink 18-1.

(Preparation of Inks 18-2 to 18-30)

In the same manner as for the preparation of the ink 18-1 above, except that the maleimide compound, triethylene glycol divinyl ether, the compound having a substituent capable of reacting with a nucleophilic agent, the initiator, and the sensitizer were changed as described in Table 15, inks 18-2 to 18-30 were prepared.

TABLE 15

| Ink No. | Monomer having a high e value (A) | e Value | Monomer having a low e value (B) | e Value | Δ (difference in e values) | A:B (ratio of functional groups) | Initiator (% by mass) | Sensitizer (% by mass) | *1 | Note |
|---|---|---|---|---|---|---|---|---|---|---|
| 18-1 | M-5 | 3.70 | TEGDVE | −1.80 | 5.50 | 35:65 | 3.0 | 2.0 | — | Comparative Example |
| 18-2 | M-5 | 3.70 | TEGDVE | −1.80 | 5.50 | 35:65 | 3.0 | 2.0 | IB-600 | The present invention |
| 18-3 | M-5 | 3.70 | TEGDVE | −1.80 | 5.50 | 15:85 | 3.0 | 2.0 | IB-600 | The present invention |
| 18-4 | M-5 | 3.70 | TEGDVE | −1.80 | 5.50 | 23:77 | 3.0 | 2.0 | IB-600 | The present invention |
| 18-5 | M-5 | 3.70 | TEGDVE | −1.80 | 5.50 | 28:72 | 3.0 | 2.0 | IB-600 | The present invention |
| 18-6 | M-5 | 3.70 | TEGDVE | −1.80 | 5.50 | 50:50 | 3.0 | 2.0 | IB-600 | The present invention |
| 18-7 | M-5 | 3.70 | TEGDVE | −1.80 | 5.50 | 55:45 | 3.0 | 2.0 | IB-600 | The present invention |
| 18-8 | M-5 | 3.70 | TEGDVE | −1.80 | 5.50 | 65:35 | 3.0 | 2.0 | IB-600 | The present invention |
| 18-9 | M-5 | 3.70 | TEGDVE | −1.80 | 5.50 | 77:23 | 3.0 | 2.0 | IB-600 | The present invention |
| 18-10 | M-5 | 3.70 | TEGDVE | −1.80 | 5.50 | 85:15 | 3.0 | 2.0 | IB-600 | The present invention |
| 18-11 | M-20 | 3.70 | TEGDVE | −1.80 | 5.50 | 35:65 | 3.0 | 2.0 | IB-600 | The present invention |
| 18-12 | M-3 | 3.70 | TEGDVE | −1.80 | 5.50 | 35:65 | 3.0 | 2.0 | IB-600 | The present invention |
| 18-13 | M-3 | 3.70 | TEGDVE | −1.80 | 5.50 | 35:65 | 3.0 | 2.0 | EPC | The present invention |
| 18-14 | M-3 | 3.70 | TEGDVE | −1.80 | 5.50 | 35:65 | 3.0 | 2.0 | GB-301 | The present invention |
| 18-15 | M-3 | 3.70 | TEGDVE | −1.80 | 5.50 | 35:65 | — | — | IB-600 | The present invention |
| 18-16 | Maleimide compound A | 3.70 | CHVE | −1.80 | 5.50 | 55:45 | 3.0 | 2.0 | EPC | The present invention |
| 18-17 | Maleimide compound B | 3.70 | CHVE | −1.80 | 5.50 | 50:50 | 3.0 | 2.0 | EPC | The present invention |
| 18-18 | Maleimide compound C | 3.70 | TEGDVE | −1.80 | 5.50 | 39:61 | 3.0 | 2.0 | IB-600 | The present invention |
| 18-19 | Maleimide compound A | 3.70 | CHVE | −1.80 | 5.50 | 55:45 | — | — | GB-301 | The present invention |
| 18-20 | Maleimide compound B | 3.70 | CHVE | −1.80 | 5.50 | 50:50 | — | — | IB-600 | The present invention |
| 18-21 | Maleimide compound C | 3.70 | TEGDVE | −1.80 | 5.50 | 39:61 | — | — | EPC | The present invention |
| 18-22 | Maleimide compound A | 3.70 | CHVE | −1.80 | 5.50 | 55:45 | 3.0 | 2.0 | — | Comparative Example |
| 18-23 | Maleimide compound B | 3.70 | CHVE | −1.80 | 5.50 | 50:50 | 3.0 | 2.0 | — | Comparative Example |
| 18-24 | Maleimide compound C | 3.70 | TEGDVE | −1.80 | 5.50 | 39:61 | 3.0 | 2.0 | — | Comparative Example |
| 18-25 | Diethyl maleate | 1.08 | TEGDVE | −1.80 | 2.88 | 50:50 | 3.0 | 2.0 | EPC | The present invention |
| 18-26 | Diethyl fumarate | 2.26 | TEGDVE | −1.80 | 4.06 | 50:50 | 3.0 | 2.0 | EPC | The present invention |
| 18-27 | M-3 | 3.70 | NVC | −1.18 | 4.88 | 40:60 | 3.0 | 2.0 | IB-600 | The present invention |
| 18-28 | Diethyl fumarate | 2.26 | NVC | −1.18 | 3.44 | 40:60 | 3.0 | 2.0 | IB-600 | The present invention |

TABLE 15-continued

| Ink No. | Monomer having a high e value (A) | e Value | Monomer having a low e value (B) | e Value | Δ (difference in e values) | A:B (ratio of functional groups) | Initiator (% by mass) | Sensitizer (% by mass) | *1 | Note |
|---|---|---|---|---|---|---|---|---|---|---|
| 18-29 | Methyl acrylate | 0.64 | TEGDVE | −1.80 | 2.44 | 50:50 | 3.0 | 2.0 | IB-600 | Comparative Example |
| 18-30 | Fumaronitrile | 2.73 | VCE | −6.33 | 9.06 | 50:50 | 3.0 | 2.0 | IB-600 | Comparative Example |

*1: Compound having a substituent capable of reacting with a nucleophilic agent (all added in an amount of 1% by mass)

The compounds described in Table 15 are as follows:

TEGDVE: Triethylene glycol divinyl ether (manufactured by Nippon Carbide Industries Co., Inc.)

CHVE: Cyclohexanedimethanol divinyl ether (manufactured by Nippon Carbide Industries Co., Inc.)

NVC: N-Vinylcaprolactam (manufactured by BASF)

VCE: Vinyl-m-cresyl ether (synthesized by a known document)

IB-600: ISOBAM-600 (manufactured by Kuraray Co., Ltd.)

EPC: EPICLON EXA-4850-150 (manufactured by DIC Corporation)

GB-301: NAK ACE GB-301 (manufactured by Nippon Unicar)

[Evaluation of Inks]

(Evaluation of Curability)

Using the inks prepared above, each ink was coated on a plastic corrugated board (4 mm-thick; made of polypropylene) with a wire bar (No. 3). The coated ink was touched onto the film surface through light irradiation by an LED (385 nm emission wavelength) at an output of 2 W/cm$^2$, and the curability was evaluated in accordance with the following criteria.

A: The cumulative amount of light irradiated is less than 50 mJ/cm$^2$ and the surface tackiness (stickiness) disappears.

B: The cumulative amount of light irradiated is from 50 to 100 mJ/cm$^2$ and the surface tackiness disappears.

C: The cumulative amount of light irradiated is from 100 to 200 mJ/cm$^2$ and the surface tackiness disappears.

D: The cumulative amount of light irradiated is 200 mJ/cm$^2$ or more.

(Evaluation of Durability)

The coated sample of each ink cured in the evaluation of curability above was subjected to light irradiation, water spraying, and heating for 300 hours under the following conditions in a Xenon Weathermeter (XL75; manufactured by Suga Test Instruments Co., Ltd.), and the state of the sample surface was visually observed and the durability was evaluated according to the following criteria.

Light irradiation: Light at 70.000 lux was irradiated for 3 hours and 55 minutes.

Water spraying: Water was sprayed for 5 minutes while irradiating light at 70.000 lux.

Heating: Light was turned off and heating was performed for four hours at 60° C./95% RH.

* The steps above were repeated.

A: Cracking and peeling are not seen.

B: Fine cracks are seen in a part of the image surface.

C: Cracks are observed on 30% or more of the image surface or a part of the sample is peeled and detached.

D: Cracks are observed on 60% or more of the image surface, or 30% or more of the sample is peeled and detached.

The results obtained above are shown in Table 16.

TABLE 16

| Ink No. | Curability | Durability | Note |
|---|---|---|---|
| 18-1 | B | D | Comparative Example |
| 18-2 | B | B | The present invention |
| 18-3 | C | B | The present invention |
| 18-4 | C | B | The present invention |
| 18-5 | B | B | The present invention |
| 18-6 | B | B | The present invention |
| 18-7 | B | B | The present invention |
| 18-8 | B | B | The present invention |
| 18-9 | B | B | The present invention |
| 18-10 | C | B | The present invention |
| 18-11 | A | A | The present invention |
| 18-12 | A | A | The present invention |
| 18-13 | A | A | The present invention |
| 18-14 | A | A | The present invention |
| 18-15 | C | A | The present invention |
| 18-16 | B | B | The present invention |
| 18-17 | B | B | The present invention |
| 18-18 | B | B | The present invention |
| 18-19 | C | B | The present invention |
| 18-20 | C | B | The present invention |
| 18-21 | C | B | The present invention |
| 18-22 | B | D | Comparative Example |
| 18-23 | B | D | Comparative Example |
| 18-24 | B | D | Comparative Example |
| 18-25 | C | B | The present invention |
| 18-26 | B | B | The present invention |
| 18-27 | A | B | The present invention |
| 18-28 | A | B | The present invention |
| 18-29 | D | D | Comparative Example |
| 18-30 | D | D | Comparative Example |

As clear from the results described in Table 16, the difference (Δe value) in the e values of the polymerizable compounds containing the same structures as those of the unsaturated bonding moieties contained in the two kinds of polymerizable compounds is from 2.8 to 6.0, and further, it can be seen that the ink of the present invention, containing the compound having the substituent capable of reacting with a nucleophilic agent, is excellent in curability and durability, as compared with Comparative Example.

Example 19

In the same manner as for the inks 18-1 and 18-2 described in Example 18, except that as the pigment types, C. I. Pigment Red 122 was changed to each of C. I. Pigment Yellow 150 (pigment content of 3.5% by mass), C. I. Pigment Blue 15:4 (pigment content of 2.5% by mass), and Carbon Black (pigment content of 2.5% by mass), inks 19-1A and 19-2A, 19-1B and 19-2B, 19-1C and 19-2C were prepared. Ink sets formed by the respective combinations of the inks 18-1 and 19-1A, the inks 19-1B and 19-1C, the inks 18-2 and 19-2A, and the inks 19-2B and 19-2C were prepared. With these ink sets, a piezo head KM512 MH manufactured by Konica Minolta IJ Technologies, Inc. was used to print a solid image (each of a monochromatic color and a secondary color formed by the combination of two colors) with a liquid droplet amount per dot of 14 pl and 720 dpi×720 dpi (dpi as mentioned in the present invention represents the number of dots per 2.54 cm) on a plastic corrugated board. The printed matter was irradiated with light in a light amount of 320 mJ/cm$^2$ by an LED at 385 nm with an output of 2 W/cm$^2$ to form a cured image film. For this, the durability in Example 18 was evaluated, and as a result, the ink set formed using the ink of the present invention exhibited good durability, but in the ink set formed using the comparative ink, significant cracks and peeling were seen after the evaluation.

Example 20

Preparation of Ink (Preparation of Ink 20-1)
Into a mixed liquid formed by mixing the maleimide compound 1 prepared above and the triethylene glycol divinyl ether (manufactured by Nippon Carbide Industries Co., Inc.) under the conditions where the molar ratio of the functional groups is 35:65, the pigment dispersion product 1 prepared above is mixed in such an amount that the pigment concentration was 4.5% by mass. In addition, 3.0% by mass of an acylphosphine oxide-based photopolymerization initiator Lucirin TPO (manufactured by BASF), 2.0% by mass of isopropylthioxanthone manufactured by Nippon Carbide Industries Co., Inc. as a thickening agent, and 0.15% by mass of IRGASTAB UV-10 (manufactured by BASF) as a polymerization inhibitor were mixed, and finally, finished to 100% by mass with a mixed liquid formed by mixing the maleimide compound 1 and the triethylene glycol divinyl ether (manufactured by Nippon Carbide Industries Co., Inc.) under the conditions where the molar ratio of the functional groups is 35:65, thereby preparing an ink 20-1.

(Preparation of Inks 20-2 to 20-31)
In the same manner as for the preparation of the ink 20-1, except that the maleimide compound, triethylene glycol divinyl ether, the acidic compound, the initiator, and the sensitizer were changed as described in Table 17, inks 20-2 to 20-31 were prepared.

TABLE 17

| Ink No. | Monomer having a high e value (A) Name of material | e value | Monomer having a low e value (B) Name of material | e value | Δ (difference in the e values) | A:B (molar ratio of functional groups) | Initiator (% by mass) | Sensitizer (% by mass) | Acidic compound Name of material | Addition amount (% by mass) | Note |
|---|---|---|---|---|---|---|---|---|---|---|---|
| 20-1 | M-5 | 3.70 | TEGDVE | −1.80 | 5.50 | 35:65 | 3.0 | 2.0 | — | — | Comparative Example |
| 20-2 | M-5 | 3.70 | TEGDVE | −1.80 | 5.50 | 35:65 | 3.0 | 2.0 | CPI | 0.3 | The present invention |
| 20-3 | M-5 | 3.70 | TEGDVE | −1.80 | 5.50 | 15:85 | 3.0 | 2.0 | CPI | 0.3 | The present invention |
| 20-4 | M-5 | 3.70 | TEGDVE | −1.80 | 5.50 | 23:77 | 3.0 | 2.0 | CPI | 0.3 | The present invention |
| 20-5 | M-5 | 3.70 | TEGDVE | −1.80 | 5.50 | 28:72 | 3.0 | 2.0 | CPI | 0.3 | The present invention |
| 20-6 | M-5 | 3.70 | TEGDVE | −1.80 | 5.50 | 50:50 | 3.0 | 2.0 | CPI | 0.3 | The present invention |
| 20-7 | M-5 | 3.70 | TEGDVE | −1.80 | 5.50 | 55:45 | 3.0 | 2.0 | CPI | 0.3 | The present invention |
| 20-8 | M-5 | 3.70 | TEGDVE | −1.80 | 5.50 | 65:35 | 3.0 | 2.0 | CPI | 0.3 | The present invention |
| 20-9 | M-5 | 3.70 | TEGDVE | −1.80 | 5.50 | 77:23 | 3.0 | 2.0 | CPI | 0.3 | The present invention |
| 20-10 | M-5 | 3.70 | TEGDVE | −1.80 | 5.50 | 85:15 | 3.0 | 2.0 | CPI | 0.3 | The present invention |
| 20-11 | M-20 | 3.70 | TEGDVE | −1.80 | 5.50 | 35:65 | 3.0 | 2.0 | CPI | 0.3 | The present invention |
| 20-12 | M-3 | 3.70 | TEGDVE | −1.80 | 5.50 | 35:65 | 3.0 | 2.0 | CPI | 0.3 | The present invention |
| 20-13 | M-3 | 3.70 | TEGDVE | −1.80 | 5.50 | 35:65 | 3.0 | 2.0 | TsOH | 0.3 | The present invention |
| 20-14 | M-3 | 3.70 | TEGDVE | −1.80 | 5.50 | 35:65 | 3.0 | 2.0 | CfOH | 0.3 | The present invention |
| 20-15 | M-3 | 3.70 | TEGDVE | −1.80 | 5.50 | 35:65 | 3.0 | 2.0 | CPI | 0.05 | The present invention |
| 20-16 | M-3 | 3.70 | TEGDVE | −1.80 | 5.50 | 35:65 | 3.0 | 2.0 | CPI | 0.15 | The present invention |
| 20-17 | M-3 | 3.70 | TEGDVE | −1.80 | 5.50 | 35:65 | 3.0 | 2.0 | CPI | 0.5 | The present invention |
| 20-18 | M-3 | 3.70 | TEGDVE | −1.80 | 5.50 | 35:65 | 3.0 | 2.0 | CPI | 4.0 | The present invention |
| 20-19 | M-3 | 3.70 | TEGDVE | −1.80 | 5.50 | 35:65 | 3.0 | 2.0 | CPI | 7.0 | The present invention |
| 20-20 | Maleimide compound A | 3.70 | CHVE | −1.80 | 5.50 | 55:45 | 3.0 | 2.0 | CPI | 0.3 | The present invention |
| 20-21 | Maleimide compound B | 3.70 | CHVE | −1.80 | 5.50 | 50:50 | 3.0 | 2.0 | CPI | 0.3 | The present invention |
| 20-22 | Maleimide compound C | 3.70 | TEGDVE | −1.80 | 5.50 | 39:61 | 3.0 | 2.0 | CPI | 0.3 | The present invention |
| 20-23 | Maleimide compound A | 3.70 | CHVE | −1.80 | 5.50 | 55:45 | — | — | — | — | Comparative Example |

TABLE 17-continued

| Ink No. | Monomer having a high e value (A) Name of material | e value | Monomer having a low e value (B) Name of material | e value | Δ (difference in the e values) | A:B (molar ratio of functional groups) | Initiator (% by mass) | Sensitizer (% by mass) | Acidic compound Name of material | Addition amount (% by mass) | Note |
|---|---|---|---|---|---|---|---|---|---|---|---|
| 20-24 | Maleimide compound B | 3.70 | CHVE | −1.80 | 5.50 | 50:50 | — | — | — | — | Comparative Example |
| 20-25 | Maleimide compound C | 3.70 | TEGDVE | −1.80 | 5.50 | 39:61 | — | — | — | — | Comparative Example |
| 20-26 | Diethyl maleate | 1.08 | TEGDVE | −1.80 | 2.88 | 50:50 | 3.0 | 2.0 | CPI | 0.3 | The present invention |
| 20-27 | Diethyl fumarate | 2.26 | TEGDVE | −1.80 | 4.06 | 50:50 | 3.0 | 2.0 | CPI | 0.3 | The present invention |
| 20-28 | M-3 | 3.70 | NVC | −1.18 | 4.88 | 40:60 | 3.0 | 2.0 | CPI | 0.3 | The present invention |
| 20-29 | Diethyl fumarate | 2.26 | NVC | −1.18 | 3.44 | 40:60 | 3.0 | 2.0 | CPI | 0.3 | The present invention |
| 20-30 | Methyl acrylate | 0.64 | TEGDVE | −1.80 | 2.44 | 50:50 | 3.0 | 2.0 | CPI | 0.3 | Comparative Example |
| 20-31 | Fumaronitrile | 2.73 | VCE | −6.33 | 9.06 | 50:50 | 3.0 | 2.0 | CPI | 0.3 | Comparative Example |

The compounds described in Table 17 are as follows:

TEGDVE: Triethylene glycol divinyl ether (manufactured by Nippon Carbide Industries Co., Inc.)

CHVE: Cyclohexanedimethanol divinyl ether (manufactured by Nippon Carbide Industries Co., Inc.)

NVC: N-Vinylcaprolactam (manufactured by BASF)

VCE: Vinyl-m-cresyl ether (synthesized by a known document)

TsOH: p-Toluenesulfonic acid (manufactured by Tokyo Chemical Industry Co., Ltd.)

CfOH: Trifluoroacetic acid (manufactured by Tokyo Chemical Industry Co., Ltd.)

CPI: CPI-100P triarylsulfonium-based photo acid generator (manufactured by San-Apro Ltd.)

[Evaluation of Inks]

(Evaluation of Curability)

Using the inks prepared above, each ink was coated on a plastic corrugated board (4 mm-thick polypropylene-made) with a wire bar (No. 3). The coated ink was touched onto the film surface through light irradiation by an LED (385 nm emission wavelength) at an output of 2 W/cm$^2$, and the curability was evaluated in accordance with the following criteria.

A: The cumulative amount of light irradiated is less than 75 mJ/cm$^2$ and the surface tackiness (stickiness) disappears.

B: The cumulative amount of light irradiated is from 75 to 125 mJ/cm$^2$ and the surface tackiness disappears.

C: The cumulative amount of light irradiated is from 125 to 200 mJ/cm$^2$ and the surface tackiness disappears.

D: The cumulative amount of light irradiated is 200 mJ/cm$^2$ or more.

(Evaluation of Adhesiveness)

The coated sample of each ink cured in the evaluation of curability above was stored at room temperature for 7 days. The image surface was scratched in the shape of a 5×5 grid with a width of 5 mm by a cutter knife, Sellotape (registered trademark) (manufactured by Nichiban Co., Ltd.) was attached and then detached, and evaluation on how much image remained was evaluated.

A: Peeling occurred in less than 5 grids out of the grid.
B: Peeling occurred in 5 to 10 grids out of the grid.
C: Peeling occurred in 11 to 17 grids out of the grid.
D: Peeling occurred in 18 or more grids out of the grid.

The results obtained above are shown in Table 18.

TABLE 18

| Ink No. | Curability | Adhesiveness | Note |
|---|---|---|---|
| 20-1 | B | D | Comparative Example |
| 20-2 | B | B | The present invention |
| 20-3 | C | B | The present invention |
| 20-4 | C | B | The present invention |
| 20-5 | B | B | The present invention |
| 20-6 | B | B | The present invention |
| 20-7 | B | B | The present invention |
| 20-8 | B | B | The present invention |
| 20-9 | B | B | The present invention |
| 20-10 | C | B | The present invention |
| 20-11 | A | A | The present invention |
| 20-12 | A | A | The present invention |
| 20-13 | A | A | The present invention |
| 20-14 | A | A | The present invention |
| 20-15 | A | C | The present invention |
| 20-16 | A | B | The present invention |
| 20-17 | A | A | The present invention |
| 20-18 | B | B | The present invention |
| 20-19 | C | B | The present invention |
| 20-20 | B | B | The present invention |
| 20-21 | B | B | The present invention |
| 20-22 | B | B | The present invention |
| 20-23 | B | D | Comparative Example |
| 20-24 | B | D | Comparative Example |
| 20-25 | B | D | Comparative Example |
| 20-26 | C | B | The present invention |
| 20-27 | B | B | The present invention |
| 20-28 | A | B | The present invention |
| 20-29 | A | B | The present invention |
| 20-30 | D | D | Comparative Example |
| 20-31 | D | D | Comparative Example |

As clear from the results described in Table 18, the difference (Δe value) in the e values of the polymerizable compounds containing the same structures as those of the unsaturated bonding moieties contained in the two kinds of polymerizable compounds is from 2.8 to 6.0, and further, it can be seen that the ink of the present invention, containing the acidic compound, is excellent in curability and adhesiveness, as compared with Comparative Example.

Example 21

In the same manner as for the inks 20-1 and 20-2 described in Example 20, except that as the pigment types, C. I. Pigment Red 122 was changed to each of C. I. Pigment Yellow 150 (pigment content of 3.5% by mass), C. I. Pigment Blue 15:4

(pigment content of 2.5% by mass), and Carbon Black (pigment content of 2.5% by mass), inks 21-1A and 21-2A, inks 21-1B and 21-2B, and inks 21-1C and 21-2C were prepared. Ink sets formed by the combination of the inks 20-1 and 21-1A, the inks 21-1Ba and 21-1C, the inks 20-2 and 21-2A, and the inks 21-2B and 21-2C were prepared. With these ink sets, a piezo head KM512MH manufactured by Konica Minolta IJ Technologies, Inc. was used to print a solid image (each of a monochromatic color and a secondary color formed by the combination of two colors) with a liquid droplet amount per dot of 14 pl and 720 dpi×720 dpi (dpi as mentioned in the present invention represents the number of dots per 2.54 cm) on a plastic corrugated board. The printed matter was irradiated with light in a light amount of 320 mJ/cm$^2$ by an LED at 385 nm with an output of 2 W/cm$^2$ to form a cured image film. For this, the adhesiveness in Example 20 was evaluated, and as a result, the ink set formed using the ink of the present invention exhibited good durability, but in the ink set formed using the comparative ink, significant cracks and peeling were seen after the evaluation.

This application claims priority, based on Japanese Patent No. 2011-013902 filed on Jan. 26, 2011, Japanese Patent No. 2011-056301 filed on Mar. 15, 2011, and Japanese Patent No. 2011-056302 filed on Mar. 15, 2011. The content described in the specification and the drawing of this Patent Application is incorporated herein by reference in its entirety.

INDUSTRIAL APPLICABILITY

By the present invention, an ultraviolet ray curable ink jet ink composition which enables the formation of a high-quality image having excellent viscosity stability, curing sensitivity, discharge stability, and weather resistance when stored for a long period of time; an actinic energy radiation curable ink jet ink using the same; and an ink jet recording method using the actinic energy radiation curable ink jet ink could be provided.

REFERENCE SIGNS LIST

1 Recording Apparatus
2 Head Carriage
3 Recording Head
31 Ink Discharge Port
4 Irradiation Unit
5 Platen Section
6 Guide Member
7 Bellows Structure
8 Radiation Light Source
P Recording Medium

The invention claimed is:

1. An actinic energy radiation curable ink jet ink composition including at least two kinds of polymerizable monomers having unsaturated bonds, wherein:
the maximum value of the difference in the charges of carbon atoms constituting each of the unsaturated bonds contained in the at least two kinds of polymerizable monomers is from 0.24 to 0.46; and
the total content of the elemental ions of Fe, Co, Ca, Na, Mg, Al, Ti, Sn, and Zn is from 5.0 ppm to 100 ppm.

2. The actinic energy radiation curable ink jet ink composition according to claim 1, wherein:
among the at least two kinds of polymerizable monomers;
the polymerizable monomer having the maximum value of the charges of carbon atoms constituting the unsaturated bond is a compound represented by the following general formula (1) or (2); and
the polymerizable monomer having the minimum value of the charges of carbon atoms constituting the unsaturated bond is a compound represented by the following general formula (3):

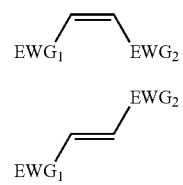

General Formula (1)

General Formula (2)

wherein $EWG_1$ and $EWG_2$ each represent a partial structure having an electron withdrawing group directly linked to an unsaturated bond, and parts of $EWG_1$ or $EWG_2$ may be bonded to each other to form a cyclic structure,
the electron withdrawing group represents a cyano group, a halogen group, a pyridyl group, a pyrimidyl group, a nitro group, a group represented by the following general formula (a), or a group represented by the following general formula (b),
each of $EWG_1$ and $EWG_2$ may form a condensed ring or a ring via R as a linking group, in which R represents a linear alkylene group, a branched alkylene group, a cyclic alkylene group, an alkylene group having a hydroxyl group, an aryl group, or an arylalkylene group, and may further have a substituent, and
parts of $EWG_1$ or $EWG_2$ may form a monofunctional polymerizable monomer having one unsaturated bond, or a polyfunctional polymerizable monomer having two or more unsaturated bonds via a linking group

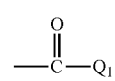

General Formula (a)

General Formula (b)

wherein $Q_1$ represents OH, OR', NR'R", or R', R' and R" each represent a hydrogen atom, a linear alkylene group, a branched alkylene group, a cyclic alkylene group, an alkylene group having a hydroxyl group, an aryl group, or an arylalkylene group, and
n represents 1 or 2

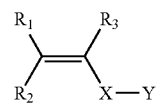

General Formula (3)

wherein X represents —O—, —$NR_4$—, —S—, or —SO—,
Y represents a hydrogen atom, a linear alkyl group, a branched alkyl group, a cyclic alkyl group, an alkyl group having a hydroxyl group, an aryl group, or an arylalkyl group, and may further have a substituent,
$R_1$, $R_2$, and $R_3$ each independently represent a hydrogen atom, a linear alkyl group, a branched alkyl group, a cyclic alkyl group, an alkyl group having a hydroxyl group, an aryl group, or an arylalkyl group, and may further have a substituent, and further, parts of $R_2$ or $R_3$ may be bonded to Y to form a cyclic structure, and parts of Y may form a monofunctional polymerizable monomer having one unsaturated bond, or a polyfunctional polymerizable monomer having two or more unsaturated bonds via a linking group.

3. The actinic energy radiation curable ink jet ink composition according to claim 2, wherein:

the compound represented by the general formula (1) or (2) is at least one kind of compound selected from the following general formulae (A-1) to (A-13):

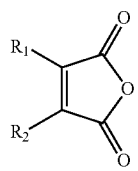
General Formula (A-1)

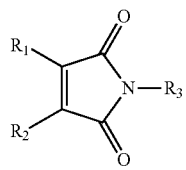
General Formula (A-2)

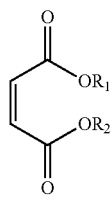
General Formula (A-3)

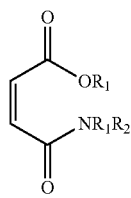
General Formula (A-4)

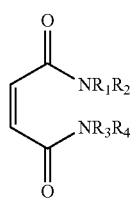
General Formula (A-5)

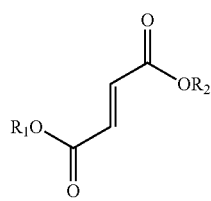
General Formula (A-6)

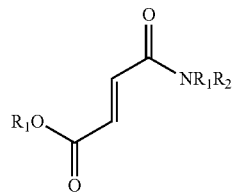
General Formula (A-7)

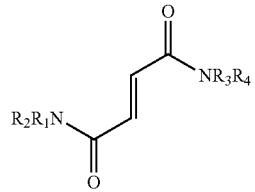
General Formula (A-8)

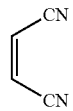
General Formula (A-9)

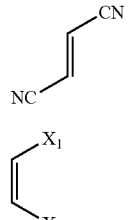
General Formula (A-10)

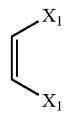
General Formula (A-11)

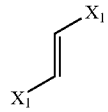
General Formula (A-12)

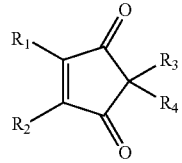
General Formula (A-13)

wherein $R_1$, $R_2$, $R_3$, $R_4$ each independently represent a hydrogen atom, a linear alkyl group, a branched alkyl group, a cyclic alkyl group, an alkyl group having a hydroxyl group, an aryl group, or an arylalkyl group, and may further have a substituent and may be a linking group for forming a polyfunctional polymerizable compound having two or more unsaturated bonding moieties, and $X_1$ represents a halogen atom.

4. The actinic energy radiation curable ink jet ink composition according to claim 2, wherein:

the compound represented by the general formula (3) is at least one kind of compound selected from the following general formulae (D-1) to (D-9):

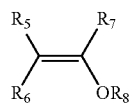
General Formula (D-1)

-continued

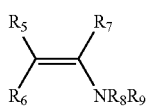
General Formula (D-2)

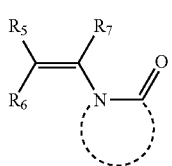
General Formula (D-3)

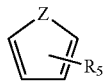
General Formula (D-4)

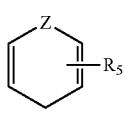
General Formula (D-5)

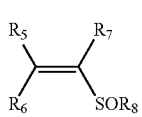
General Formula (D-6)

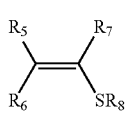
General Formula (D-7)

General Formula (D-8)

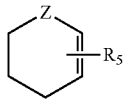
General Formula (D-9)

wherein $R_5$ to $R_9$ each independently represent a hydrogen atom, a linear alkyl group, a branched alkyl group, a cyclic alkyl group, an alkyl group having a hydroxyl group, an aryl group, or an arylalkyl group, and may further have a substituent and may be a linking group for forming a polyfunctional polymerizable compound having two or more unsaturated bonding moieties, Z represents —O—, —N($R_{10}$)—, or —S—, $R_{10}$ represents a hydrogen atom, a linear alkyl group, a branched alkyl group, a cyclic alkyl group, an alkyl group having a hydroxyl group, an aryl group, or an arylalkyl group, and may further have a substituent.

5. The actinic energy radiation curable ink jet ink composition according to claim 3, wherein:
the compound represented by the general formula (1) or (2) is a compound represented by the general formula (A-1), (A-2), (A-3), or (A-6); and
the compound represented by the general formula (3) is a compound represented by the general formula (D-1), (D-2), or (D-3).

6. An actinic energy radiation curable ink jet ink comprising:
the actinic energy radiation curable ink jet ink composition according to claim 1, and a colorant.

7. An ink jet recording method, wherein:
image recording is carried out using the actinic energy radiation curable ink jet ink according to claim 6.

8. The actinic energy radiation curable ink jet ink composition according to claim 1, wherein:
among the at least two kinds of polymerizable monomers:
the polymerizable monomer having the maximum value of the charges of carbon atoms constituting the unsaturated bond is a compound represented by the following general formulae (A-1), (A-2), (A-3) and (A-6), and
the polymerizable monomer having the minimum value of the charges of carbon atoms constituting the unsaturated bond is a compound represented by the following general formulae (D-1) and (D-3)

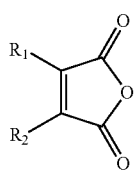
General Formula (A-1)

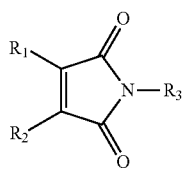
General Formula (A-2)

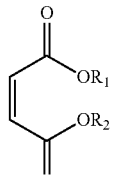
General Formula (A-3)

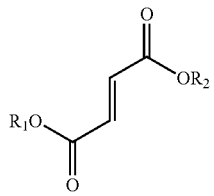
General Formula (A-6)

wherein $R_1$, $R_2$, $R_3$ each independently represent a hydrogen atom, a linear alkyl group, a branched alkyl group, a cyclic alkyl group, an alkyl group having a hydroxyl group, an aryl group, or an arylalkyl group, and may further have a substituent and may be a linking group for forming a polyfunctional polymerizable compound having two or more unsaturated bonding moieties

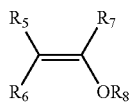
General Formula (D-1)

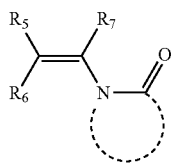
General Formula (D-3)

wherein $R_5$ to $R_8$ each independently represent a hydrogen atom, a linear alkyl group, a branched alkyl group, a cyclic alkyl group, an alkyl group having a hydroxyl group, an aryl group, or an arylalkyl group, and may further have a substituent and may be a linking group for forming a polyfunctional polymerizable compound having two or more unsaturated bonding moieties.

9. The actinic energy radiation curable ink jet ink composition according to claim 1, wherein:
among the at least two kinds of polymerizable monomers:
the polymerizable monomer having the maximum value of the charges of carbon atoms constituting the unsaturated bond is a compound selected from the group consisting of maleimide compounds 1 to 6, maleic anhydride, diethyl maleate, and diisopropyl fumarate, and
the polymerizable monomer having the minimum value of the charges of carbon atoms constituting the unsaturated bond is a compound selected from the group consisting of triethylene glycol divinyl ether and N-vinylformamide Maleimide Compound 1

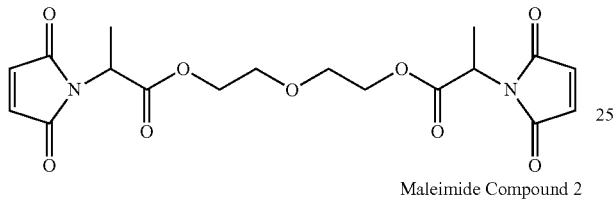

Maleimide Compound 2

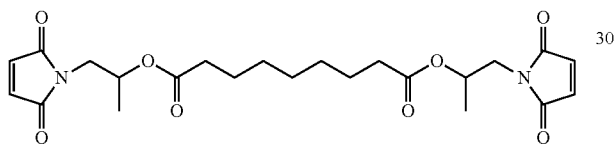

Maleimide Compound 3

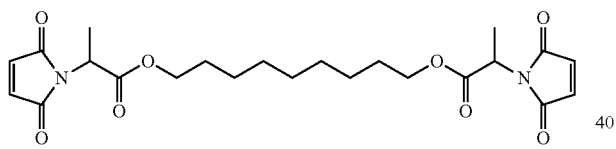

Maleimide Compound 4

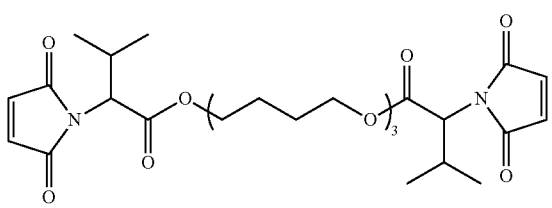

Maleimide Compound 5

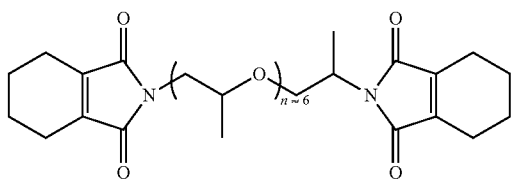

Maleimide Compound 6

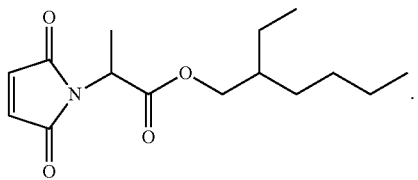

10. The actinic energy radiation curable ink jet ink composition according to claim 1, wherein:
the molar ratio of the unsaturated bonds of the monomer having the maximum value of the charges of carbon atoms constituting the unsaturated bond and the monomer having the minimum value of the charges of carbon atoms constituting the unsaturated bond is in the range of 2/8 to 8/2.

* * * * *